(12) United States Patent
Sakai et al.

(10) Patent No.: US 7,215,354 B1
(45) Date of Patent: May 8, 2007

(54) SCANNING OPTICAL SYSTEM, OPTICAL SCANNING DEVICE AND IMAGE FORMING APPARATUS

(75) Inventors: Kohji Sakai, Tokyo (JP); Magane Aoki, Kanagawa (JP); Seizo Suzuki, Kanagawa (JP); Hiromichi Atsuumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 771 days.

(21) Appl. No.: 09/678,611

(22) Filed: Oct. 4, 2000

(30) Foreign Application Priority Data

Oct. 5, 1999 (JP) ............................. 11-284443

(51) Int. Cl.
*B41J 27/00* (2006.01)
(52) U.S. Cl. ..................... 347/244; 347/258
(58) Field of Classification Search ........... 347/225, 347/233, 241–244, 258, 256–261, 230; 359/204–208, 359/563, 668, 708
See application file for complete search history.

(56) References Cited

U.S. PATENT DOCUMENTS

| | | | | |
|---|---|---|---|---|
| 5,233,454 A | | 8/1993 | Sakuma et al. ............ 359/196 |
| 5,305,022 A | * | 4/1994 | Ota et al. .................. 347/233 |
| 5,355,244 A | | 10/1994 | Suzuki et al. ............... 359/212 |
| 5,408,095 A | | 4/1995 | Atsuumi et al. ............ 250/236 |
| 5,426,298 A | | 6/1995 | Sakuma et al. ............ 250/235 |
| 5,459,601 A | | 10/1995 | Suzuki et al. ............... 359/205 |
| 5,475,522 A | | 12/1995 | Itabashi et al. ............ 359/208 |
| 5,504,613 A | | 4/1996 | Itabashi et al. ............ 359/210 |
| 5,546,216 A | | 8/1996 | Suzuki ....................... 359/216 |
| 5,684,618 A | | 11/1997 | Atsuumi .................... 359/208 |
| 5,717,511 A | | 2/1998 | Suzuki ....................... 359/204 |
| 5,815,301 A | * | 9/1998 | Naiki et al. ................. 359/205 |
| 5,875,051 A | | 2/1999 | Suzuki et al. ............... 359/205 |
| 5,986,791 A | | 11/1999 | Suzuki et al. ............... 359/207 |
| 5,999,345 A | | 12/1999 | Nakajima et al. .......... 359/821 |
| 6,046,835 A | * | 4/2000 | Yamawaki et al. ......... 359/205 |
| 6,069,724 A | | 5/2000 | Hayashi et al. ............ 359/206 |
| 6,078,419 A | | 6/2000 | Atsuumi .................... 359/207 |

(Continued)

FOREIGN PATENT DOCUMENTS

JP       08297256 A      11/1996

(Continued)

OTHER PUBLICATIONS

U.S. Appl. No. 10/758,212, filed Jan. 16, 2004, Sakai, (Pending).

(Continued)

*Primary Examiner*—Hai Pham
(74) *Attorney, Agent, or Firm*—Oblon, Spivak, McClelland, Maier & Neustadt, P.C.

(57) ABSTRACT

A scanning optical system condensing a beam deflected by an optical deflector so as to form a beam spot on a surface to be scanned, comprises two lenses. A lens on the side of optical deflector has a negative refracting power in sub-scanning direction. A lens on the side of surface to be scanned has a positive refracting power in the sub-scanning direction. At least one lens surface of the lens surfaces of the two lenses is such that a shape in a sub-scanning section thereof is a non-arc shape.

21 Claims, 32 Drawing Sheets

U.S. PATENT DOCUMENTS

| | | | |
|---|---|---|---|
| 6,081,386 A | 6/2000 | Hayashi et al. | 359/641 |
| 6,104,522 A | 8/2000 | Hayashi et al. | 359/207 |
| 6,130,768 A * | 10/2000 | Ono | 359/207 |
| 6,141,133 A | 10/2000 | Suzuki et al. | 359/207 |
| 6,166,842 A | 12/2000 | Aoki et al. | 359/205 |
| 6,185,026 B1 | 2/2001 | Hayashi et al. | 359/204 |
| 6,188,086 B1 | 2/2001 | Masuda et al. | 257/98 |
| 6,198,563 B1 | 3/2001 | Atsuumi | 359/208 |
| 6,222,662 B1 | 4/2001 | Suzuki et al. | 39/205 |
| 6,233,081 B1 | 5/2001 | Suzuki et al. | 359/212 |
| 6,256,133 B1 * | 7/2001 | Suzuki et al. | 359/207 |
| 6,288,819 B1 | 9/2001 | Aoki et al. | 359/205 |
| 6,317,246 B1 | 11/2001 | Hayashi et al. | 359/205 |
| 6,347,004 B1 * | 2/2002 | Suzuki et al. | 359/205 |
| 6,348,988 B2 | 2/2002 | Aoki et al. | 359/205 |
| 6,348,989 B2 | 2/2002 | Aoki et al. | 359/205 |
| 6,359,717 B2 | 3/2002 | Suzuki et al. | 359/205 |
| 6,376,837 B1 | 4/2002 | Itabashi et al. | 250/234 |
| 6,384,949 B1 | 5/2002 | Suzuki | 359/196 |
| 6,445,483 B2 * | 9/2002 | Takada et al. | 359/207 |
| 6,448,998 B1 | 9/2002 | Suzuki et al. | 347/258 |
| 6,498,617 B1 | 12/2002 | Ishida et al. | 347/252 |

FOREIGN PATENT DOCUMENTS

| | | |
|---|---|---|
| JP | 9-184976 | 7/1997 |
| JP | 10-197823 | 7/1998 |

OTHER PUBLICATIONS

U.S. Appl. No. 10/743,808, filed Dec. 24, 2003, Suzuki, (Pending).
U.S. Appl. No. 10/386,654, filed Mar. 13, 2003, Amada et al., (Pending).
U.S. Appl. No. 10/382,489, filed Mar. 7, 2003, Takanashi et al., (Pending).
U.S. Appl. No. 10/278,878, filed Oct. 24, 2002, pending.
U.S. Appl. No. 09/649,179, filed Aug. 29, 2000, pending, U.S. Pat 6,448,998.
U.S. Appl. No. 10/820,733, filed Apr. 9, 2004, Suhara et al.
U.S. Appl. No. 10/866,043, filed Jun. 14, 2004, Hayashi et al.
U.S. Appl. No. 10/840,369, filed May 7, 2004, Itabashi et al.
U.S. Appl. No. 10/927,226, filed Aug. 27, 2004, Izumi et al.
U.S. Appl. No. 10/942,907, filed Sep. 17, 2004, Miyatake et al.
U.S. Appl. No. 10/892,191, filed Jul. 16, 2004, Suzuki et al.
U.S. Appl. No. 10/095,913, filed Mar. 13, 2002, Ema et al.
U.S. Appl. No. 10/183,748, filed Jun. 28, 2002, Nihei et al.
U.S. Appl. No. 10/214,559, filed Aug. 9, 2002, Ishida et al.
U.S. Appl. No. 10/323,837, filed Dec. 20, 2002, Suzuki et al.
U.S. Appl. No. 09/969,982, filed Oct. 3, 2001, unknown.
U.S. Appl. No. 09/333,209, filed Jun. 15, 1999, unknown.
Pending U.S. Appl. No. 10/059,371, filed Jan. 31, 2002.
Pending U.S. Appl. No. 10/207,241, filed Jul. 30, 2002.
U.S. Appl. No. 09/874,793, filed Jun. 6, 2001, unknown.
U.S. Appl. No. 09/955,181, filed Sep. 19, 2001, unknown.
Pending U.S. Appl. No. 10/028,698, filed Dec. 28, 2001.
Pending U.S. Appl. No. 10/161,659, filed Jun. 5, 2002.
Pending U.S. Appl. No. 10/161,756, filed Jun. 5, 2002.
U.S. Appl. No. 09/513,856, filed Feb. 25, 2000, unknown.
U.S. Appl. No. 09/588,342, filed Jun. 6, 2000, allowed.
Pending U.S. Appl. No. 09/816,378, filed Mar. 26, 2001.
Pending U.S. Appl. No. 09/827,097, filed Apr. 6, 2001.
Pending U.S. Appl. No. 09/833,821, filed Apr. 13, 2001.
Pending U.S. Appl. No. 10/047,698, filed Jan. 18, 2002.
U.S. Appl. No. 09/533,063, filed Mar. 22, 2000, unknown.
U.S. Appl. No. 08/306,000, filed Sep. 16, 1994, unknown.
U.S. Appl. No. 09/612,634, filed Jul. 7, 2000, allowed.
Pending U.S. Appl. No. 09/653,330, filed Aug. 31, 2000.
Pending U.S. Appl. No. 09/716,949, filed Nov. 22, 2000.
Pending U.S. Appl. No. 09/788,415, filed Feb. 21, 2001.
Pending U.S. Appl. No. 10/047,092, filed Jan. 17, 2002.

* cited by examiner

S2 RADIUS OF CURVATURE

MAIN SCANNING DIRECTION (mm)

S3 RADIUS OF CURVATURE

MAIN SCANNING DIRECTION (mm)

S2 RADIUS OF CURVATURE

S3 RADIUS OF CURVATURE

S2 RADIUS OF CURVATURE

S3 RADIUS OF CURVATURE

MAIN SCANNING

SUB-SCANNING

SCANNING OPTICAL SYSTEM, OPTICAL SCANNING DEVICE AND IMAGE FORMING APPARATUS

BACKGROUND OF THE INVENTION

1. Field of the Invention

The present invention relates to a scanning optical system, an optical scanning device and an image forming apparatus.

2. Description of the Related Art

Optical scanning devices are widely known with regard to a digital copier, a laser printer, a laser plotter, a laser plate-making apparatus and so forth.

A scanning optical system is used in an optical scanning device, and is an optical system condensing a beam deflected by an optical deflector and forming a beam spot for scanning on a surface to be scanned. The beam spot thus formed on the surface to be scanned scans the surface to be scanned and performs image writing.

Recently, it is demanded for such an optical scanning device to perform scanning in high density at high speed. Further, in many cases, by the reason of layout of an image forming apparatus employing such an optical scanning device, 'a long back length' is demanded for the scanning optical system.

'The back length' is a distance from one of imaging elements (such as lenses, concave mirrors) included in the scanning optical system which one is disposed closest to a surface to be scanned, to the surface to be scanned.

In an image forming apparatus employing an optical scanning device, it is difficult to change a structural configuration.

For example, in the image forming apparatus, a photoconductive photosensitive body is used as a photosensitive medium, it is charged uniformly by a charging unit, then, an image is written thereon by an optical scanning device, the thus-formed electrostatic latent image is developed into a toner image by a developing device, the toner image is transferred onto a transfer paper and is fixed thereonto, and thus, image forming is performed.

In such a case, structural positional relationship of the mechanical devices needed for the image forming process such as the charging unit, developing device, transfer device and fixing device, with respect to the photosensitive body, is limited due to the mechanical configurations thereof. Accordingly, the positions thereof are almost fixed, and thus, it is difficult to change these positions.

In contrast to this, with regard to the optical systems of the optical scanning device, an optical arrangement from a light source to a surface to be scanned (substantially, the photosensitive surface of the photosensitive body) can be changed freely to some extent, and can be optically designed according to a layout of the charging unit, developing device and so forth, in the image forming apparatus. Therefore, there are many cases where 'the scanning optical system having a long back length' is demanded in a view point of layout.

Recently, 'the scanning density' of the optical scanning device is demanded to be higher, for example, 1200 dpi (the number of dots per inch) or 2400 dpi. In order to achieve high density of scanning, it is necessary to reduce a diameter of a beam spot formed on the surface to be scanned.

In order to reduce the diameter of the beam spot, it is necessary to enlarge the diameter of the beam incident on the scanning optical system. When the diameter of the beam incident on the scanning optical system increases, it is important to make uniform wave-optic wavefront aberration whatever the image height is, as well as to improve the geometric-optic characteristics such as curvature of field and imaging magnification, for the scanning optical system.

As a system for increasing the scanning speed of the optical scanning device, 'a multi-beam system' in that the surface to be scanned is scanned by a plurality of beam spots at the same time is watched. Therein, a light source in an LD array system in that light emitting sources of monolithic semiconductor laser array are arranged in row, or in a beam combining system in that beams from a plurality of semiconductor laser are combined, is used.

When such a light source in the LD array system or beam combining system is used, similarly to the case of the scanning optical system in the single beam system, it is possible to use in common the optical systems on the light path from the light source to the surface to be scanned for a plurality of beams. Accordingly, it is possible to achieve the optical system in the multi-beam system with high stability against structural change.

Also in the case of the multi-beam scanning system, it is necessary to reduce the diameter of each beam spot formed on the surface to be scanned for achieving high-density scanning. For this purpose, it is necessary to keep the wave-optic wavefront aberration smaller as in the case of single-beam system.

SUMMARY OF THE INVENTION

An object of the present invention is to achieve a scanning optical system by which it is possible to secure a back length and to achieve a small-diameter beam spot whether it is in the single-beam system or multi-beam system.

Another object of the present invention is to achieve an optical scanning device in the single-beam system and multi-beam system which can achieve high density scanning, by using the above-mentioned scanning optical system.

Another object of the present invention is to provide an image forming apparatus using such an optical scanning device.

A scanning optical system according to the present invention is 'an optical system condensing a beam deflected by an optical deflector and forming a beam spot on a surface to be scanned', and has the following features:

the scanning optical system includes two lenses;

the lens on the side of the optical deflector thereof 'has a negative refracting power in sub-scanning direction', and the lens on the side of the surface to be scanned thereof 'has a positive refracting power in the sub-scanning direction'; and at least one lens surface of the lens surfaces of the two lenses 'has a non-arc shape in a sub-scanning section'.

'The sub-scanning section' is an imaginary plane section perpendicular to main scanning direction on and in the proximity of the lens surface. Further, 'a main scanning section' is an imaginary plane section including the optical axis of the lens and parallel to the main scanning direction on and in the proximity of the lens surface.

In the above-described scanning optical system, the 'surface having the non-arc shape in the sub-scanning section' may be 'a sub-non-arc surface in that the non-arc shape in the sub-scanning section varies according to the position of the sub-scanning section in the main scanning direction'.

The shape of the sub-non-arc surface may be determined so as to correct the wavefront aberration at each scanning position (position at which the beam spot is formed: image height) on the surface to be scanned. Thereby, it is possible to set the best wavefront aberration for each scanning position on the surface to be scanned.

In any of the above-described scanning optical systems, the lens on the side of optical deflector may 'have a positive refracting power in the main scanning direction'.

It is preferable that the lateral magnification $\beta_2$ in the sub-scanning direction at the central image height of any of the above-described scanning optical systems satisfies the following condition:

$$0.5 \leq |\beta_2| \leq 2.0 \quad (1)$$

'The lateral magnification in the sub-scanning direction of the scanning optical system' is defined as, through the specification and claims, the lateral magnification in the sub-scanning direction of 'the object point of the scanning optical system conjugate to an image point on or in the proximity of the surface to be scanned' and the image point on or in the proximity of the surface to be scanned. The one at the central image height of this lateral magnification in the sub-scanning direction is the above-mentioned '$\beta_2$', and the one at any image height 'h' is '$\beta_h$' which will be described later.

In any of the above-described scanning optical systems, the above-mentioned sub-non-arc surface may have a non-arc shape also in the main scanning section.

Any of the above-mentioned scanning optical systems may be 'an anamorphic optical system having a function such that the position on or in the proximity of the deflection reflective surface and the position of the surface to be scanned have a geometric-optical conjugate relationship with regard to the sub-scanning direction'.

In this case, 'curvatures in the main and sub-scanning directions may be different from one another in each of all the four surfaces of the two lenses'. The above-mentioned curvatures in the main and sub-scanning directions are curvatures in the main and sub-scanning sections including the optical axis (meaning the reference coordinate axis in the direction perpendicular to the main and sub-scanning directions, when the shape of the lens surface is determined by numerical formulas), but are paraxial curvatures when the shapes of the lens surfaces in the above-mentioned sections are non-arc shapes.

A spot diameter of a beam spot formed on the surface to be scanned may be defined by $1/e^2$ intensity in a line spread function of a light-intensity distribution of the beam spot. The central coordinate of the beam spot formed on the surface to be scanned is determined as a reference coordinate, and the light-intensity distribution of the beam spot is expressed by f(Y,Z) where the coordinates in the main and sub-scanning directions are determined as Y and Z.

Then, the line spread function LSZ in Z direction is defined by $$LSZ(Z) = \int f(Y,Z)dY \quad (4)$$

where the integration is performed through the entire width of the beam spot in Y direction.

The line spread function LSY in Y direction is defined by $$LSY(Y) = \int f(Y,Z)dZ \quad (5)$$

where the integration is performed through the entire width of the beam spot in Z direction.

The thus-defined line spread functions are of a Gaussian distribution type in general, and, therefore, the spot diameter in the sub-scanning direction is defined as the width in Z direction within which '$LSZ(Z) \leq 1/e^2$' when the maximum thereof is normalized to 1. The same manner is applied also for the main scanning direction.

Any of the above-described optical systems may have an imaging function set such that the spot diameter defined as described above in each of the main and sub-scanning directions is equal to or smaller than 50 µm in an effective writing width.

The spot diameter defined as described above by the line spread functions can be easily measured as a result of 'the beam spot being scanned by a slit at a uniform velocity, the light passing through the slit being received by a photodetector, and the amount of thus-received light being integrated'. A device performing such measurement has been put on the market.

In the related art, it is not easy to form a satisfactory beam spot having a spot diameter equal to or smaller than 50 µm. However, by employing at least one sub-non-arc surface in a scanning optical system, and making the shape of this surface be 'a shape such as to satisfactorily correcting wavefront aberration' as in the present invention, it is possible to positively form a satisfactory beam spot having a spot diameter equal to or smaller than 50 µm.

In any of the above-described scanning optical systems, 'a non-arc amount' of the non-arc shape in the sub-scanning section of the sub-non-arc surface may vary asymmetrically in the main scanning direction.

'The non-arc amount' is an amount of difference from an arc (paraxial curvature).

Any of the above-described scanning optical systems is preferably such that a curvature in the sub-scanning direction of each of at least two lens surfaces varies in the main scanning direction, and, the variation in the main scanning direction of the curvature in the sub-scanning direction of at least one surface of these at least two surfaces is asymmetrical (having no symmetrical axis for the main scanning direction), and the above-described lateral magnification $\beta_2$ in the sub-scanning direction at the central image height and lateral magnification $\beta_h$ in the sub-scanning direction at any image height satisfy the following condition:

$$0.9 \leq |\beta_h/\beta_2| \leq 1.1 \quad (2)$$

'The curvature in the sub-scanning direction' is a curvature of the lens surface in a sub-scanning section taken when the lens surface is cut by the sub-scanning section, and, 'the curvature in the sub-scanning direction varying in the main scanning direction' means that, when the position of the sub-scanning section is moved in the main scanning direction, the curvature in the sub-scanning direction varies according to the position of the sub-scanning section.

Any of the above-described scanning optical systems preferably satisfies the following condition:

$$Fs/W < 0.005 \quad (3)$$

where W denotes an effective writing width, and Fs denotes the width of sub-scanning curvature of field (being 'the curvature of field in the sub-scanning direction', through the specification and claims) in the effective writing width.

Any of the above-described scanning optical systems preferably has at least two lens surfaces in each of which variation of curvature in the sub-scanning direction is asymmetrical in the main scanning direction, and each of at least two lens surfaces of these at least two lens surfaces 'has an air separation between the surfaces'.

Any of the above-described scanning optical systems may be used in an optical scanning device in a single-beam system, but may also be used for 'condensing a plurality of beams deflected simultaneously so as to form a plurality of beam spots on a surface to be scanned'.

An optical scanning device according to the present invention is an optical scanning device in the single-beam system which 'couples a beam from a light source by a coupling lens to a subsequent optical system, forms from the coupled beam a line image long in the main scanning direction on or in the proximity of a deflection reflective surface of an optical deflector by a line-image forming optical system, deflects the beam at a uniform angular velocity by the optical deflector, condenses the deflected beam by a scanning optical system so as to form a beam spot on a surface to be scanned, and, thus, scans the surface to be scanned by the beam spot, wherein any of the above-described scanning optical systems is used as the scanning optical system of this optical scanning device'.

An optical scanning device according to another aspect of the present invention is an optical scanning device in the multi-beam system which 'couples beams from a plurality of light-emitting sources by a coupling lens to a subsequent optical system, forms from the coupled beams line images each long in the main scanning direction and separate in the sub-scanning direction on or in the proximity of a deflection reflective surface of an optical deflector by a line-image forming optical system, simultaneously deflects the beams at a uniform angular velocity by the optical deflector, condenses each deflected beam by a common scanning optical system so as to form beam spots separate in the sub-scanning direction on a surface to be scanned, and, thus, simultaneously scans the surface to be scanned by the plurality of beam spots so as to draw a plurality of scan lines thereon simultaneously, wherein any of the above-described scanning optical systems is used as the common scanning optical system of this optical scanning device'. Either coupling lenses may be provided individually for the plurality of beams or a coupling lens may be used in common for the plurality of beams.

In this optical scanning device in the multi-beam system, 'a monolithic semiconductor laser array having a plurality of light-emitting sources arranged so as to form a line' may be used as the light source.

In this case, it is preferable that each of the intervals of the light-emitting sources of the semiconductor laser array is equal to or larger than '10 µm'.

An image forming apparatus according to the present invention preferably 'forms a latent image by performing scanning of a photosensitive surface of a photosensitive medium by an optical scanning device, visualizes the latent image, and thus obtains an image', where any of the above-described optical scanning devices is used as the optical scanning device performing scanning of the photosensitive surface of the photosensitive medium.

In this case, a photoconductive photosensitive body may be used as the photosensitive medium, a toner image may be obtained from an electrostatic latent image formed by uniform changing of the photosensitive surface and scanning by the optical scanning device, and, thus, the latent image is visualized. The toner image is fixed onto a sheet-like recording medium (transfer paper or a plastic sheet for an overhead projector).

Such an image forming apparatus according to the present invention may also be embodied as a laser printer, a laser plotter, a digital copier, a facsimile machine, or the like.

Alternatively, a film for photography with silver halide may be used as the photosensitive medium, for example. In this case, the latent image formed through the optical scanning by the optical scanning device is visualized by a method of developing in an ordinary process of photography with silver halide. Such an image forming apparatus may be embodied as 'an optical plate-making system', for example.

'A practically usable range' of the lateral magnification β2 in the sub-scanning direction of the scanning optical system disposed subsequent to the optical deflector is as follows:

$$|\beta 2| \geq 0.5$$

When |β2| is smaller than 0.5, the lens on the side of the surface to be scanned approaches the surface to be scanned to much in general, and the length of the lens in the main scanning direction is long. Thereby, working of the lens is difficult, and the manufacturing cost of the lens is high. Further, it is difficult to secure 'the long back length'.

Further, when the optical system has a too large magnification (|β2|>2), change in position of image surface due to environmental change or error in mounting the scanning optical system is likely to be large, and to achieve a small diameter of beam spot is 'difficult even when a sub-non-arc surface is employed'.

As described above, the value $\beta_2$ at least at the central image height of the lateral magnification β2 in the sub-scanning direction of the scanning optical system is preferably such that:

$$0.5 \leq |\beta_2| \leq 2.0 \quad (1)$$

In the above-described multi-beam scanning optical system, in the sub-scanning direction, 'the negative and positive refracting powers are distributed' in the order from the optical deflector. Thereby, the optical system is of a so-called 'retrofocus type'.

Thereby, it is possible to dispose 'the rear principal point in the sub-scanning direction' on the side of the surface to be scanned from the actual disposition of the lenses. Accordingly, it is possible to 'elongate the back length'.

Further, as a result of the above-mentioned condition (1) being satisfied, it is possible to effectively prevent 'the length in the main scanning direction' of the lens on the side of the surface to be scanned from increasing and also 'the change in position of image surface due to environmental change or error in mounting of the scanning optical system' from increasing.

Further, because the scanning optical system is of 'the retrofocus type in the sub-scanning direction' as described above, it is possible to reduce 'the F-number'.

Further, in the scanning optical system, because at least one lens surface has 'a non-arc shape in a sub-scanning section' as mentioned above, it is possible to effectively causing the function of correcting wavefront aberration of this surface to be well performed. Thereby, it is possible to well reduce the diameter of beam spot, and to achieve high-density scanning.

This non-arc shape may be such that an amount of difference from an arc shape is uniform in the main scanning direction, but the above-mentioned surface may be preferably 'a sub-non-arc surface such that 'the non-arc shape of the surface varies according to the position of the sub-scanning section in the main scanning direction' as mentioned above so that the diameter of beam spot is well reduced through the effective writing width.

Further, as a result of a positive refracting power in the main scanning direction being given to the lens on the optical deflector of the scanning optical system, 'uniform-velocity characteristics' such as fθ characteristic are secured.

In order to well correct wavefront aberration through the entire pupil plane (the section of light flux on the sub-nonarc surface of the deflected light flux incident on the sub-non-arc surface at any position), and to obtain a more stable beam spot, it is preferable that 'the sub-non-arc surface has a non-arc shape also in the main scanning section' as described above.

Further, as a result of the scanning optical system being anamorphic as described above, it is possible to correct surface inclination in the optical deflector. In this case, it is possible to prevent a scan line from bending much as a result of curvatures in the main and sub-scanning directions being caused to differ in each of all the four lens surfaces of the two lenses as described above.

In order to perform satisfactory scanning, it is important that the diameter (in particular, the diameter in the sub-scanning direction because, although correction of the diameter in the main scanning direction can be made through electric correction of a resulting signal, such correction of the diameter in the sub-scanning direction cannot be made) of beam spot on the surface to be scanned does not change much according to the image height. This matter is important in particular for scanning in high density.

In order that 'the diameter in the sub-scanning direction of the beam spot on the surface to be scanned does not change much according to the image height', it is necessary that the lateral magnification in the sub-scanning direction of the scanning optical system does not change much according to the image height.

Further, change of lateral magnification $\beta 2$ in the sub-scanning direction according to the image height problematically results in 'change of the pitch of the scan lines made by simultaneous scanning (referred to as scan-line pitch, hereinafter) according to image height' in the multi-beam system.

Accordingly, in the scanning optical system in the multi-beam system, in order to prevent 'change of scan-line pitch according to image height (simply referred to as 'pitch change', hereinafter)', it is necessary to 'make a correction such that the lateral magnification in the sub-scanning direction of the scanning optical system becomes uniform whatever the image height is'.

This can be achieved as a result of curvature in the sub-scanning direction being caused to change in the main scanning direction in each of at least two lens surfaces of the two lenses of the scanning optical system, and the bending in the sub-scanning direction thereof 'adjusting the position of principal point in the sub-scanning direction according to image height'.

Further, when a polygon mirror is used as the optical deflector, the rotation center of the polygon mirror is set to be different from the optical axis of the scanning optical system. Accordingly, the reflecting point on the deflection reflective surface changes according to the beam deflection, and the starting point of deflection of the deflected light flux changes. Thus, 'optical sag' occurs.

Thereby, the path the light flux passes through on the side of + image height of the optical axis of the scanning optical system is different from that on the side of − image height of the optical axis of the scanning optical system. Accordingly, the lateral magnification in the sub-scanning direction 'changes asymmetrically in the main scanning direction'.

This asymmetrical change in lateral magnification can be corrected as a result of at least one surface of the above-mentioned two lens surfaces being made to be 'a surface in which change in sub-scanning curvature is asymmetrical'. 'The sub-scanning curvature' is the above-mentioned 'curvature in a sub-scanning section'.

'The surface in which change in sub-scanning curvature is asymmetrical' is, for example, a surface in which:

(a) change in sub-scanning curvature is such that the curvature monotonously increases bilaterally-asymmetrically as being apart from the optical axis in the main scanning direction;

(b) change in sub-scanning curvature is such that the curvature monotonously decreases bilaterally-asymmetrically as being apart from the optical axis in the main scanning direction;

(c) change in sub-scanning curvature is such that the extremum of curvature exists out of the optical axis;

(d) change in sub-scanning curvature is such that the curvature monotonously increases from the side of + image height to the side of − image height;

(e) change in sub-scanning curvature is such that the curvature monotonously decreases from the side of + image height to the side of − image height;

(f) change in sub-scanning curvature is such that there are a plurality of extrema of curvature;

or the like. However, 'the surface in which change in sub-scanning curvature is asymmetrical' may be any surface 'having no general axis of rotational symmetry as the optical axis'.

Which of these surfaces is to be employed as 'the surface in which change in sub-scanning curvature is asymmetrical' is determined according to design conditions.

Whether in the single-beam system or multi-beam system, it is preferable that 'the change of lateral magnification in the sub-scanning direction' in the effective scanning range is equal to or smaller than 10%. More preferably, it is equal to or smaller than 7%. 'Change of lateral magnification in the sub-scanning direction' equal to or smaller than 10% is achieved as a result of the above-mentioned condition (2) being satisfied.

In the case of the multi-beam optical scanning, when change of lateral magnification in the sub-scanning direction is equal to or smaller than 7%, pitch change is 10.37 μm for the simultaneous scan-line pitch of 148.19 μm even when 'seventh-order interlaced scanning in 1200 dpi' is performed, and it is possible that the pitch change is approximately half the adjacent pitch of 21.17 μm in 1200 dpi.

The condition in which the pitch change is 'approximately half the adjacent pitch' in interlaced scanning is the allowable limit for change in scan-line pitch. In the case of fifth-order interlaced scanning or third-order interlaced scanning, it is possible that the pitch change is smaller.

Further, due to influence of 'optical sag', the amount of wavefront aberration occurring differs asymmetrically according to image height of beam spot. However, the wavefront aberration asymmetrical in the main scanning direction due to the above-mentioned sag can be corrected, and the optimum wavefront aberration can be set for each image height, as a result of change in the main scanning direction of the non-arc amount of the sub-non-arc surface of the scanning optical system being made to be asymmetrical as described above.

It is also important that the position of beam waist in the sub-scanning direction of the beam spot on the surface to be scanned does not change much according to image height for performing satisfactory scanning. In order that 'the position of beam waist in the sub-scanning direction of the beam spot on the surface to be scanned does not change much according to image height', it is necessary that the amount of curvature of field in the sub-scanning direction of the scanning optical system does not change much according to image height.

As a result of the above-mentioned condition (3) being satisfied, the amount of curvature of field in the sub-scanning direction at each image height is prevented from increasing.

The amount of curvature of field in the sub-scanning direction should not necessarily satisfy the condition (3). In the scanning optical system, other optical characteristics such as uniform-velocity characteristics for making uniform the speed of the movement of beam spot on the surface to be scanned are required to be satisfactory. Accordingly, correction of curvature of field should be made in consideration of balance with correction of other optical characteristics. There is a case where, when only the curvature of field is attempted to be improved, this is unreasonable in consideration of balance with other optical characteristics.

Further, when tolerance in assembly of the optical scanning device with respect to the photosensitive medium as the surface to be scanned is considered, satisfactory reduction of curvature of field on design may not be achieved, if the position of the surface to be scanned shifts from the position on design due to the above-mentioned tolerance even when the curvature of field in the scanning optical system is well corrected on design.

Such problems can be solved as a result of 'the sub-non-arc surface' being made to have 'a function of correcting a positional difference of beam waist with respect to the surface to be scanned occurring due to curvature of field in the sub-scanning direction'.

That is, by employing 'the sub-non-arc surface', a correction can be made such that the beam waists of 'all the light fluxes (beams)' approach the surface to be scanned even when paraxial imaging points (positions of imaging of paraxial light fluxes) in the sub-scanning direction differ with respect to the surface to be scanned for respective image heights due to curvature of field in the sub-scanning direction. By this correction, it is possible to effectively correct change in diameter of beam spot in the sub-scanning direction.

In order that the above-mentioned condition (3) is satisfied, it is necessary to consider 'optical sag' for curvature of field in the sub-scanning direction. 'Influence of optical sag on sub-scanning curvature of field' does not necessarily coincide with 'influence of the optical sag on change of lateral magnification in the sub-scanning direction of the scanning optical system'.

Accordingly, it is preferable that 'a surface in which change in sub-scanning curvature thereof is asymmetrical' is employed by each of at least two lens surfaces for correcting asymmetricity of sub-scanning curvature of field and for correcting asymmetricity of change in lateral magnification.

When each of at least two lens surfaces is such that 'a curvature thereof in the sub-scanning direction changes asymmetrically in the main scanning direction, and the position of principal point in the sub-scanning direction of the scanning optical system is adjusted as a result of the bending in the sub-scanning direction being made', it is possible to enlarge the amount of change of position of the principal point, and, it is possible to enlarge the range in which the lateral magnification in the sub-scanning direction can be adjusted by the bending and the sub-scanning curvature of field can be adjusted, as a result of the surface separation between the two lens surfaces being larger.

Therefore, the at least two surfaces have an air separation therebetween as described above, so that the surface separation between these two lens surfaces is larger in the scanning optical system.

Further, as a result of the configuration from the line-image forming optical system to the scanning optical system being used in common for a plurality of coupled beams in 'the above-described optical scanning device in the multi-beam system', it is possible to configure the configuration including and subsequent to the line-image forming optical system to be the same as that for the optical scaling device in the single-beam system. Accordingly, it is possible to achieve an optical scanning device in the multi-beam system very stable against structural changes.

In the case of opitcal scanning device in the multi-beam system, a light source either of LD-array system or of beam-combining system can be used. When a light source in the LD-array system is used, it is necessary that the intervals between light-emitting sources are large to some existent so as to remove influence of thermal/electrical mutual actions in the light-emitting sources. By making each the intervals between the light-emitting sources of semiconductor laser array to be equal to or larger than 10 μm as mentioned above, it is possible to effectively reduce the influence of thermal/electrical mutual actions in the light-emitting sources and to perform satisfactory multi-beam scanning.

Other objects and further features of the present invention will become more apparent from the following detailed description when read in conjunction with the accompanying drawings.

DETAILED DESCRIPTION OF THE PREFERRED EMBODIMENTS

Figure 31:
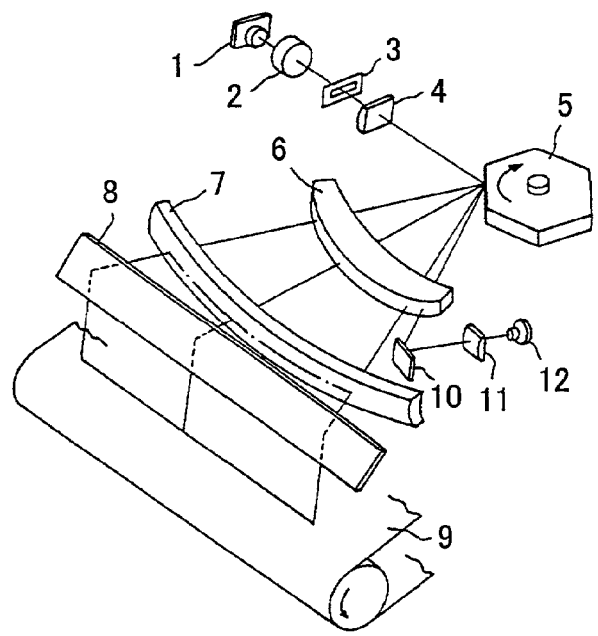
FIG. 31 shows an optical scanning device in a single-beam system in a first embodiment of the present invention.

FIG. 31 shows only essential part of an optical scanning device in a first embodiment of the present invention.

The optical scanning device shown in FIG. 31 is of a single-beam system.

A beam emitted from a light source 1 which is a semiconductor laser is a divergent light flux, and is coupled to a subsequent optical system by a coupling lens 2. The form of the beam obtained from the coupling lens 2 may be any of a weak divergent light flux, a weak convergent light flux and a parallel light flux according to the optical characteristics of the subsequent optical system.

The beam having passed through the coupling lens 2 is 'beam-shaped' as a result of periphery thereof being cut by an aperture 3 when passing through an opening of the aperture 3, and, then, is incident on a cylindrical lens 4 which is 'a line-image forming optical system'.

The cylindrical lens 4 is disposed in such a manner that the direction of the cylindrical lens 4 in which the lens has no power coincides with main scanning direction, and the lens 4 has a positive power in sub-scanning direction.

The cylindrical lens 4 condenses the incident beam in the sub-scanning direction to a position on or in the proximity of a deflection reflective surface of a polygon mirror 5 which is 'an optical deflector'.

The beam reflected by the deflection reflective surface is deflected at a uniform angular velocity with a uniform-velocity rotation of the polygon mirror 5, and, passes through two lenses 6 and 7 constituting 'a scanning optical system', has the light path thereof bent by a bending mirror 8, is condensed so as to form a beam spot on a photoconductive photosensitive body 9 which is 'a surface to be scanned', and scans the surface to be scanned.

The beam is incident on a mirror 10 in prior to the scanning, is condensed by a lens 11, and is incident on a light-receiving device 12. Based on an output of the light-receiving device 12, writing beginning timing is determined.

Figure 32:
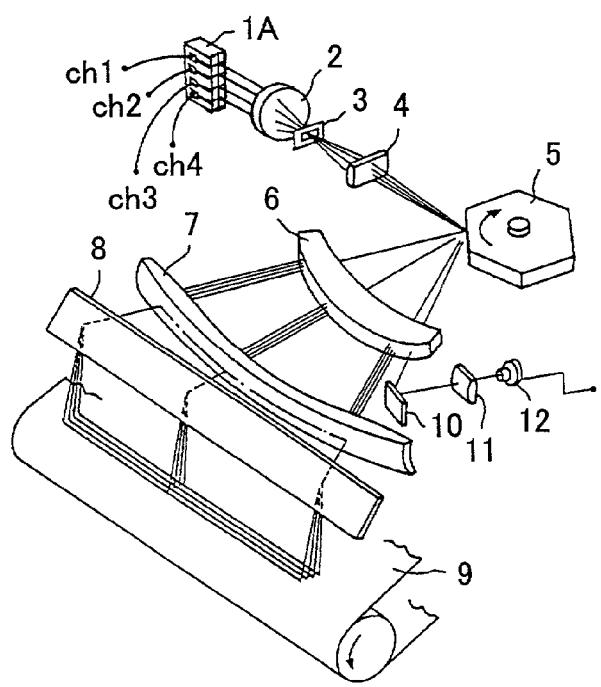
FIG. 32 shows an optical scanning device in a multi-beam system in a second embodiment of the present invention.

FIG. 32 shows only essential part of an optical scanning device in a second embodiment of the present invention.

The optical scanning device shown in FIG. 32 is of a multi-beam system.

In order to avoid complexity, the same reference numerals as those in FIG. 31 are given to those such that it is believed that they have no anxiety of confusion.

A semiconductor-laser array 1A has four light-emitting sources ch1 through ch4 arranged to form a line with equal intervals.

In the second embodiment, the four light-emitting sources of the semiconductor-laser array 1A are arranged in the sub-scanning direction. However, it is also possible that the four light-emitting sources of the semiconductor-laser array 1A are arranged in the main scanning direction as a result of it being inclined.

Four beams emitted from the four light-emitting sources ch1 through ch4 are divergent light fluxes each having 'an ellipse far-field pattern', the major axis of which extends in the main scanning direction, respectively.

Those four beams are coupled to a subsequent optical system by a coupling lens 2 used for the four beams in common. The form of each beam obtained from the coupling lens 2 may be any of a weak divergent light flux, a weak convergent light flux and a parallel light flux according to the optical characteristics of the subsequent optical system.

The four beam having passed through the coupling lens 2 are 'beam-shaped' as a result of periphery thereof being cut by an aperture 3 when passing through an opening of the aperture 3, and, then, are incident on a cylindrical lens 4 which is 'a common line-image forming optical system'.

The cylindrical lens 4 condenses each the incident four beams in the sub-scanning direction so that line images each long in the main scanning direction and separate in the sub-scanning direction from each other are formed as a result of thus being condensed on or in the proximity of a deflection reflective surface of a polygon mirror 5 which is 'an optical deflector'.

The four beams reflected by the deflection reflective surface are deflected at a uniform angular velocity with a uniform-velocity rotation of the polygon mirror 5, and, pass through two lenses 6 and 7 constituting 'a scanning optical system', have the light paths thereof bent by a bending mirror 8, are condensed so as to form four beam spots separate in the sub-scanning direction from each other on a photoconductive photosensitive body 9 which is 'a surface to be scanned', and scan the surface to be scanned so as to draw four scan lines thereon simultaneously.

One of the beams is incident on a mirror 10 in prior to the scanning, is condensed by a lens 11, and is incident on a light-receiving device 12. Based on an output of the light-receiving device 12, writing beginning timing of the four beams is determined.

'The scanning optical system' is an optical system which condenses four beams simultaneously deflected by the optical deflector 5 so as to form four beam spots on the surface 9 to be scanned, and consists of the two lenses 6 and 7.

Figure 33:
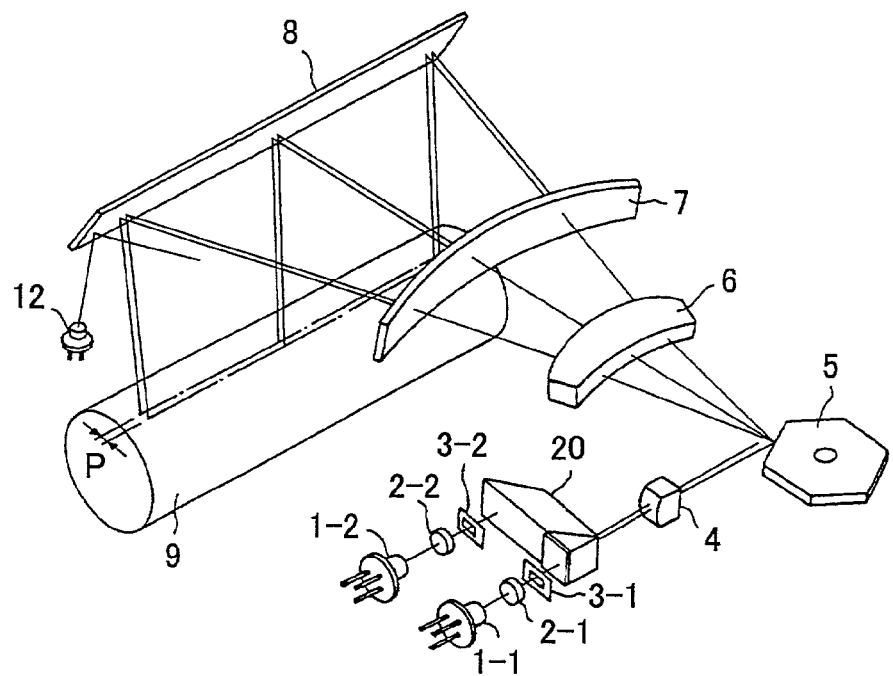
FIG. 33 shows an optical scanning device in a multi-beam system in a third embodiment of the present invention.

FIG. 33 shows only essential part of an optical scanning device in a third embodiment of the present invention.

The optical scanning device shown in FIG. 33 is also of a multi-beam system.

This optical scanning device employs light sources in a beam-combining system.

The light sources 1-1 and 1-2 are semiconductor lasers, and have single light-emitting sources, respectively.

Respective beams emitted from the light sources 1-1 and 1-2 are coupled to a subsequent optical system by coupling lenses 2-1 and 2-2, respectively. The form of each of the beams obtained from the coupling lenses 2-1 and 2-2 may be any of a weak divergent light flux, a weak convergent light flux and a parallel light flux according to the optical characteristics of the subsequent optical system.

The respective beams having passed through the coupling lenses 2-1 and 2-2 are 'beam-shaped' as a result of peripheries thereof being cut off by apertures 3-1 and 3-2 when passing through openings of the apertures 3-1 and 3-2, respectively, and, then, are incident on a beam-combining prism 20.

The beam-combining prism 20 has a reflective surface, a polarization separating film and a ½-wavelength plate.

The beam from the light source 1-2 is reflected by the reflective surface and polarization separating film of the beam-combining prism 20, and exits from the beam-combining prism 20. On the other hand, the beam from the light source 1-1 has the polarization plane thereof rotated 90° by the ½-wavelength plate of the beam-combining prism 20, is transmitted by the polarization separating film, and exits from the beam-combining prism 20. Thus, the two beams are combined.

As a result of the position relationship of the light-emitting parts of the light sources 1-1 and 1-2 with respect to the optical axes of the coupling lenses 2-1 and 2-2 being adjusted, the thus-combined two beams have a slight angle formed therebetween in the sub-scanning direction.

The thus-combined two beams are incident on a cylindrical lens 4 which is 'a common line-image forming optical system'.

The cylindrical lens 4 condenses each the incident two beams in the sub-scanning direction so that two line images each long in the main scanning direction and separate in the sub-scanning direction from each other are formed as a result of thus being condensed on or in the proximity of a deflection reflective surface of a polygon mirror 5 which is 'an optical deflector'.

The two beams reflected by the deflection reflective surface are deflected at a uniform angular velocity with a uniform-velocity rotation of the polygon mirror 5, and, pass through two lenses 6 and 7 constituting 'a scanning optical system', have the light paths thereof bent by a bending mirror 8, converge so as to form two beam spots separate in the sub-scanning direction from each other on a photoconductive photosensitive body 9 which is 'a surface to be scanned', and scan the surface to be scanned so as to draw two scan lines thereon simultaneously.

One of these beams is reflected by the mirror 8 in prior to the optical scanning, and is incident on a light-receiving device 12. Based on an output of the light-receiving device 12, writing beginning timing of the optical scanning by the two beams is determined.

Instead thereof, it is also possible to separate the two beams also in the main scanning direction, condense each beam to light-receiving device 12 in prior to the optical scanning, and, based on outputs of the light-receiving device 12, determine writing beginning timings of the optical scanning by the two beams, individually.

'The scanning optical system' is an optical system which condenses two beams simultaneously deflected by the optical deflector 5 so as to form two beam spots on the surface 9 to be scanned, and consists of the two lenses 6 and 7.

Six concrete examples of these embodiments will now be described.

A shape of a lens surface will be expressed by the following expressions in each example.

A non-arc shape in the main scanning section is expressed by the following polynominal (6) using a radius Rm of paraxial curvature, a distance Y in the main scanning direction from the optical axis, a conical constant K, high-order coefficients $A_1, A_2, A_3, A_4, A_5, A_6, \ldots$, a depth X in the direction of optical axis:

$$X=(Y^2/R_m)/[1+\sqrt{\{1-(1+K)(Y/R_m)^2\}}]+A^1Y+A_2Y^2+A_3Y^3+A_4Y^4+A_5Y^5+A_6Y^6 \ldots \quad (6)$$

In the polynominal (6), when any of the odd-order coefficients $A_1, A_3, A_5, \ldots$ has a value other than 0, the non-arc shape is 'asymmetrical in the main scanning direction'.

A curvature in a sub-scanning section is expressed by the following expression (7) when the curvature in a sub-scanning section varies in the main scanning direction (expressed by coordinate Y assuming the position of optical axis as the origin):

$$Cs(Y)=\{1/R_S(0)\}+B_1Y+B_2Y^2+B_3Y^3+B_4Y^4+B_5Y^5+B_6Y^6+\ldots \quad (7)$$

where Rs(0) denotes a radius of curvature 'in the sub-scanning section on the optical axis (Y=0)'. In the expression (7), when any of the odd-order coefficients $B_1, B_3, B_5, \ldots$ has a value other than 0, the curvature in a sub-scanning section varies asymmetrically in the main scanning direction.

A sub-non-arc surface is expressed by the following expression (8) using a position (coordinate assuming the position of optical axis as the origin) Y in the main scanning direction of a sub-scanning section, a coordinate Z in the sub-scanning direction:

$$X=(Y^2/R_m)/[1+\sqrt{\{1-(+K)(Y/R_m)^2\}}]$$
$$+A_1Y+A_2Y^2+A_3Y^3+A_4Y^4+A_5Y^5+A_6Y^6 \ldots$$
$$+(C_s\cdot Z^2)/[1+\sqrt{\{1-(1+K_s)(C_s\cdot Z)^2\}}]$$
$$+(F_0+F_1Y+F_2Y^2+F_3Y^3+F_4Y^4+\ldots)Z$$
$$+(G_0+G_1Y+G_2Y^2+G_3Y^3+G_4Y^4+\ldots)Z^2$$
$$+(H_0+H_1Y+H_2Y^2+H_3Y^3+H_4Y^4+\ldots)Z^3$$
$$+(I_0+I_1Y+I_2Y^2+I_3Y^3+I_4Y^4+\ldots)Z^4$$
$$+(J_0+J_1Y+J_2Y^2+J_3Y^3+J_4Y^4+\ldots)Z^5$$
$$+(K_0+K_1Y+K_2Y^2+K_3Y^3+K_4Y^4+\ldots)Z^6$$
$$+(L_0+L_1Y+L_2Y^2+L_3Y^3+L_4Y^4+\ldots)Z^7$$
$$+(M_0+M_1Y+M_2Y^2+M_3Y^3+M_4Y^4+\ldots)Z^8$$
$$+(N_0+N_1Y+N_2Y^2+N_3Y^3+N_4Y^4+\ldots)Z^9$$
$$+\ldots \quad (8)$$

where 'Cs' in the expression (8) is Cs(Y) defined by the expression (7). 'Ks' is defined by the following expression (9):

$$Ks(Y)=K_s(0)+C_1Y+C_2Y^2+C_3Y^3+C_4Y^4+C_5Y^5+\ldots \quad (9)$$

When any of $F_1, F_3, F_5, \ldots, G_1, G_3, G_5, \ldots$, and so forth has a value other than 0, the non-arc amount in a sub-scanning section varies asymmetrical in the main scanning direction.

The sub-non-arc surface is 'a surface in which a shape thereof in a sub-scanning section is a non-arc shape, and the non-arc shape varies according to the position of the sub-scanning section in the main scanning direction'.

In the above expression (8), the first and second lines of the right side are a function of only the coordinate Y in the main scanning direction and express 'the shape in the main scanning section'.

With regard to the lines including and subsequent to the third line of the right side in the expression (8), the coefficient of the term of Z in each degree (order number) is determined when the Y coordinate of a sub-scanning section is determined, and, then, 'the non-arc shape in the sub-scanning section' at the coordinate Y is determined.

Analytic expressions of the sub-non-arc shape and so forth are not limited to those mentioned above, and may be various ones, and the shapes of the sub-non-arc surface and so forth according to the present invention are not limited to ones expressed by the above-mentioned expressions.

An example 1 according to the present invention will now be described.

The example 1 is an example of the optical scanning device in the first embodiment shown in FIG. 31.

Figure 1:
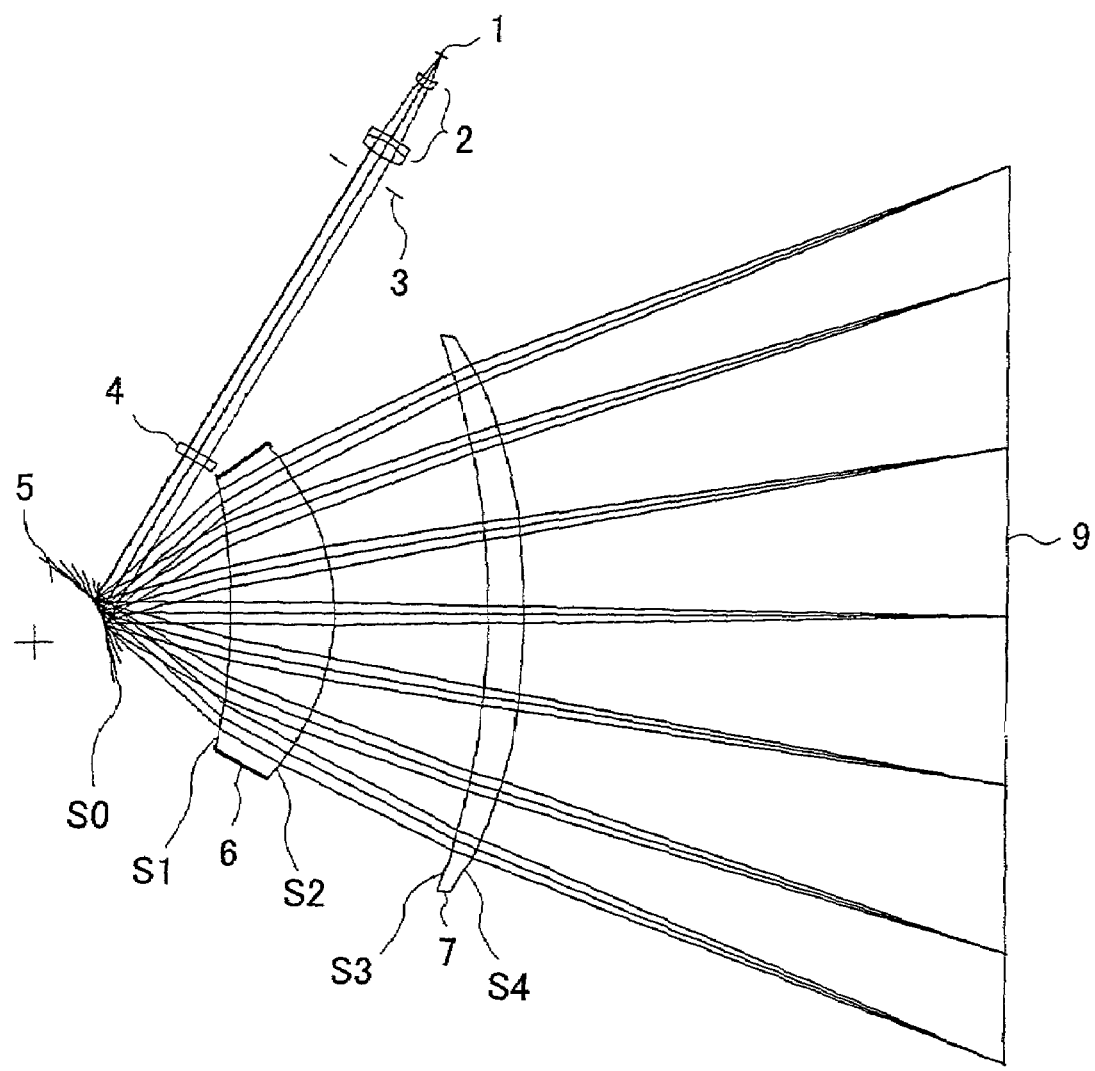
FIG. 1 shows an optical disposition of an scanning optical system in an example 1 according to the present invention.

FIG. 1 shows an optical disposition of the example 1 from the light source 1 to the surface 9 to be scanned.

Data concerning the configuration shown in FIG. 1 is as follows:

the light source 1: a semiconductor laser;

the number of light-emitting sources of the light source 1: 1;

the wavelength of the light source 1: 655 nm;

the coupling lens 2: a configuration of two groups of three lenses (the second group consisting of joined lenses);

the focal length of the coupling lens 2: 22 mm;

the coupling function of the coupling lens 2: collimating function;

the aperture 3: the shape of opening: a rectangle;

the opening width in the main scanning direction of the aperture 3: 7.6 mm;

the opening width in the sub-scanning direction of the aperture 3: 2.8 mm;

the cylindrical lens 4: the focal length in the sub-scanning direction: 70 mm; and the polygon mirror 5: the number of deflection reflective surfaces: 5, the radius of inscribed circle: 25 mm, the incidence angle (angle formed between the incidence direction and the optical axis of the scanning optical system in a condition in which projection is made onto a plane perpendicular to the sub-scanning direction) of beam from the side of light source: 60°.

Data concerning the optical system disposed between the polygon mirror and the surface to be scanned will now be described.

In the table below, 'Rm' denotes a radius (in millimeters) of curvature in the main scanning direction, 'Rs' denotes a radius (in millimeters) of curvature in the sub-scanning direction, 'n' denotes a refractive index, 'fm' denotes a focal length (in millimeters) of the lens in the main scanning direction, and 'fs' denotes a focal length (in millimeters) of the lens in the sub-scanning direction. Each of 'Rm and Rs' in the following data is 'a radius of paraxial curvature' for a shape other than an arc shape. X denotes a surface separation (in millimeters). Y denotes a shift amount (in millimeters) ('a difference in the main scanning direction' of the optical axis of the lens from the chief ray of the deflected beam from the polygon mirror 5 perpendicular to the scan line, where the upward direction in FIG. 1 is assumed to be the positive direction). 'i' denotes a surface number.

| | i | $R_{mi}$ | $R_{si}(0)$ | X | Y | n | $f_m$ | $f_s$ |
|---|---|---|---|---|---|---|---|---|
| DEFLECTION REFLECTIVE SURFACE | S0 | ∞ | ∞ | 45.53 | 0.77 | | | |
| LENS 6 | S1 | −254.44 | −44.08 | 36.22 | 0 | 1.52716 | 214.376 | −729.461 |
| | S2 | −82.10 | −63.91 | 53.34 | 0.762 | | | |
| LENS 7 | S3 | −271.24 | −35.66 | 12.50 | 0 | 1.52716 | −1.78E10 | 80.972 |
| | S4 | −275.56 | −21.78 | 168.62 | 0 | | | |

The values of the coefficients for the main scanning direction and sub-scanning direction of the respective lens surfaces are shown in the following tables 1 through 4.

TABLE 1

| SURFACE NUMBER | COEFFICIENTS FOR MAIN SCANNING DIRECTION | | COEFFICIENTS FOR SUB-SCANNING DIRECTION | |
|---|---|---|---|---|
| S1 | K | $8.483 \times 10^{-1}$ | $B_1$ | 0 |
| | $A_1$ | 0 | $B_2$ | $2.875 \times 10^{-6}$ |
| | $A_2$ | 0 | $B_3$ | 0 |
| | $A_3$ | 0 | $B_4$ | $-2.303 \times 10^{-9}$ |
| | $A_4$ | $8.155 \times 10^{-8}$ | $B_5$ | 0 |
| | $A_5$ | 0 | $B_6$ | $1.236 \times 10^{-12}$ |
| | $A_6$ | $1.118 \times 10^{-11}$ | $B_7$ | 0 |
| | $A_7$ | 0 | $B_8$ | $-4.502 \times 10^{-17}$ |
| | $A_8$ | $-3.007 \times 10^{-14}$ | $B_9$ | 0 |
| | $A_9$ | 0 | $B_{10}$ | $-2.430 \times 10^{-19}$ |
| | $A_{10}$ | $3.396 \times 10^{-18}$ | $B_{11}$ | 0 |
| | $A_{11}$ | 0 | $B_{12}$ | $5.516 \times 10^{-23}$ |

TABLE 2

| SURFACE NUMBER | COEFFICIENTS FOR MAIN SCANNING DIRECTION | | COEFFICIENTS FOR SUB-SCANNING DIRECTION | |
|---|---|---|---|---|
| S2 | K | $-1.954 \times 10^{-1}$ | $B_1$ | $1.488 \times 10^{-5}$ |
| | $A_1$ | 0 | $B_2$ | $5.889 \times 10^{-7}$ |
| | $A_2$ | 0 | $B_3$ | $-1.790 \times 10^{-9}$ |
| | $A_3$ | 0 | $B_4$ | $4.014 \times 10^{-12}$ |
| | $A_4$ | $1.523 \times 10^{-7}$ | $B_5$ | $2.035 \times 10^{-12}$ |
| | $A_5$ | 0 | $B_6$ | $8.080 \times 10^{-14}$ |
| | $A_6$ | $1.118 \times 10^{-11}$ | $B_7$ | $-1.975 \times 10^{-15}$ |
| | $A_7$ | 0 | $B_8$ | $4.152 \times 10^{-17}$ |
| | $A_8$ | $1.934 \times 10^{-15}$ | $B_9$ | $8.914 \times 10^{-19}$ |
| | $A_9$ | 0 | $B_{10}$ | $-2.216 \times 10^{-20}$ |
| | $A_{10}$ | $-1.984 \times 10^{-18}$ | $B_{11}$ | $-1.434 \times 10^{-22}$ |
| | $A_{11}$ | 0 | $B_{12}$ | $2.556 \times 10^{-24}$ |

TABLE 3

| SURFACE NUMBER | COEFFICIENTS FOR MAIN SCANNING DIRECTION | | COEFFICIENTS FOR SUB-SCANNING DIRECTION | |
|---|---|---|---|---|
| S3 | K | −5.978 | $B_1$ | $5.939 \times 10^{-6}$ |
| | $A_1$ | 0 | $B_2$ | $2.284 \times 10^{-7}$ |
| | $A_2$ | 0 | $B_3$ | $-3.624 \times 10^{-10}$ |
| | $A_3$ | 0 | $B_4$ | $9.155 \times 10^{-11}$ |
| | $A_4$ | $2.149 \times 10^{-8}$ | $B_5$ | $-7.399 \times 10^{-15}$ |
| | $A_5$ | 0 | $B_6$ | $1.161 \times 10^{-15}$ |
| | $A_6$ | $-1.430 \times 10^{-12}$ | $B_7$ | $1.089 \times 10^{-18}$ |
| | $A_7$ | 0 | $B_8$ | $-3.337 \times 10^{-19}$ |
| | $A_8$ | $-1.519 \times 10^{-16}$ | $B_9$ | $-6.789 \times 10^{-22}$ |
| | $A_9$ | 0 | $B_{10}$ | $-2.143 \times 10^{-23}$ |
| | $A_{10}$ | $-1.502 \times 10^{-22}$ | $B_{11}$ | $1.458 \times 10^{-25}$ |
| | $A_{11}$ | 0 | $B_{12}$ | $-3.776 \times 10^{-28}$ |
| | $A_{12}$ | $-4.996 \times 10^{-25}$ | $B_{13}$ | $1.263 \times 10^{-29}$ |
| | $A_{13}$ | 0 | $B_{14}$ | $3.511 \times 10^{-31}$ |
| | $A_{14}$ | $1.550 \times 10^{-29}$ | $B_{15}$ | $-5.135 \times 10^{-33}$ |
| | $A_{15}$ | 0 | $B_{16}$ | $9.063 \times 10^{-35}$ |
| | $A_{16}$ | $1.456 \times 10^{-33}$ | $B_{17}$ | $3.064 \times 10^{-37}$ |
| | $A_{17}$ | 0 | $B_{18}$ | $-4.325 \times 10^{-39}$ |

TABLE 4

| SURFACE NUMBER | COEFFICIENTS FOR MAIN SCANNING DIRECTION | | COEFFICIENTS FOR SUB-SCANNING DIRECTION | |
|---|---|---|---|---|
| S4 | K | −4.942 | $B_1$ | 0 |
| | $A_1$ | 0 | $B_2$ | $7.330 \times 10^{-8}$ |
| | $A_2$ | 0 | $B_3$ | 0 |
| | $A_3$ | 0 | $B_4$ | $-5.385 \times 10^{-11}$ |
| | $A_4$ | $-7.860 \times 10^{-8}$ | $B_5$ | 0 |
| | $A_5$ | 0 | $B_6$ | $5.086 \times 10^{-15}$ |
| | $A_6$ | $8.917 \times 10^{-13}$ | $B_7$ | 0 |
| | $A_7$ | 0 | $B_8$ | $-7.013 \times 10^{-19}$ |
| | $A_8$ | $-7.188 \times 10^{-17}$ | $B_9$ | 0 |
| | $A_9$ | 0 | $B_{10}$ | $1.434 \times 10^{-22}$ |
| | $A_{10}$ | $-3.287 \times 10^{-21}$ | $B_{11}$ | 0 |
| | $A_{11}$ | 0 | $B_{12}$ | $-1.122 \times 10^{-26}$ |
| | $A_{12}$ | $-2.836 \times 10^{-25}$ | $B_{13}$ | 0 |
| | $A_{13}$ | 0 | $B_{14}$ | $-5.235 \times 10^{-31}$ |
| | $A_{14}$ | $-1.853 \times 10^{-29}$ | $B_{15}$ | 0 |
| | $A_{15}$ | 0 | $B_{16}$ | $8.713 \times 10^{-35}$ |
| | $A_{16}$ | $-1.004 \times 10^{-33}$ | $B_{17}$ | 0 |
| | $A_{17}$ | 0 | $B_{18}$ | $1.469 \times 10^{-39}$ |

The values of the coefficients for the sub-scanning direction of the exit surface (S4) of the lens 7 are shown in the following table 5. In the table 5, '$C_0$' denotes '$Ks(0)$' in the first term of the right side of the expression (9).

TABLE 5

| S4 | $C_0$ | $-3.004 \times 10^{-1}$ | $I_0$ | $5.323 \times 10^{-6}$ | $K_0$ | $-5.157 \times 10^{-9}$ |
|---|---|---|---|---|---|---|
| | $C_1$ | $-1.233 \times 10^{-4}$ | $I_1$ | $-6.414 \times 10^{-10}$ | $K_1$ | $-3.159 \times 10^{-11}$ |
| | $C_2$ | $-1.560 \times 10^{-6}$ | $I_2$ | $-4.448 \times 10^{-11}$ | $K_2$ | $2.501 \times 10^{-12}$ |

TABLE 5-continued

| | | | | | |
|---|---|---|---|---|---|
| $C_3$ | $6.955 \times 10^{-8}$ | $I_3$ | $5.560 \times 10^{-13}$ | $K_3$ | $1.988 \times 10^{-14}$ |
| $C_4$ | $1.820 \times 10^{-9}$ | $I_4$ | $-6.753 \times 10^{-15}$ | $K_4$ | $-5.843 \times 10^{-16}$ |
| $C_5$ | $-2.397 \times 10^{-11}$ | $I_5$ | $-2.613 \times 10^{-16}$ | $K_5$ | $-4.901 \times 10^{-18}$ |
| $C_6$ | $-5.993 \times 10^{-13}$ | $I_6$ | $6.533 \times 10^{-18}$ | $K_6$ | $8.253 \times 10^{-20}$ |
| $C_7$ | $2.176 \times 10^{-15}$ | $I_7$ | $2.700 \times 10^{-20}$ | $K_7$ | $4.951 \times 10^{-22}$ |
| $C_8$ | $5.690 \times 10^{-17}$ | $I_8$ | $-7.248 \times 10^{-22}$ | $K_8$ | $-6.723 \times 10^{-24}$ |
| $C_9$ | $-5.922 \times 10^{-20}$ | $I_9$ | $-8.006 \times 10^{-25}$ | $K_9$ | $-1.765 \times 10^{-26}$ |
| $C_{10}$ | $-1.667 \times 10^{-21}$ | $I_{10}$ | $2.252 \times 10^{-26}$ | $K_{10}$ | $2.256 \times 10^{-28}$ |

The lateral magnification $\beta_2$ of the scanning optical system in the example 1 in the sub-scanning direction at the central image height is as follows:

$$\beta_2 = 1.116$$

and it satisfies the above-mentioned condition (1).

Figure 4:
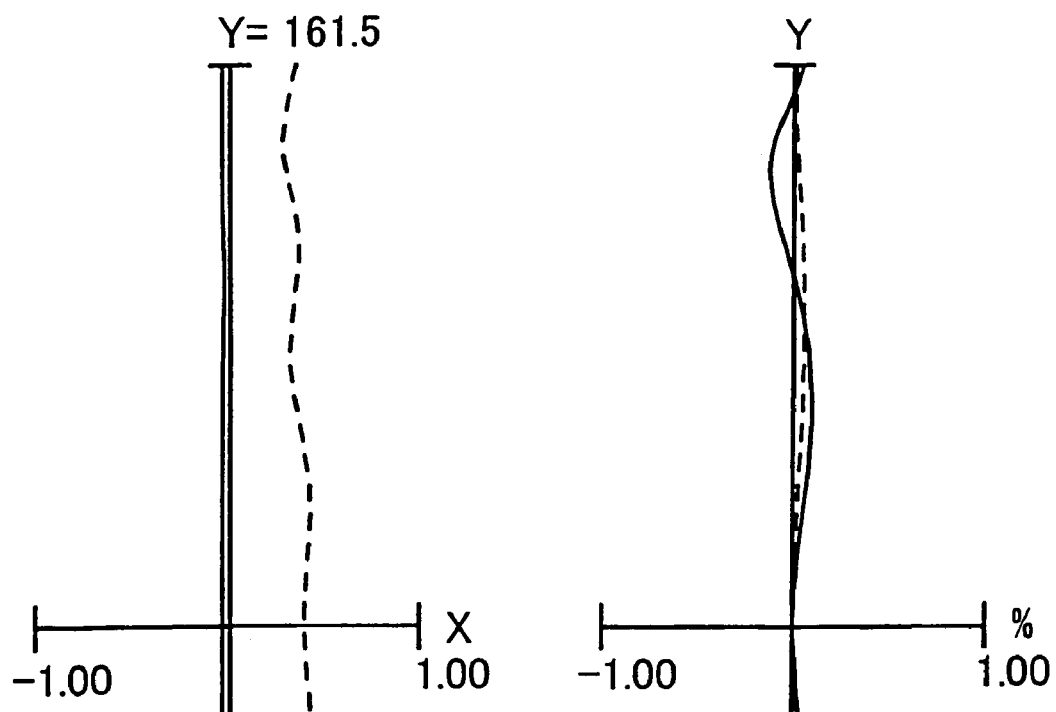
FIG. 4 shows curvature of field and uniform-velocity characteristics on the scanning optical system of the example 1.

FIG. 4 shows, with regard to the example 1, the curvature of field (the left figure; the solid line for the sub-scanning direction; the broken line for the main scanning direction) and the uniform-velocity characteristics (the right figure; the solid line for the linearity; the broken line for the fθ characteristic).

The width of curvature of field for the entire scanning range 323 mm is 0.009 mm/323 mm in the sub-scanning direction, and 0.104 mm/323 mm in the main scanning direction.

The linearity of the uniform-velocity characteristics is 0.207%/323 mm.

Accordingly, both the curvature of field and uniform-velocity characteristics are very well corrected.

The sub-scanning curvature of field satisfies the above-mentioned condition (3). That is:

$$0.009/323 = 0.000028 < 0.005 \quad (3)$$

Figure 3:
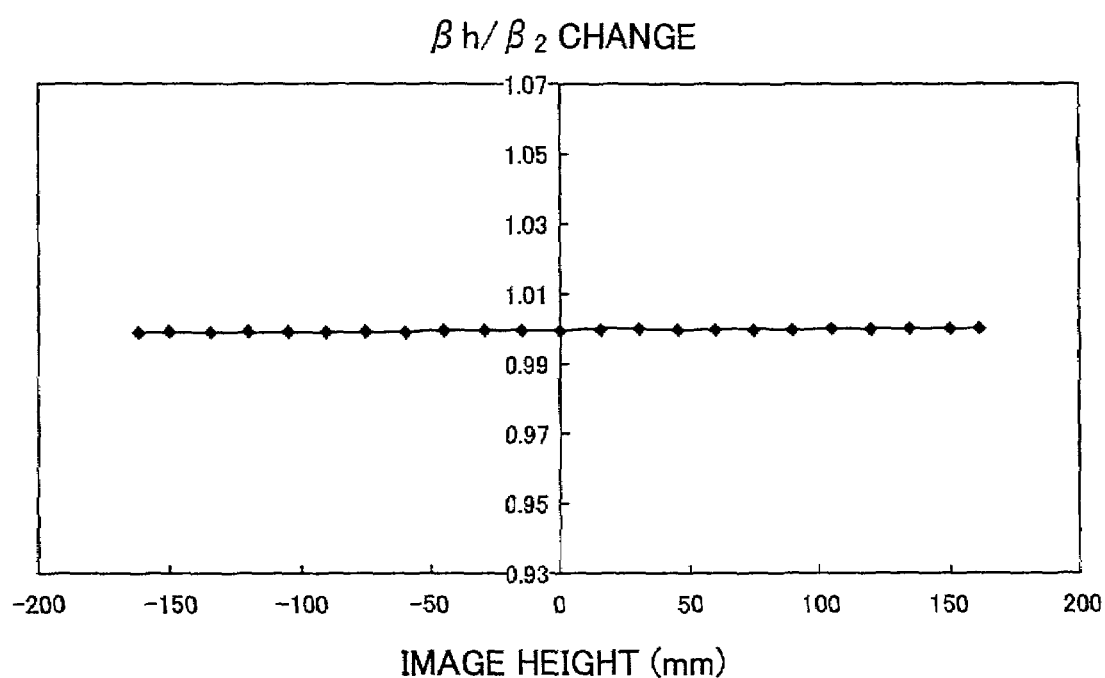
FIG. 3 shows change of a lateral magnification $\beta_h$ in sub-scanning direction at any image height with respect to a lateral magnification $\beta_2$ in the sub-scanning direction at the central image height of the scanning optical system of the example 1.

FIG. 3 shows change of the lateral magnification $\beta_h$ in the sub-scanning direction at any image height with respect to the lateral magnification $\beta_2$ in the sub-scanning direction at the central image height on the example 1. As a result, $$|\beta_h/\beta_2| = 1.000$$

Accordingly, the magnification change satisfies the above-mentioned condition (2), and is very well corrected.

Figure 2A:
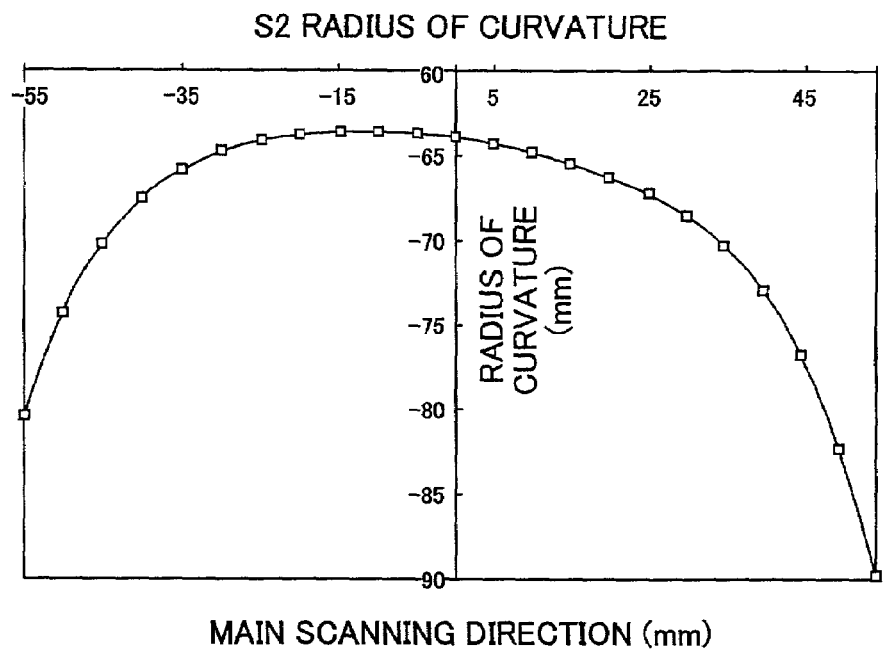
FIGS. 2A and 2B show states of change in main scanning direction of curvature in a sub-scanning section of surfaces S2 and S3 of the scanning optical system in the example 1.
Figure 2B:
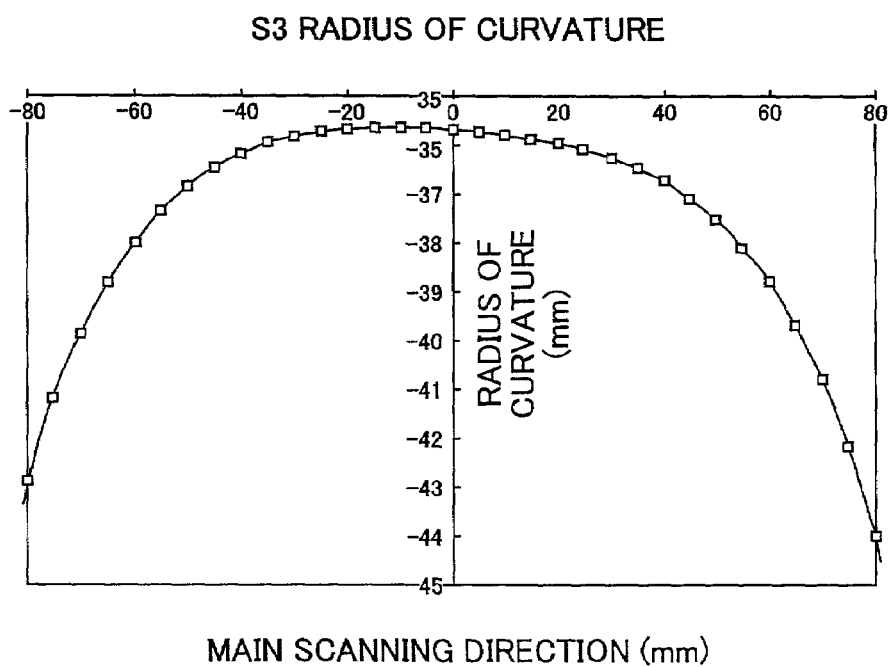

FIG. 2A shows variation of radius of curvature in the sub-scanning direction of the exit surface (S2) of the lens 6. FIG. 2B shows variation of radius of curvature in the sub-scanning direction of the entrance surface (S3) of the lens 7. Each of these surfaces is 'a surface in which a curvature in the sub-scanning direction varies asymmetrically in the main scanning direction'.

Figure 5A:
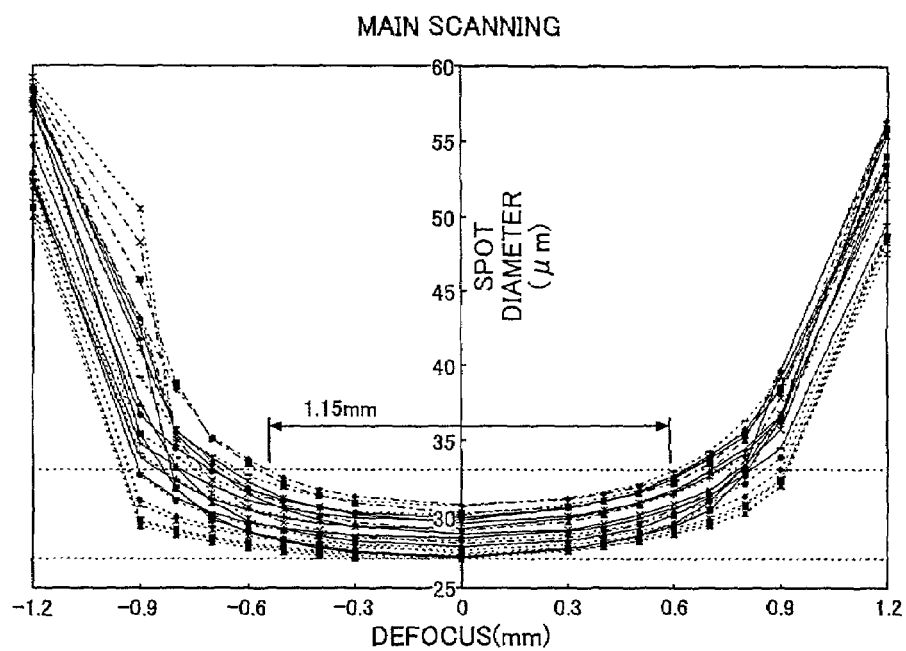
FIGS. 5A and 5B show depth curves of spot diameter for respective image heights of beam spot on the scanning optical system of the example 1.
Figure 5B:
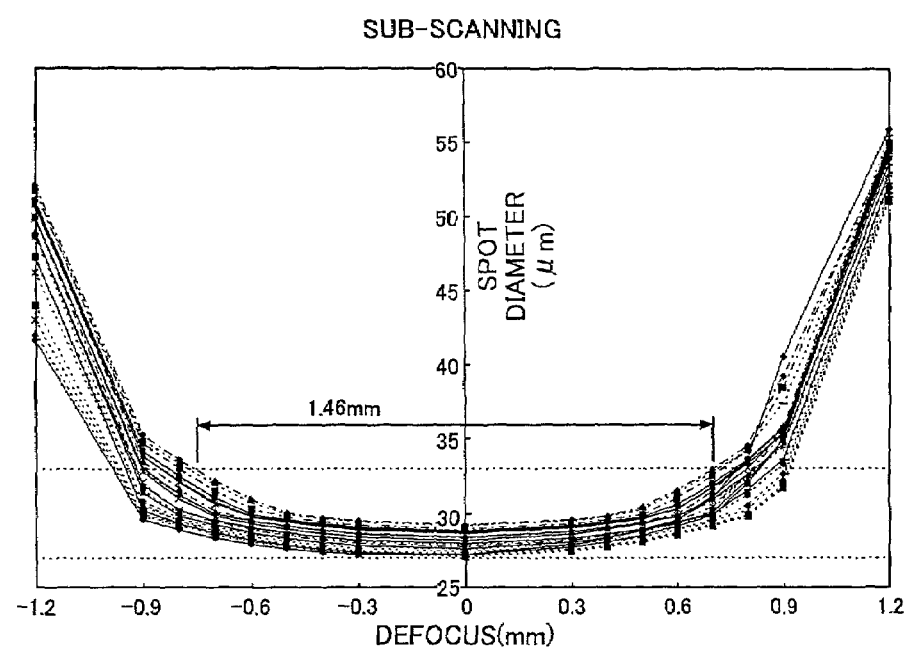

FIGS. 5A and 5B show 'depth curves of spot diameter (change of spot diameter with respect to defocus of beam spot)' for each image height of beam spot on the example 1.

In the figures, the image heights are total 21 image heights obtained from dividing ±150 mm into equal intervals. FIG. 5A is for the main scanning direction while FIG. 5B is for the sub-scanning direction.

In the example 1, the order of 30 μm is aimed as the spot diameter defined by the $1/e^2$ intensity of the line spread functions. As shown in the figures, satisfactory depths are provided for both the main and sub-scanning directions. Accordingly, an allowance for positional accuracy on the surface to be scanned is large.

In the example 1, a back length of 168.62 (mm) which is larger than the half of the conjugate length (distance between the deflection reflective surface of the polygon mirror and the surface to be scanned) of 316.21 (mm) in the sub-scanning direction of the scanning optical system is set.

The scanning optical system of the example 1 is an optical system which condenses a beam deflected by the optical deflector 5 and thus forms thereof a beam spot on the surface 9 to be scanned, and consists of the two lenses 6 and 7. The lens 6 on the side of optical deflector 5 has a negative refracting power in the sub-scanning direction. The lens 7 on the side of surface 9 to be scanned has a positive refracting power in the sub-scanning direction and has a surface (S4) in which the shape in a sub-scanning section thereof is a non-arc shape. The above-mentioned surface S4 is a sub-non-arc surface. The lens 6 on the side of optical deflector 5 has a positive refracting power in the main scanning direction. Further, the lateral magnification $\beta_2$ in the sub-scanning direction at the central image height of the scanning optical system satisfies the above-mentioned condition (1).

The above-mentioned sub-non-arc surface (S4) is such that the shape in the main scanning section thereof is a non-arc shape.

Further, the lenses 6 and 7 constitute an anamorphic optical system having a function of making the position on or in the proximity of the deflection reflective surface and the position on the surface 9 to be scanned have a geometric-optical conjugate relationship with regard to the sub-scanning direction.

Further, each of all the lens surfaces of the lenses 6 and 7 are such that curvatures in the main and sub-scanning directions thereof are different from one another.

Further, when a spot diameter of beam spot on the surface to be scanned is defined by the $1/e^2$ intensity in the line spread functions of light intensity distribution of the beam spot, the lenses 6 and 7 have an imaging capability such that the above-mentioned spot diameter is equal to or smaller than 50 μm in each of the main and sub-scanning directions in the effective writing range.

The sub-non-arc surface (S4) of the four lens surfaces of the lenses 6 and 7 is such that the non-arc amount which is a difference of the non-arc shape in a sub-scanning section thereof from the arc shape varies asymmetrically in the main scanning direction.

Each of the four lens surfaces of the lenses 6 and 7 is such that the curvature in the sub-scanning direction thereof varies in the main scanning direction. Further, each of the surfaces S2 and S3 of these four surfaces is such that the curvature in the sub-scanning direction thereof varies asymmetrically in the main scanning direction.

Further, the scanning optical system is such that the lateral magnification $\beta_2$ in the sub-scanning direction at the central image height and the lateral magnification $\beta_h$ in the sub-scanning direction at any image height satisfy the above-mentioned condition (2).

Furthermore, the scanning optical system is such that the effective writing width W and the width Fs of the sub-scanning curvature of field in the effective writing width satisfy the above-mentioned condition (3).

Further, each of at least two surfaces (S2 and S3) of the four lens surfaces of the lenses 6 and 7 is such that a- curvature in a sub-scanning section thereof varies asymmetrically in the main scanning direction, and these surfaces have an air separation therebetween.

Accordingly, the optical scanning device in the first embodiment shown in FIG. 31 employing the scanning optical system in the example 1 is the optical scanning device in the single-beam system which couples a beam from the light source 1 by the coupling lens 2 to the subsequent optical system, forms of the coupled beam a line image long in the main scanning direction on or in the proximity of the deflection reflective surface of the optical deflector 5 by the line-image forming optical system 4, deflects the beam at a uniform angular velocity by the optical deflector 5, condenses the deflected beam so as to form thereof a beam spot on the surface 9 to be scanned by the scanning optical system 6 and 7, and thus scans the surface 9 to be scanned, and employs the above-described scanning optical system as the scanning optical system 6 and 7.

Examples 2 through 6 according to the present invention will now be described.

Each of the examples 2 through 6 is a concrete example of the optical scanning device in the second embodiment shown in FIG. 32.

The example 2 will now be described.

Figure 6:
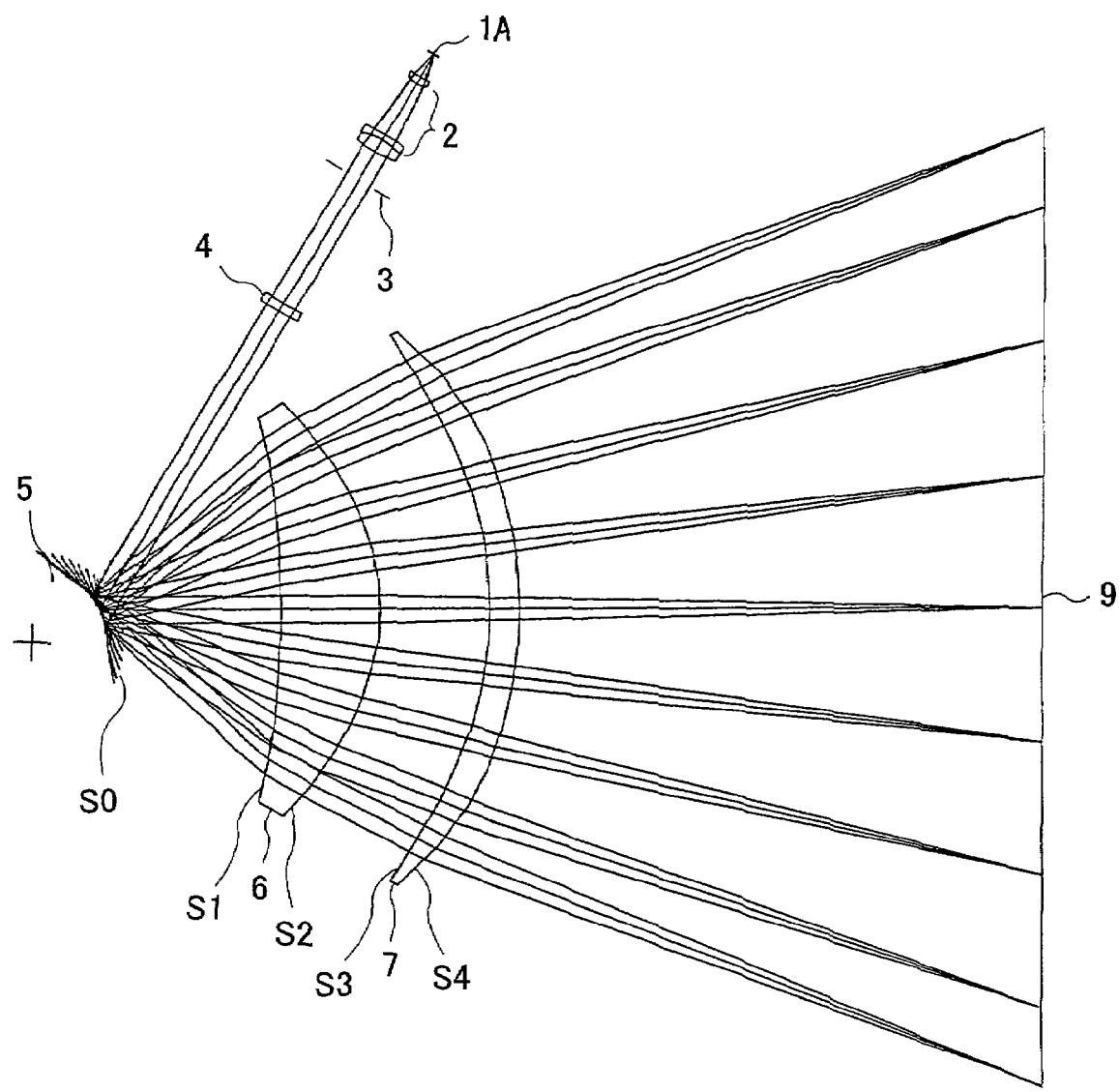
FIG. 6 shows an optical disposition of an scanning optical system of an example 2 according to the present invention.

FIG. 6 shows an optical disposition of the example 2 from the light source 1A to the surface 9 to be scanned.

Data concerning the configuration shown in FIG. 6 is as follows:

the light source 1A: a semiconductor laser array;

the number of light-emitting sources of the light source 1A: 4;

each of the intervals between the light-emitting sources of the light source 1: 14 μm;

the wavelength of the light-emitting sources of the light source 1: 780 nm;

the coupling lens 2: a configuration of two groups of three lenses (the second group consisting of joined lenses);

the focal length of the coupling lens 2: 22 mm;

the coupling function of the coupling lens 2: collimating function;

the aperture 3: the shape of opening: a rectangle;

the opening width in the main scanning direction of the aperture 3: 9.0 mm;

the opening width in the sub-scanning direction of the aperture 3: 7.6 mm;

the cylindrical lens 4: the focal length in the sub-scanning direction: 126.18 mm;

the polygon mirror 5: the number of deflection reflective surfaces: 5, the radius of inscribed circle: 25 mm, the incidence angle of beam from the side of light source: 60°; and the method of scanning: 1200 dpi, fifth-order interlaced scanning.

Data concerning the optical systems disposed between the polygon mirror and the surface to be scanned will now be described.

|  | i | $R_{mi}$ | $R_{si}(0)$ | X | Y | n | $f_m$ | $f_s$ |
|---|---|---|---|---|---|---|---|---|
| DEFLECTION REFLECTIVE SURFACE | S0 | ∞ | ∞ | 60.13 | 0.111 | | | |
| LENS 6 | S1 | −341.10 | −51.33 | 33.02 | 0 | 1.52398 | 183.434 | −1290.62 |
|  | S2 | −77.86 | −79.45 | 37.33 | 0 | | | |
| LENS 7 | S3 | −119.74 | 80.00 | 10.00 | 0 | 1.52398 | −462.606 | 77.179 |
|  | S4 | −149.50 | −79.22 | 175.72 | 0 | | | |

The values of the coefficients for the main scanning direction and sub-scanning direction of the respective lens surfaces are shown in the following tables 6 through 9.

TABLE 6

| SURFACE NUMBER | COEFFICIENTS FOR MAIN SCANNING DIRECTION | | COEFFICIENTS FOR SUB-SCANNING DIRECTION | |
|---|---|---|---|---|
| S1 | K | 14.050 | $B_1$ | 0 |
|  | $A_1$ | 0 | $B_2$ | $-1.447 \times 10^{-5}$ |
|  | $A_2$ | 0 | $B_3$ | 0 |
|  | $A_3$ | 0 | $B_4$ | $1.539 \times 10^{-9}$ |
|  | $A_4$ | $-1.959 \times 10^{-8}$ | $B_5$ | 0 |
|  | $A_5$ | 0 | $B_6$ | $-4.735 \times 10^{-13}$ |
|  | $A_6$ | $3.964 \times 10^{-12}$ | $B_7$ | 0 |
|  | $A_7$ | 0 | $B_8$ | $6.713 \times 10^{-18}$ |
|  | $A_8$ | $-3.545 \times 10^{-16}$ | $B_9$ | 0 |
|  | $A_9$ | 0 | $B_{10}$ | $1.386 \times 10^{-21}$ |
|  | $A_{10}$ | $5.661 \times 10^{-24}$ | $B_{11}$ | 0 |

TABLE 7

| SURFACE NUMBER | COEFFICIENTS FOR MAIN SCANNING DIRECTION | | COEFFICIENTS FOR SUB-SCANNING DIRECTION | |
|---|---|---|---|---|
| S2 | K | $-4.668 \times 10^{-1}$ | $B_1$ | $1.523 \times 10^{-5}$ |
|  | $A_1$ | 0 | $B_2$ | $-3.328 \times 10^{-6}$ |
|  | $A_2$ | 0 | $B_3$ | $-6.280 \times 10^{-10}$ |
|  | $A_3$ | 0 | $B_4$ | $-5.229 \times 10^{-10}$ |
|  | $A_4$ | $8.408 \times 10^{-8}$ | $B_5$ | $2.725 \times 10^{-14}$ |
|  | $A_5$ | 0 | $B_6$ | $-1.260 \times 10^{-13}$ |
|  | $A_6$ | $5.650 \times 10^{-12}$ | $B_7$ | $2.714 \times 10^{-16}$ |
|  | $A_7$ | 0 | $B_8$ | $-2.429 \times 10^{-17}$ |
|  | $A_8$ | $4.314 \times 10^{-16}$ | $B_9$ | $-3.522 \times 10^{-20}$ |
|  | $A_9$ | 0 | $B_{10}$ | $7.619 \times 10^{-25}$ |
|  | $A_{10}$ | $1.590 \times 10^{-19}$ | $B_{11}$ | 0 |

TABLE 8

| SURFACE NUMBER | COEFFICIENTS FOR MAIN SCANNING DIRECTION | | COEFFICIENTS FOR SUB-SCANNING DIRECTION | |
|---|---|---|---|---|
| S3 | K | $-8.016 \times 10^{-1}$ | $B_1$ | $8.168 \times 10^{-6}$ |
|  | $A_1$ | 0 | $B_2$ | $4.449 \times 10^{-6}$ |
|  | $A_2$ | 0 | $B_3$ | $-5.447 \times 10^{-10}$ |
|  | $A_3$ | 0 | $B_4$ | $-4.074 \times 10^{-10}$ |
|  | $A_4$ | $1.328 \times 10^{-8}$ | $B_5$ | $5.669 \times 10^{-14}$ |
|  | $A_5$ | 0 | $B_6$ | $-9.141 \times 10^{-15}$ |

TABLE 8-continued

| SURFACE NUMBER | COEFFICIENTS FOR MAIN SCANNING DIRECTION | | COEFFICIENTS FOR SUB-SCANNING DIRECTION | |
|---|---|---|---|---|
| | $A_6$ | $8.605 \times 10^{-13}$ | $B_7$ | $1.397 \times 10^{-17}$ |
| | $A_7$ | 0 | $B_8$ | $-3.063 \times 10^{-19}$ |
| | $A_8$ | $1.112 \times 10^{-16}$ | $B_9$ | $-1.780 \times 10^{-21}$ |
| | $A_9$ | 0 | $B_{10}$ | $1.438 \times 10^{-22}$ |
| | $A_{10}$ | $1.435 \times 10^{-21}$ | $B_{11}$ | $9.232 \times 10^{-27}$ |
| | $A_{11}$ | 0 | $B_{12}$ | $1.037 \times 10^{-31}$ |
| | $A_{12}$ | $3.796 \times 10^{-25}$ | $B_{13}$ | 0 |
| | $A_{13}$ | 0 | $B_{14}$ | 0 |
| | $A_{14}$ | $-5.606 \times 10^{-30}$ | $B_{15}$ | 0 |

TABLE 9

| SURFACE NUMBER | COEFFICIENTS FOR MAIN SCANNING DIRECTION | | COEFFICIENTS FOR SUB-SCANNING DIRECTION | |
|---|---|---|---|---|
| S4 | K | $6.596 \times 10^{-1}$ | $B_1$ | 0 |
| | $A_1$ | 0 | $B_2$ | $3.155 \times 10^{-6}$ |
| | $A_2$ | 0 | $B_3$ | 0 |
| | $A_3$ | 0 | $B_4$ | $-3.731 \times 10^{-10}$ |
| | $A_4$ | $-7.137 \times 10^{-8}$ | $B_5$ | 0 |
| | $A_5$ | 0 | $B_6$ | $1.288 \times 10^{-14}$ |
| | $A_6$ | $1.665 \times 10^{-12}$ | $B_7$ | 0 |
| | $A_7$ | 0 | $B_8$ | $-1.711 \times 10^{-18}$ |
| | $A_8$ | $-1.702 \times 10^{-16}$ | $B_9$ | 0 |
| | $A_9$ | 0 | $B_{10}$ | $1.256 \times 10^{-23}$ |
| | $A_{10}$ | $-3.756 \times 10^{-21}$ | $B_{11}$ | 0 |
| | $A_{11}$ | 0 | $B_{12}$ | $-7.893 \times 10^{-29}$ |
| | $A_{12}$ | $1.587 \times 10^{-25}$ | $B_{13}$ | 0 |
| | $A_{13}$ | 0 | $B_{14}$ | 0 |
| | $A_{14}$ | $-4.044 \times 10^{-29}$ | $B_{15}$ | 0 |

The values of the coefficients for the sub-scanning direction of the exit surface (S4) of the lens 7 are shown in the following table 10. In the table 10, '$C_0$' denotes '$Ks(0)$' in the first term of the right side of the expression (9).

TABLE 10

| S4 | $C_0$ | $-6.158$ | $I_0$ | $5.318 \times 10^{-7}$ | $K_0$ | $-2.494 \times 10^{-8}$ |
|---|---|---|---|---|---|---|
| | $C_1$ | $-1.379 \times 10^{-2}$ | $I_1$ | $-2.446 \times 10^{-9}$ | $K_1$ | $2.319 \times 10^{-12}$ |
| | $C_2$ | $-3.390 \times 10^{-3}$ | $I_2$ | $9.287 \times 10^{-10}$ | $K_2$ | $-5.793 \times 10^{-12}$ |
| | $C_3$ | $-6.937 \times 10^{-6}$ | $I_3$ | $-2.431 \times 10^{-12}$ | $K_3$ | $4.868 \times 10^{-14}$ |
| | $C_4$ | $-1.622 \times 10^{-6}$ | $I_4$ | $-3.692 \times 10^{-13}$ | $K_4$ | $1.697 \times 10^{-14}$ |
| | $C_5$ | $-3.900 \times 10^{-8}$ | $I_5$ | $3.497 \times 10^{-15}$ | $K_5$ | $-5.245 \times 10^{-17}$ |
| | $C_6$ | $1.875 \times 10^{-9}$ | $I_6$ | $3.166 \times 10^{-16}$ | $K_6$ | $-1.425 \times 10^{-17}$ |
| | $C_7$ | $3.672 \times 10^{-11}$ | $I_7$ | $-1.130 \times 10^{-18}$ | $K_7$ | $1.986 \times 10^{-20}$ |
| | $C_8$ | $-1.705 \times 10^{-12}$ | $I_8$ | $-1.331 \times 10^{-19}$ | $K_8$ | $5.647 \times 10^{-21}$ |
| | $C_9$ | $-1.296 \times 10^{-14}$ | $I_9$ | $1.332 \times 10^{-22}$ | $K_9$ | $-3.362 \times 10^{-24}$ |
| | $C_{10}$ | $5.489 \times 10^{-16}$ | $I_{10}$ | $2.686 \times 10^{-23}$ | $K_{10}$ | $-1.125 \times 10^{-24}$ |
| | $C_{11}$ | $1.897 \times 10^{-18}$ | $I_{11}$ | $-3.281 \times 10^{-27}$ | $K_{11}$ | $2.461 \times 10^{-28}$ |
| | $C_{12}$ | $-7.056 \times 10^{-20}$ | $I_{12}$ | $-2.665 \times 10^{-27}$ | $K_{12}$ | $1.099 \times 10^{-28}$ |
| | $C_{13}$ | $-9.738 \times 10^{-23}$ | $I_{13}$ | $-2.550 \times 10^{-31}$ | $K_{13}$ | $-5.467 \times 10^{-33}$ |
| | $C_{14}$ | $3.186 \times 10^{-24}$ | $I_{14}$ | $1.046 \times 10^{-31}$ | $K_{14}$ | $-4.194 \times 10^{-33}$ |

The lateral magnification $\beta_2$ of the scanning optical system in the example 2 in the sub-scanning direction at the central image height is as follows:

$$\beta_2 = 1.320$$

and it satisfies the above-mentioned condition (1).

Figure 9:
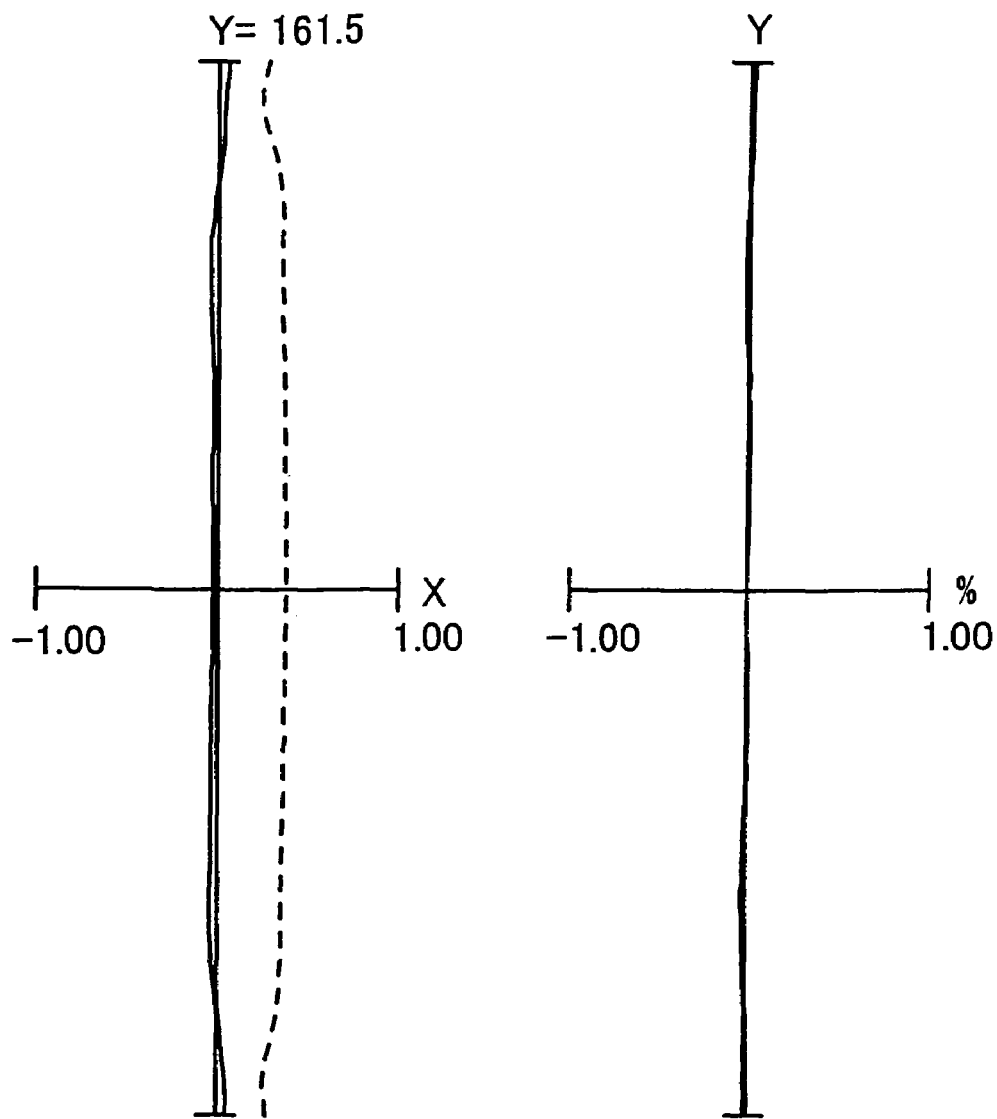
FIG. 9 shows curvature of field and uniform-velocity characteristics on the scanning optical system of the example 2.

FIG. 9 shows the curvature of field (the left figure; the solid line for the sub-scanning direction; the broken line for the main scanning direction) and the uniform-velocity characteristics (the right figure; the solid line for the linearity; the broken line for the f θ characteristic), with regard to the light-emitting source ch1 (the most outside light-emitting part) of the example 2.

The width of curvature of field for the entire scanning range 323 mm is 0.0098 mm/323 mm in the sub-scanning direction, and 1.340 mm/323 mm in the main scanning direction.

The linearity of the uniform-velocity characteristics is 0.050%/323 mm.

Accordingly, both the curvature of field and uniform-velocity characteristics are very well corrected.

The sub-scanning curvature of field satisfies the above-mentioned condition (3). That is:

$$0.098/323 = 0.000303 < 0.005$$

Figure 8:
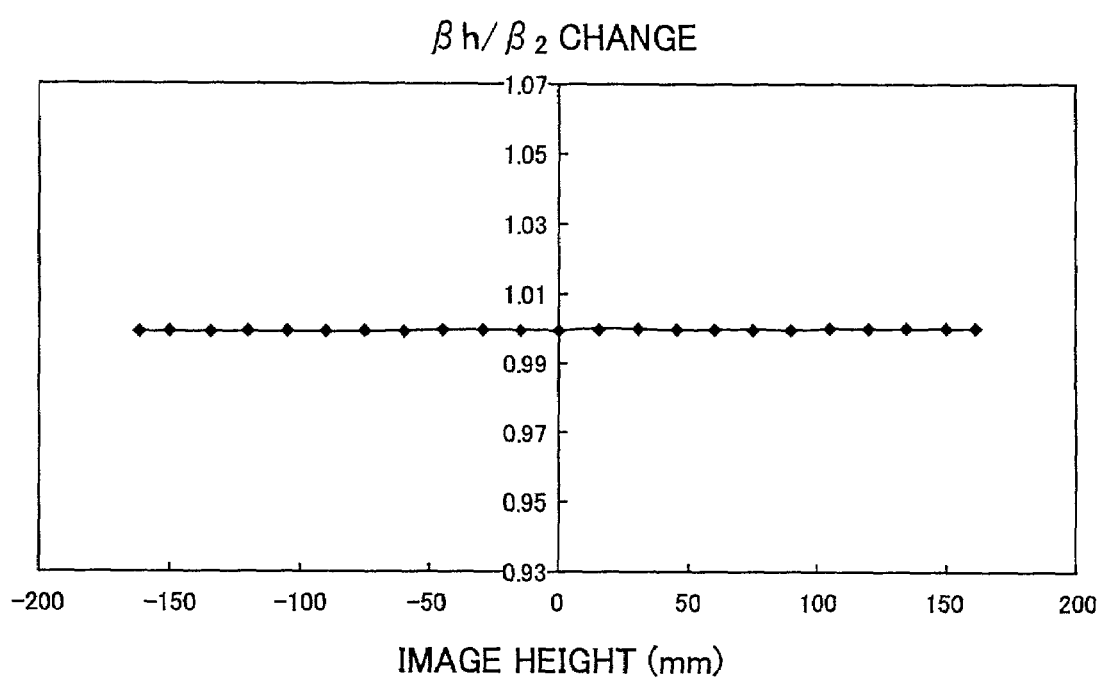
FIG. 8 shows change of a lateral magnification $\beta_h$ in sub-scanning direction at any image height with respect to a lateral magnification $\beta_2$ in the sub-scanning direction at the central image height of the scanning optical system of the example 2.

FIG. 8 shows change of the lateral magnification $\beta_h$ in the sub-scanning direction at any image height with respect to the lateral magnification $\beta_2$ in the sub-scanning direction at the central image height. As a result, $$|\beta_h/\beta_2| = 1.000$$

Accordingly, the magnification change satisfies the above-mentioned condition (2), and is very well corrected.

Figure 7A:
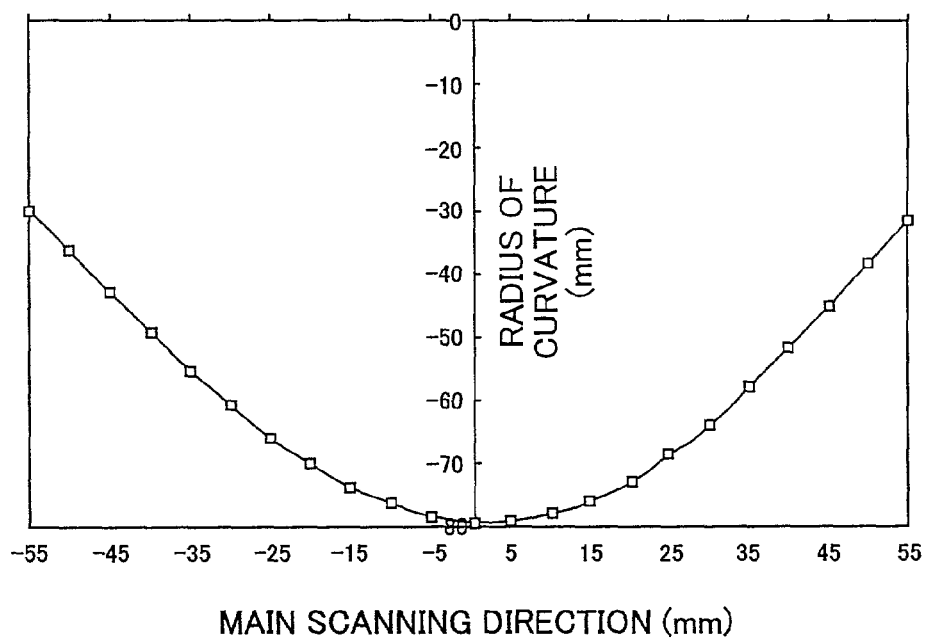
FIGS. 7A and 7B show states of change in main scanning direction of curvature in a sub-scanning section of surfaces S2 and S3 of the scanning optical system of the example 2.
Figure 7B:
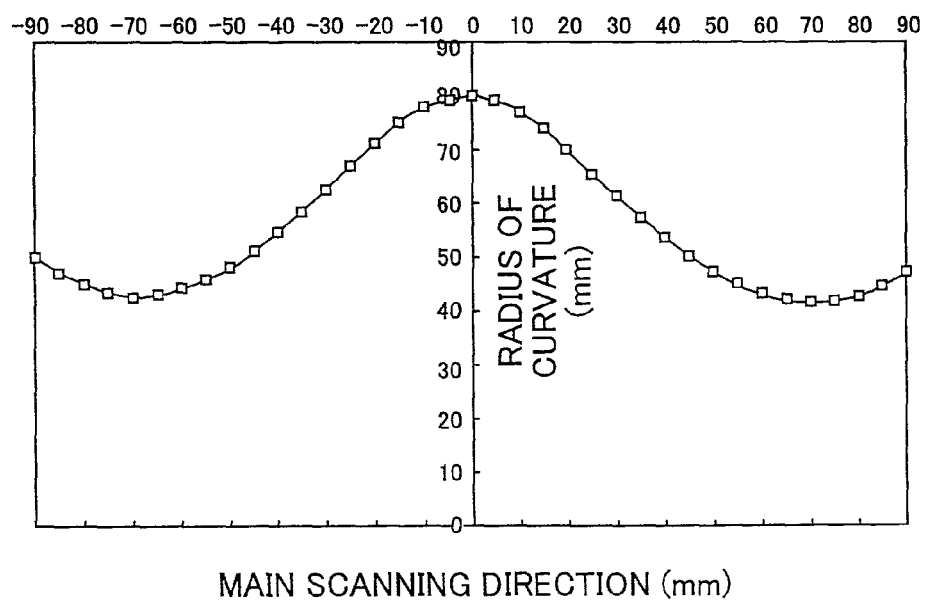

FIG. 7A shows variation of radius of curvature in the sub-scanning direction of the exit surface (S2) of the lens 6. FIG. 7B shows variation of radius of curvature in the sub-scanning direction of the entrance surface (S3) of the lens 7. Each of these surfaces is 'a surface in which a curvature in the sub-scanning direction varies asymmetrically in the main scanning direction'.

Figure 10A:
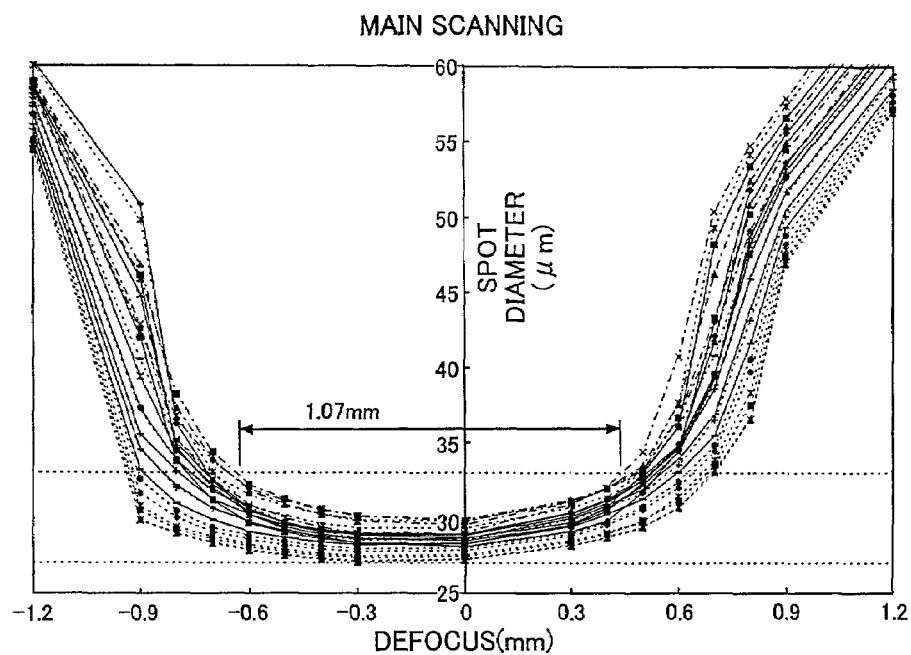
FIGS. 10A and 10B show depth curves of spot diameter for respective image heights of beam spot on the scanning optical system of the example 2.
Figure 10B:
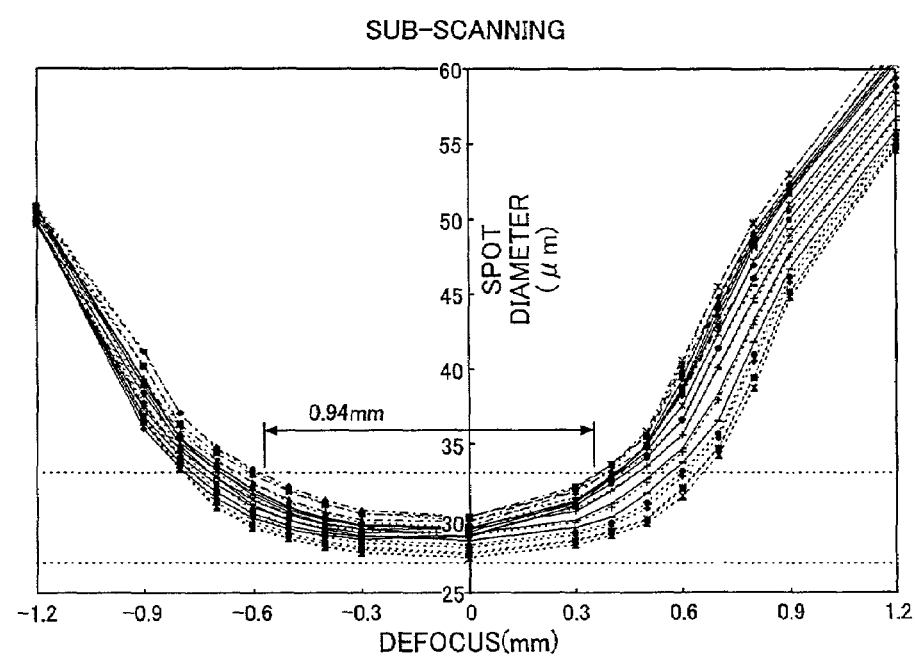

FIGS. 10A and 10B show 'depth curves of spot diameter (change of spot diameter with respect to defocus of beam spot)' for each image height of beam spot with regard to the light-emitting source ch1 of the example 2. In the figures, the image heights are total 21 image heights obtained from dividing ±150 mm into equal intervals. FIG. 10A is for the main scanning direction while FIG. 10B is for the sub-scanning direction.

In the example 2, the order of 30 μm is aimed as the spot diameter defined by the $1/e^2$ intensity of the line spread functions. As shown in the figures, satisfactory depths are provided for both the main and sub-scanning directions. Accordingly, an allowance for positional accuracy on the surface to be scanned is large.

In the example 2, a back length of 175.72 (mm) which is larger than the half of the conjugate length of 316.20 (mm) in the sub-scanning direction of the scanning optical system is set.

The example 3 will now be described.

Figure 11:
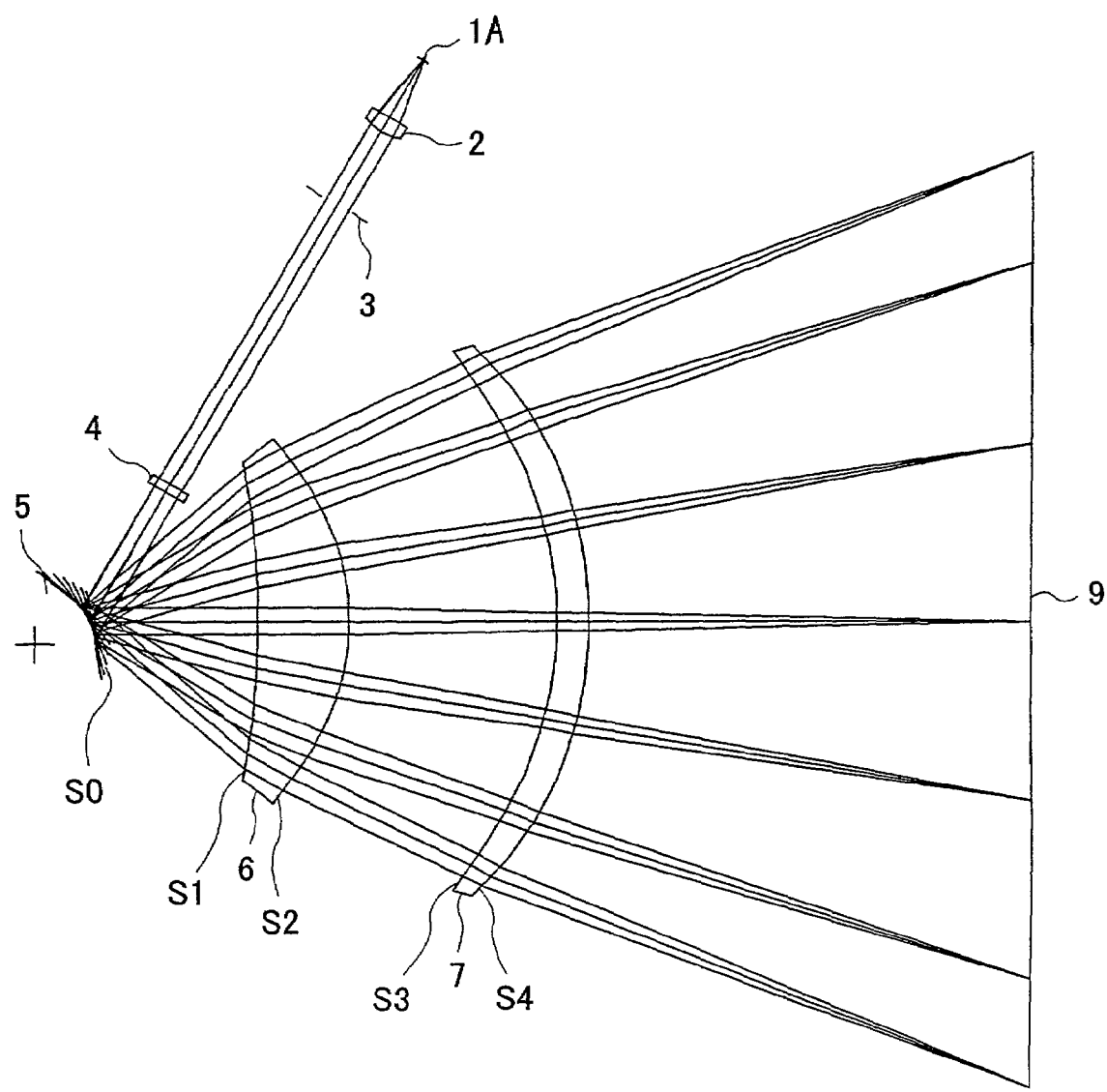
FIG. 11 shows an optical disposition of an scanning optical system of an example 3 according to the present invention.

FIG. 11 shows an optical disposition of the example 3 from the light source 1A to the surface 9 to be scanned.

Data concerning the configuration shown in FIG. 11 is as follows:

the light source 1A: a semiconductor laser array;
the number of light-emitting sources of the light source 1A: 4;
each of the intervals between the light-emitting sources of the light source 1A: 14 μm;
the wavelength of the light-emitting sources of the light source 1A: 780 nm;
the coupling lens 2: a configuration of a single lens;
the focal length of the coupling lens 2: 27 mm;
the coupling function of the coupling lens 2: collimating function;
the aperture 3: the shape of opening: a rectangle;
the opening width in the main scanning direction of the aperture 3: 9.0 mm;
the opening width in the sub-scanning direction of the aperture 3: 1.9 mm;
the cylindrical lens 4: the focal length in the sub-scanning direction: 58.69 mm;
the polygon mirror 5: the number of deflection reflective surfaces: 5, the radius of inscribed circle: 20 mm, the incidence angle of beam from the side of light source: 60°; and
the method of scanning: 1200 dpi, adjacent scanning.

Data concerning the optical system disposed between the polygon mirror and the surface to be scanned will now be described.

| | i | $R_{mi}$ | $R_{si}(0)$ | X | Y | n | $f_m$ | $f_s$ |
|---|---|---|---|---|---|---|---|---|
| DEFLECTION REFLECTIVE SURFACE | S0 | ∞ | ∞ | 55.84 | 0.225 | | | |
| LENS 6 | S1 | −309.83 | −42.49 | 30.94 | 0 | 1.52398 | 200.207 | −81.794 |
| | S2 | −81.44 | −3654.71 | 69.52 | 0.227 | | | |
| LENS 7 | S3 | −129.99 | 119.29 | 10.71 | 0 | 1.52398 | −2093.66 | 69.037 |
| | S4 | −151.53 | −50.75 | 149.20 | 0 | | | |

The values of the coefficients for the main scanning direction and sub-scanning direction of the respective lens surfaces are shown in the following tables 11 through 14.

TABLE 11

| SURFACE NUMBER | | COEFFICIENTS FOR MAIN SCANNING DIRECTION | | COEFFICIENTS FOR SUB-SCANNING DIRECTION |
|---|---|---|---|---|
| S1 | K | 4.151 | $B_1$ | 0 |
| | $A_1$ | 0 | $B_2$ | $-1.752 \times 10^{-5}$ |
| | $A_2$ | 0 | $B_3$ | 0 |
| | $A_3$ | 0 | $B_4$ | $-4.463 \times 10^{-9}$ |
| | $A_4$ | $-9.907 \times 10^{-9}$ | $B_5$ | 0 |
| | $A_5$ | 0 | $B_6$ | $7.221 \times 10^{-13}$ |
| | $A_6$ | $3.315 \times 10^{-12}$ | $B_7$ | 0 |
| | $A_7$ | 0 | $B_8$ | $-9.163 \times 10^{-18}$ |
| | $A_8$ | $-2.119 \times 10^{-17}$ | $B_9$ | 0 |
| | $A_9$ | 0 | $B_{10}$ | $2.357 \times 10^{-20}$ |
| | $A_{10}$ | $1.332 \times 10^{-20}$ | $B_{11}$ | 0 |

TABLE 12

| SURFACE NUMBER | | COEFFICIENTS FOR MAIN SCANNING DIRECTION | | COEFFICIENTS FOR SUB-SCANNING DIRECTION |
|---|---|---|---|---|
| S2 | K | $-6.992 \times 10^{-1}$ | $B_1$ | $1.735 \times 10^{-5}$ |
| | $A_1$ | 0 | $B_2$ | $-1.250 \times 10^{-6}$ |
| | $A_2$ | 0 | $B_3$ | $1.141 \times 10^{-10}$ |
| | $A_3$ | 0 | $B_4$ | $-2.423 \times 10^{-9}$ |
| | $A_4$ | $-4.763 \times 10^{-8}$ | $B_5$ | $6.998 \times 10^{-13}$ |
| | $A_5$ | 0 | $B_6$ | $-2.557 \times 10^{-14}$ |
| | $A_6$ | $-3.446 \times 10^{-12}$ | $B_7$ | $-4.699 \times 10^{-16}$ |
| | $A_7$ | 0 | $B_8$ | $-1.383 \times 10^{-16}$ |
| | $A_8$ | $1.729 \times 10^{-15}$ | $B_9$ | $1.227 \times 10^{-19}$ |
| | $A_9$ | 0 | $B_{10}$ | $2.812 \times 10^{-20}$ |
| | $A_{10}$ | $2.698 \times 10^{-20}$ | $B_{11}$ | 0 |

TABLE 13

| SURFACE NUMBER | | COEFFICIENTS FOR MAIN SCANNING DIRECTION | | COEFFICIENTS FOR SUB-SCANNING DIRECTION |
|---|---|---|---|---|
| S3 | K | $-9.740 \times 10^{-1}$ | $B_1$ | $2.764 \times 10^{-6}$ |
| | $A_1$ | 0 | $B_2$ | $2.283 \times 10^{-6}$ |
| | $A_2$ | 0 | $B_3$ | $1.729 \times 10^{-11}$ |
| | $A_3$ | 0 | $B_4$ | $-2.528 \times 10^{-10}$ |
| | $A_4$ | $-4.422 \times 10^{-8}$ | $B_5$ | $-6.030 \times 10^{-14}$ |
| | $A_5$ | 0 | $B_6$ | $-7.846 \times 10^{-15}$ |
| | $A_6$ | $7.758 \times 10^{-13}$ | $B_7$ | $3.024 \times 10^{-17}$ |
| | $A_7$ | 0 | $B_8$ | $-1.882 \times 10^{-19}$ |
| | $A_8$ | $1.066 \times 10^{-16}$ | $B_9$ | $-6.466 \times 10^{-21}$ |

TABLE 13-continued

| SURFACE NUMBER | | COEFFICIENTS FOR MAIN SCANNING DIRECTION | | COEFFICIENTS FOR SUB-SCANNING DIRECTION |
|---|---|---|---|---|
| | $A_9$ | 0 | $B_{10}$ | $9.925 \times 10^{-23}$ |
| | $A_{10}$ | $1.248 \times 10^{-20}$ | $B_{11}$ | $6.647 \times 10^{-25}$ |
| | $A_{11}$ | 0 | $B_{12}$ | $-9.070 \times 10^{-27}$ |
| | $A_{12}$ | $7.019 \times 10^{-25}$ | $B_{13}$ | $-2.589 \times 10^{-29}$ |
| | $A_{13}$ | 0 | $B_{14}$ | $3.261 \times 10^{-31}$ |
| | $A_{14}$ | $-7.044 \times 10^{-29}$ | $B_{15}$ | 0 |

TABLE 14

| SURFACE NUMBER | | COEFFICIENTS FOR MAIN SCANNING DIRECTION | | COEFFICIENTS FOR SUB-SCANNING DIRECTION |
|---|---|---|---|---|
| S4 | K | $1.212 \times 10^{-1}$ | $B_1$ | 0 |
| | $A_1$ | 0 | $B_2$ | $1.476 \times 10^{-6}$ |

TABLE 14-continued

| SURFACE NUMBER | COEFFICIENTS FOR MAIN SCANNING DIRECTION | | COEFFICIENTS FOR SUB-SCANNING DIRECTION | |
|---|---|---|---|---|
| | $A_2$ | 0 | $B_3$ | 0 |
| | $A_3$ | 0 | $B_4$ | $-2.095 \times 10^{-10}$ |
| | $A_4$ | $-6.500 \times 10^{-8}$ | $B_5$ | 0 |
| | $A_5$ | 0 | $B_6$ | $-4.770 \times 10^{-15}$ |
| | $A_6$ | $1.061 \times 10^{-12}$ | $B_7$ | 0 |
| | $A_7$ | 0 | $B_8$ | $7.381 \times 10^{-20}$ |
| | $A_8$ | $-1.725 \times 10^{-16}$ | $B_9$ | 0 |
| | $A_9$ | 0 | $B_{10}$ | $-4.739 \times 10^{-24}$ |
| | $A_{10}$ | $1.004 \times 10^{-20}$ | $B_{11}$ | 0 |
| | $A_{11}$ | 0 | $B_{12}$ | $-4.706 \times 10^{-27}$ |
| | $A_{12}$ | $-1.004 \times 10^{-25}$ | $B_{13}$ | 0 |
| | $A_{13}$ | 0 | $B_{14}$ | $1.073 \times 10^{-31}$ |
| | $A_{14}$ | $3.753 \times 10^{-29}$ | $B_{15}$ | 0 |

The values of the coefficients for the sub-scanning direction of the exit surface (S4) of the lens 7 are shown in the following table 15. In the table 15, '$C_0$' denotes '$Ks(0)$' in the first term of the right side of the expression (9).

TABLE 15

| S4 | | | | | | |
|---|---|---|---|---|---|---|
| | $C_0$ | $-7.256 \times 10^{-1}$ | $I_0$ | $1.034 \times 10^{-6}$ | $K_0$ | $1.988 \times 10^{-10}$ |
| | $C_1$ | $-2.340 \times 10^{-3}$ | $I_1$ | $1.586 \times 10^{-9}$ | $K_1$ | $-1.518 \times 10^{-10}$ |
| | $C_2$ | $-3.996 \times 10^{-5}$ | $I_2$ | $4.333 \times 10^{-11}$ | $K_2$ | $8.414 \times 10^{-12}$ |
| | $C_3$ | $-2.734 \times 10^{-6}$ | $I_3$ | $1.181 \times 10^{-12}$ | $K_3$ | $-1.136 \times 10^{-13}$ |
| | $C_4$ | $2.895 \times 10^{-7}$ | $I_4$ | $-1.160 \times 10^{-13}$ | $K_4$ | $8.051 \times 10^{-15}$ |
| | $C_5$ | $4.709 \times 10^{-9}$ | $I_5$ | $-2.455 \times 10^{-15}$ | $K_5$ | $2.852 \times 10^{-16}$ |
| | $C_6$ | $-2.764 \times 10^{-10}$ | $I_6$ | $1.208 \times 10^{-16}$ | $K_6$ | $-1.096 \times 10^{-17}$ |
| | $C_7$ | $-2.204 \times 10^{-12}$ | $I_7$ | $1.113 \times 10^{-18}$ | $K_7$ | $-1.576 \times 10^{-19}$ |
| | $C_8$ | $1.077 \times 10^{-13}$ | $I_8$ | $-4.926 \times 10^{-20}$ | $K_8$ | $4.653 \times 10^{-21}$ |
| | $C_9$ | $4.557 \times 10^{-16}$ | $I_9$ | $-2.163 \times 10^{-22}$ | $K_9$ | $4.037 \times 10^{-23}$ |
| | $C_{10}$ | $-2.004 \times 10^{-17}$ | $I_{10}$ | $9.416 \times 10^{-24}$ | $K_{10}$ | $-9.619 \times 10^{-25}$ |
| | $C_{11}$ | $-4.392 \times 10^{-20}$ | $I_{11}$ | $1.929 \times 10^{-26}$ | $K_{11}$ | $-5.451 \times 10^{-27}$ |
| | $C_{12}$ | $1.790 \times 10^{-21}$ | $I_{12}$ | $-8.632 \times 10^{-28}$ | $K_{12}$ | $1.027 \times 10^{-28}$ |
| | $C_{13}$ | $1.616 \times 10^{-24}$ | $I_{13}$ | $-6.515 \times 10^{-31}$ | $K_{13}$ | $3.782 \times 10^{-31}$ |
| | $C_{14}$ | $-6.192 \times 10^{-26}$ | $I_{14}$ | $3.059 \times 10^{-32}$ | $K_{14}$ | $-5.255 \times 10^{-33}$ |
| | $C_{15}$ | 0 | $I_{15}$ | 0 | $K_{15}$ | $-1.068 \times 10^{-35}$ |
| | $C_{16}$ | 0 | $I_{16}$ | 0 | $K_{16}$ | $9.556 \times 10^{-38}$ |

The lateral magnification $\beta_2$ of the scanning optical system in the example 3 in the sub-scanning direction at the central image height is as follows:

$$\beta_2 = 0.704$$

and it satisfies the above-mentioned condition (1).

Figure 14:
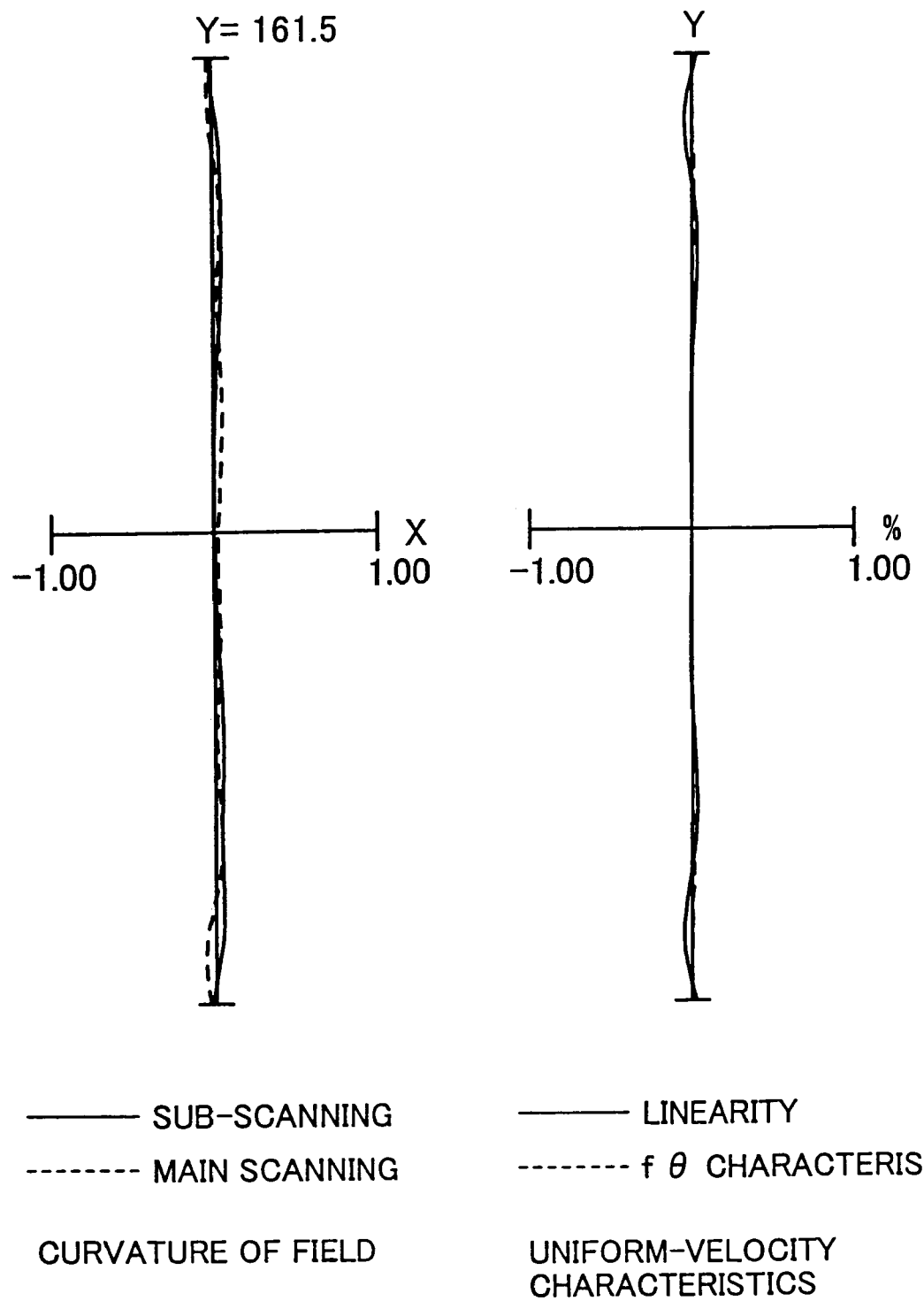
FIG. 14 shows curvature of field and uniform-velocity characteristics on the scanning optical system in the example 3.

FIG. 14 shows the curvature of field (the left figure; the solid line for the sub-scanning direction; the broken line for the main scanning direction) and the uniform-velocity characteristics (the right figure; the solid line for the linearity; the broken line for the f θ characteristic), with regard to the light-emitting source ch1 of the example 3.

The width of curvature of field for the entire scanning range 323 mm is 0.065 mm/323 mm in the sub-scanning direction, and 0.105 mm/323 mm in the main scanning direction.

The linearity of the uniform-velocity characteristics is 0.088%/323 mm.

Accordingly, both the curvature of field and uniform-velocity characteristics are very well corrected.

The sub-scanning curvature of field satisfies the above-mentioned condition (3). That is:

$$0.065/323 = 0.000201 < 0.005 \qquad (3)$$

Figure 13:
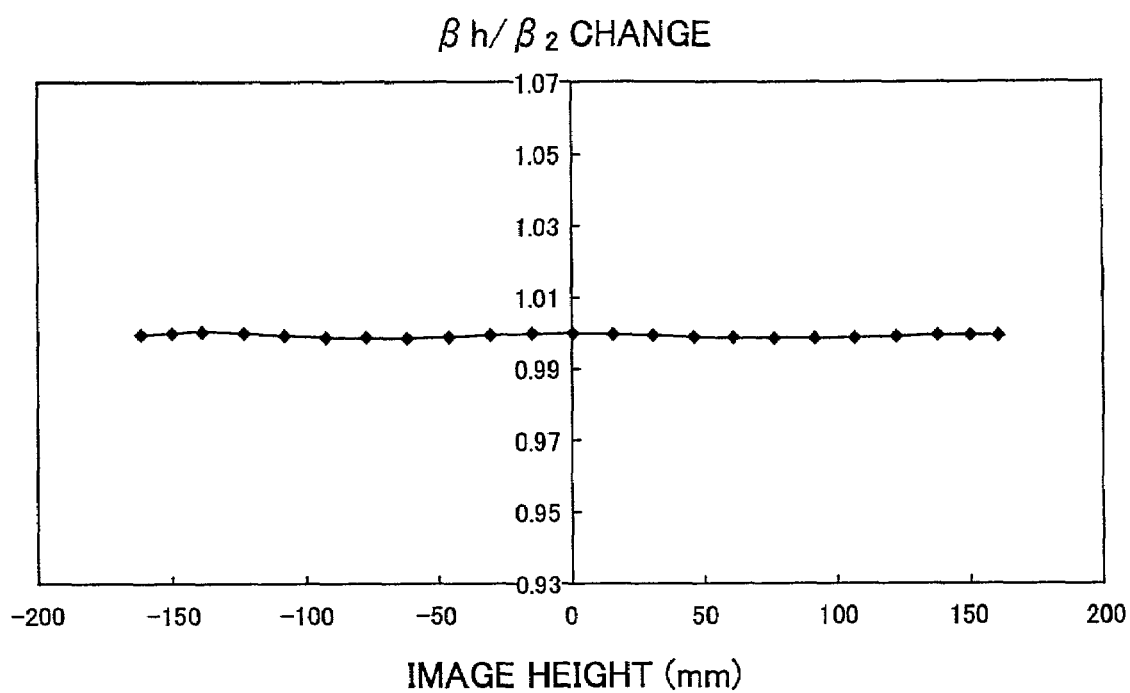
FIG. 13 shows change of a lateral magnification $\beta_h$ in sub-scanning direction at any image height with respect to a lateral magnification $\beta_2$ in the sub-scanning direction at the central image height of the scanning optical system of the example 3.

FIG. 13 shows change of the lateral magnification $\beta_h$ in the sub-scanning direction at any image height of beam spot with respect to the lateral magnification $\beta_2$ in the sub-scanning direction at the central image height of beam spot on the example 3 with regard to the light-emitting source ch1. As a result, $$0.998 \leq |\beta_h/\beta_2| \leq 1.000$$

Accordingly, the magnification change satisfies the above-mentioned condition (2), and is very well corrected.

Figure 12A:
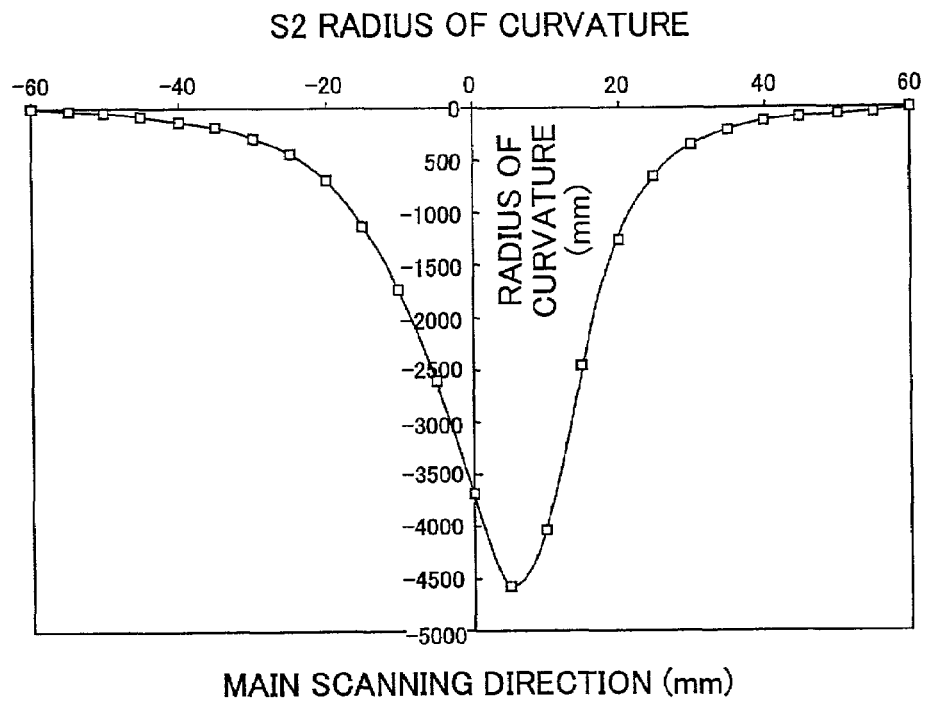
FIGS. 12A and 12B show states of change in main scanning direction of curvature in a sub-scanning section of surfaces S2 and S3 of the scanning optical system of the example 3.
Figure 12B:
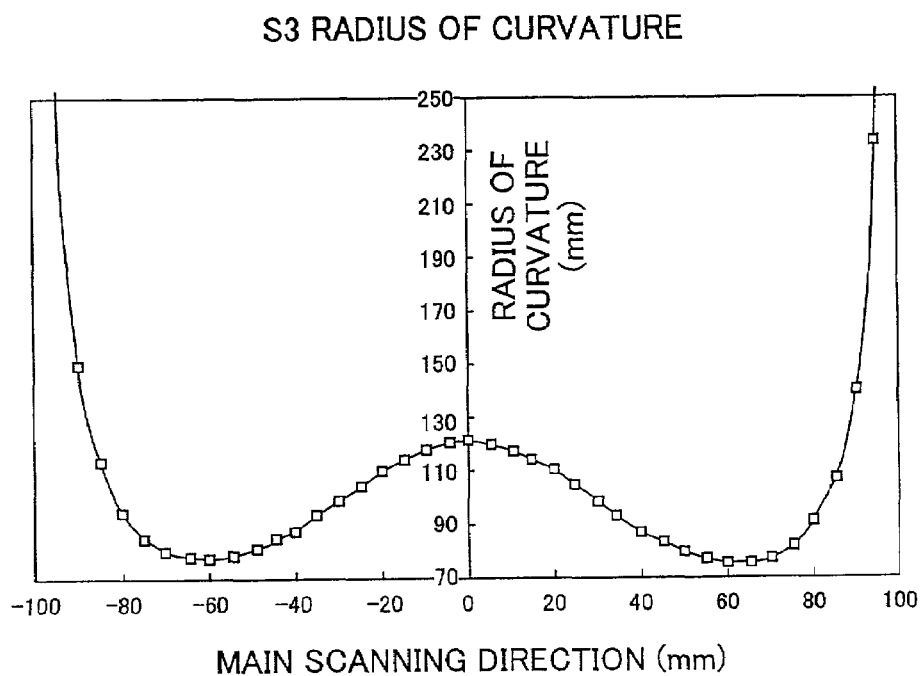

FIG. 12A shows variation of radius of curvature in the sub-scanning direction of the exit surface (S2) of the lens 6. FIG. 12B shows variation of radius of curvature in the sub-scanning direction of the entrance surface (S3) of the lens 7. Each of these surfaces is 'a surface in which a curvature in the sub-scanning direction varies asymmetrically in the main scanning direction'.

Figure 15A:
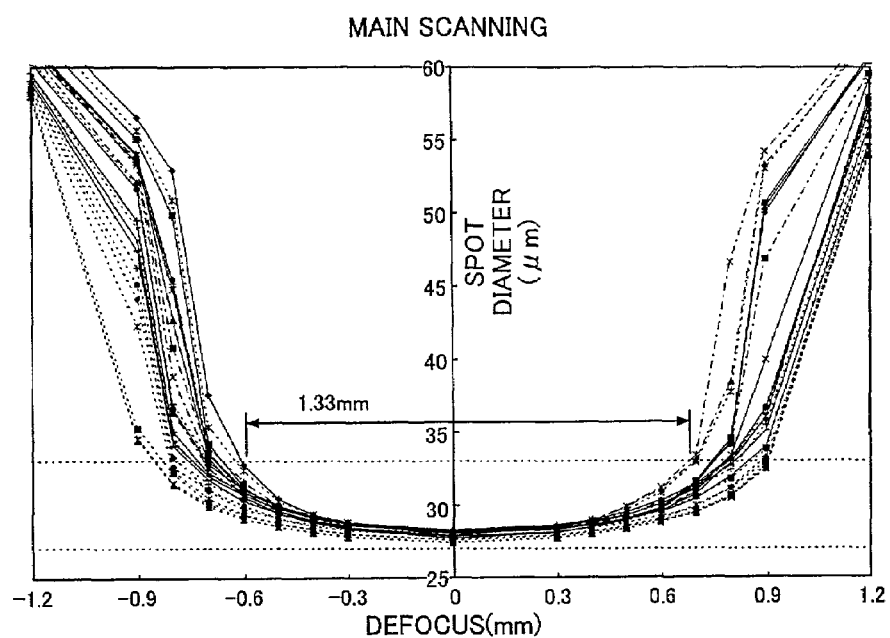
FIGS. 15A and 15B show depth curves of spot diameter for respective image heights for beam spot on the scanning optical system of the example 3.
Figure 15B:
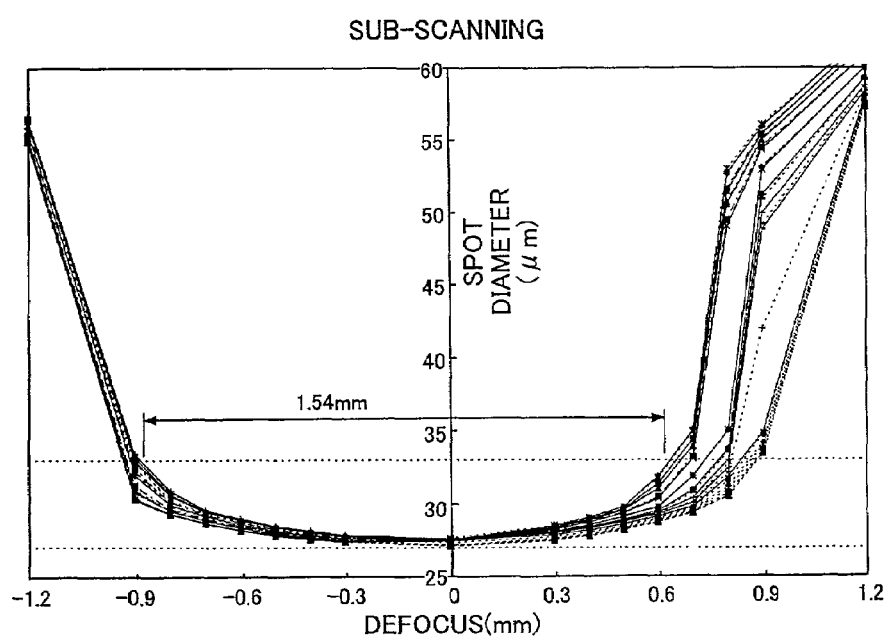

FIGS. 15A and 15B show 'depth curves of spot diameter (change of spot diameter with respect to defocus of beam spot)' for each image height of beam spot on the example 3 with regard to the light-emitting source ch1. In the figures, the image heights are total 21 image heights obtained from dividing ±150 mm into equal intervals. FIG. 15A is for the main scanning direction while FIG. 15B is for the sub-scanning direction.

In the example 3, the order of 30 μm is aimed as the spot diameter defined by the $1/e^2$ intensity of the line spread functions. As shown in the figures, satisfactory depths are provided for both the main and sub-scanning directions. Accordingly, an allowance for positional accuracy on the surface to be scanned is large.

In the example 3, a back length of 149.20 (mm) which is near to the half of the conjugate length of 316.21 (mm) in the sub-scanning direction of the scanning optical system is set.

The example 4 will now be described.

Figure 16:
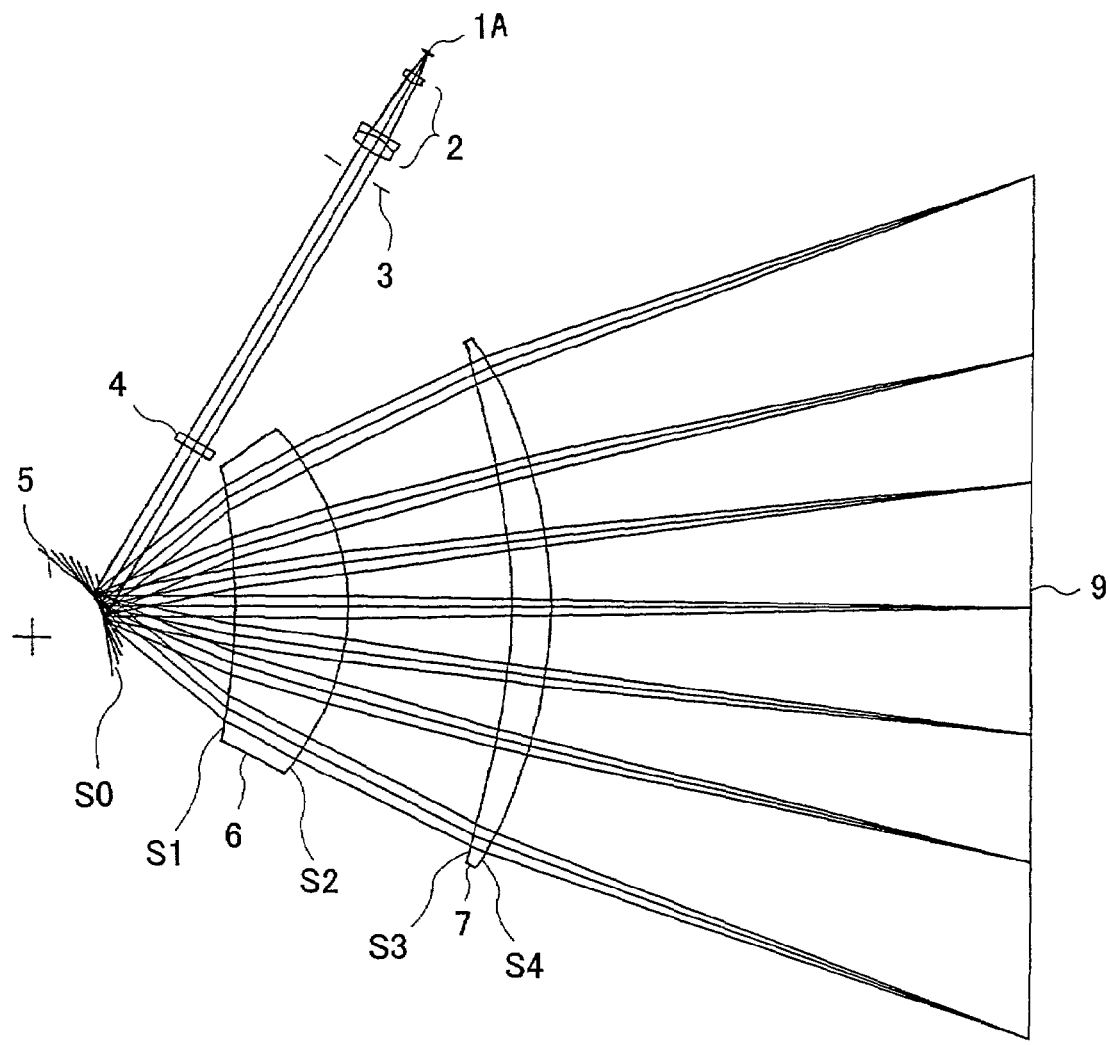
FIG. 16 shows an optical disposition of an scanning optical system of an example 4 according to the present invention.

FIG. 16 shows an optical disposition of the example 4 from the light source 1A to the surface 9 to be scanned.

Data concerning the configuration shown in FIG. 16 is as follows:

the light source 1A: a semiconductor laser array;
the number of light-emitting sources of the light source 1A: 4;
each of the intervals between light-emitting sources of the light source 1A: 30 μm;
the wavelength of light-emitting sources of the light source 1A: 655 nm;
the coupling lens 2: a configuration of two groups of three lenses (the second group consisting of joined lenses);

the focal length of the coupling lens 2: 22 mm;
the coupling function of the coupling lens 2: collimating function;
the aperture 3: the shape of opening: a rectangle;
the opening width in the main scanning direction of the aperture 3: 7.3 mm;
the opening width in the sub-scanning direction of the aperture 3: 2.7 mm;
the cylindrical lens 4: the focal length in the sub-scanning direction: 70.00 mm;
the polygon mirror 5: the number of deflection reflective surfaces: 5, the radius of inscribed circle: 25 mm, the incidence angle of beam from the side of light source: 60°; and
the method of scanning: 1200 dpi, fifth-order interlaced scanning.

Data concerning the optical systems disposed between the polygon mirror and the surface to be scanned will now be described.

|  | i | $R_{mi}$ | $R_{si}(0)$ | X | Y | n | $f_m$ | $f_s$ |
|---|---|---|---|---|---|---|---|---|
| DEFLECTION REFLECTIVE SURFACE | S0 | ∞ | ∞ | 45.64 | 0.107 |  |  |  |
| LENS 6 | S1 | −267.64 | −67.47 | 37.99 | 0 | 1.52716 | 220.645 | −645.213 |
|  | S2 | −85.05 | −100.52 | 55.54 | 0 |  |  |  |
| LENS 7 | S3 | −177.01 | −93.15 | 13.57 | 0 | 1.52716 | 2259.23 | 78.124 |
|  | S4 | −158.18 | −29.99 | 163.48 | 0 |  |  |  |

The values of the coefficients for the main scanning direction and sub-scanning direction of the respective lens surfaces are shown in the following tables 16 through 19.

TABLE 16

| SURFACE NUMBER | COEFFICIENTS FOR MAIN SCANNING DIRECTION | | COEFFICIENTS FOR SUB-SCANNING DIRECTION | |
|---|---|---|---|---|
| S1 | K | $4.428 \times 10^{-1}$ | $B_1$ | 0 |
|  | $A_1$ | 0 | $B_2$ | $3.098 \times 10^{-6}$ |
|  | $A_2$ | 0 | $B_3$ | 0 |
|  | $A_3$ | 0 | $B_4$ | $1.176 \times 10^{-9}$ |
|  | $A_4$ | $6.063 \times 10^{-8}$ | $B_5$ | 0 |
|  | $A_5$ | 0 | $B_6$ | $-1.802 \times 10^{-12}$ |
|  | $A_6$ | $9.481 \times 10^{-12}$ | $B_7$ | 0 |
|  | $A_7$ | 0 | $B_8$ | $9.414 \times 10^{-17}$ |
|  | $A_8$ | $-2.945 \times 10^{-14}$ | $B_9$ | 0 |
|  | $A_9$ | 0 | $B_{10}$ | $1.950 \times 10^{-19}$ |
|  | $A_{10}$ | $2.996 \times 10^{-18}$ | $B_{11}$ | 0 |
|  | $A_{11}$ | 0 | $B_{12}$ | $-4.977 \times 10^{-23}$ |

TABLE 17

| SURFACE NUMBER | COEFFICIENTS FOR MAIN SCANNING DIRECTION | | COEFFICIENTS FOR SUB-SCANNING DIRECTION | |
|---|---|---|---|---|
| S2 | K | $-2.222 \times 10^{-1}$ | $B_1$ | $1.355 \times 10^{-5}$ |
|  | $A_1$ | 0 | $B_2$ | $3.433 \times 10^{-6}$ |
|  | $A_2$ | 0 | $B_3$ | $-9.393 \times 10^{-10}$ |
|  | $A_3$ | 0 | $B_4$ | $4.292 \times 10^{-10}$ |
|  | $A_4$ | $1.596 \times 10^{-7}$ | $B_5$ | $9.002 \times 10^{-13}$ |
|  | $A_5$ | 0 | $B_6$ | $-1.897 \times 10^{-13}$ |
|  | $A_6$ | $3.575 \times 10^{-12}$ | $B_7$ | $5.383 \times 10^{-17}$ |
|  | $A_7$ | 0 | $B_8$ | $1.260 \times 10^{-17}$ |
|  | $A_8$ | $2.401 \times 10^{-15}$ | $B_9$ | $-3.246 \times 10^{-19}$ |
|  | $A_9$ | 0 | $B_{10}$ | $2.901 \times 10^{-21}$ |

TABLE 17-continued

| SURFACE NUMBER | COEFFICIENTS FOR MAIN SCANNING DIRECTION | | COEFFICIENTS FOR SUB-SCANNING DIRECTION | |
|---|---|---|---|---|
|  | $A_{10}$ | $-1.876 \times 10^{-18}$ | $B_{11}$ | $7.313 \times 10^{-23}$ |
|  | $A_{11}$ | 0 | $B_{12}$ | $-1.801 \times 10^{-24}$ |

TABLE 18

| SURFACE NUMBER | COEFFICIENTS FOR MAIN SCANNING DIRECTION | | COEFFICIENTS FOR SUB-SCANNING DIRECTION | |
|---|---|---|---|---|
| S3 | K | −10.338 | $B_1$ | $4.913 \times 10^{-6}$ |
|  | $A_1$ | 0 | $B_2$ | $3.559 \times 10^{-7}$ |
|  | $A_2$ | 0 | $B_3$ | $-2.289 \times 10^{-10}$ |

TABLE 18-continued

| SURFACE NUMBER | COEFFICIENTS FOR MAIN SCANNING DIRECTION | | COEFFICIENTS FOR SUB-SCANNING DIRECTION | |
|---|---|---|---|---|
|  | $A_3$ | 0 | $B_4$ | $-2.230 \times 10^{-11}$ |
|  | $A_4$ | $2.281 \times 10^{-8}$ | $B_5$ | $-1.335 \times 10^{-14}$ |
|  | $A_5$ | 0 | $B_6$ | $-2.025 \times 10^{-15}$ |
|  | $A_6$ | $-1.265 \times 10^{-12}$ | $B_7$ | $-7.151 \times 10^{-19}$ |
|  | $A_7$ | 0 | $B_8$ | $1.010 \times 10^{-19}$ |
|  | $A_8$ | $-1.414 \times 10^{-16}$ | $B_9$ | $2.697 \times 10^{-22}$ |
|  | $A_9$ | 0 | $B_{10}$ | $-4.387 \times 10^{-24}$ |
|  | $A_{10}$ | $3.525 \times 10^{-22}$ | $B_{11}$ | $1.186 \times 10^{-26}$ |
|  | $A_{11}$ | 0 | $B_{12}$ | $-3.566 \times 10^{-29}$ |
|  | $A_{12}$ | $-4.813 \times 10^{-25}$ | $B_{13}$ | $-4.909 \times 10^{-30}$ |
|  | $A_{13}$ | 0 | $B_{14}$ | $8.158 \times 10^{-32}$ |
|  | $A_{14}$ | $8.939 \times 10^{-30}$ | $B_{15}$ | $-6.431 \times 10^{-34}$ |
|  | $A_{15}$ | 0 | $B_{16}$ | $8.394 \times 10^{-36}$ |
|  | $A_{16}$ | $2.822 \times 10^{-33}$ | $B_{17}$ | $1.101 \times 10^{-37}$ |
|  | $A_{17}$ | 0 | $B_{18}$ | $-1.658 \times 10^{-39}$ |

TABLE 19

| SURFACE NUMBER | COEFFICIENTS FOR MAIN SCANNING DIRECTION | | COEFFICIENTS FOR SUB-SCANNING DIRECTION | |
|---|---|---|---|---|
| S4 | K | −6.806 | $B_1$ | 0 |
|  | $A_1$ | 0 | $B_2$ | $-4.444 \times 10^{-7}$ |
|  | $A_2$ | 0 | $B_3$ | 0 |
|  | $A_3$ | 0 | $B_4$ | $1.762 \times 10^{-11}$ |
|  | $A_4$ | $-9.182 \times 10^{-8}$ | $B_5$ | 0 |
|  | $A_5$ | 0 | $B_6$ | $-4.734 \times 10^{-15}$ |
|  | $A_6$ | $9.733 \times 10^{-13}$ | $B_7$ | 0 |
|  | $A_7$ | 0 | $B_8$ | $-1.365 \times 10^{-19}$ |
|  | $A_8$ | $-1.769 \times 10^{-17}$ | $B_9$ | 0 |
|  | $A_9$ | 0 | $B_{10}$ | $6.551 \times 10^{-24}$ |
|  | $A_{10}$ | $-4.377 \times 10^{-21}$ | $B_{11}$ | 0 |

TABLE 19-continued

| SURFACE NUMBER | COEFFICIENTS FOR MAIN SCANNING DIRECTION | | COEFFICIENTS FOR SUB-SCANNING DIRECTION | |
|---|---|---|---|---|
| | $A_{11}$ | 0 | $B_{12}$ | $8.161 \times 10^{-28}$ |
| | $A_{12}$ | $-4.279 \times 10^{-25}$ | $B_{13}$ | 0 |
| | $A_{13}$ | 0 | $B_{14}$ | $2.457 \times 10^{-32}$ |
| | $A_{14}$ | $-1.669 \times 10^{-29}$ | $B_{15}$ | 0 |
| | $A_{15}$ | 0 | $B_{16}$ | $-9.234 \times 10^{-35}$ |
| | $A_{16}$ | $4.860 \times 10^{-36}$ | $B_{17}$ | 0 |
| | $A_{17}$ | 0 | $B_{18}$ | $-7.820 \times 10^{-40}$ |

The values of the coefficients for the sub-scanning direction of the exit surface (S4) of the lens 7 are shown in the following table 20. In the table 20, '$C_0$' denotes '$Ks(0)$' in the first term of the right side of the expression (9).

TABLE 20

| S4 | | | | | | | |
|---|---|---|---|---|---|---|---|
| | $C_0$ | $3.179 \times 10^{-1}$ | $I_0$ | $5.539 \times 10^{-6}$ | $K_0$ | $1.068 \times 10^{-8}$ |
| | $C_1$ | $1.666 \times 10^{-4}$ | $I_1$ | $1.647 \times 10^{-10}$ | $K_1$ | $-2.423 \times 10^{-11}$ |
| | $C_2$ | $3.502 \times 10^{-5}$ | $I_2$ | $-1.724 \times 10^{-10}$ | $K_2$ | $1.252 \times 10^{-11}$ |
| | $C_3$ | $-1.036 \times 10^{-8}$ | $I_3$ | $-1.323 \times 10^{-12}$ | $K_3$ | $1.492 \times 10^{-13}$ |
| | $C_4$ | $-7.825 \times 10^{-8}$ | $I_4$ | $4.099 \times 10^{-13}$ | $K_4$ | $-2.065 \times 10^{-14}$ |
| | $C_5$ | $3.906 \times 10^{-11}$ | $I_5$ | $3.076 \times 10^{-15}$ | $K_5$ | $-1.727 \times 10^{-16}$ |
| | $C_6$ | $4.223 \times 10^{-11}$ | $I_6$ | $-2.408 \times 10^{-16}$ | $K_6$ | $1.074 \times 10^{-17}$ |
| | $C_7$ | $-3.443 \times 10^{-14}$ | $I_7$ | $-1.990 \times 10^{-18}$ | $K_7$ | $8.401 \times 10^{-20}$ |
| | $C_8$ | $-9.989 \times 10^{-15}$ | $I_8$ | $6.833 \times 10^{-20}$ | $K_8$ | $-2.381 \times 10^{-21}$ |
| | $C_9$ | $1.421 \times 10^{-17}$ | $I_9$ | $5.619 \times 10^{-22}$ | $K_9$ | $-1.941 \times 10^{-23}$ |
| | $C_{10}$ | $1.016 \times 10^{-18}$ | $I_{10}$ | $-1.049 \times 10^{-23}$ | $K_{10}$ | $2.228 \times 10^{-25}$ |
| | $C_{11}$ | $-2.583 \times 10^{-21}$ | $I_{11}$ | $-7.249 \times 10^{-26}$ | $K_{11}$ | $2.100 \times 10^{-27}$ |
| | $C_{12}$ | $-2.502 \times 10^{-23}$ | $I_{12}$ | $8.767 \times 10^{-28}$ | $K_{12}$ | $-4.727 \times 10^{-30}$ |
| | $C_{13}$ | $1.643 \times 10^{-25}$ | $I_{13}$ | $3.504 \times 10^{-30}$ | $K_{13}$ | $-8.558 \times 10^{-32}$ |
| | $C_{14}$ | $-1.441 \times 10^{-27}$ | $I_{14}$ | $-3.216 \times 10^{-32}$ | $K_{14}$ | $-2.798 \times 10^{-34}$ |

The lateral magnification $\beta_2$ of the scanning optical system in the example 4 in the sub-scanning direction at the central image height is as follows:

$$\beta_2 = 1.116$$

and it satisfies the above-mentioned condition (1).

Figure 19:
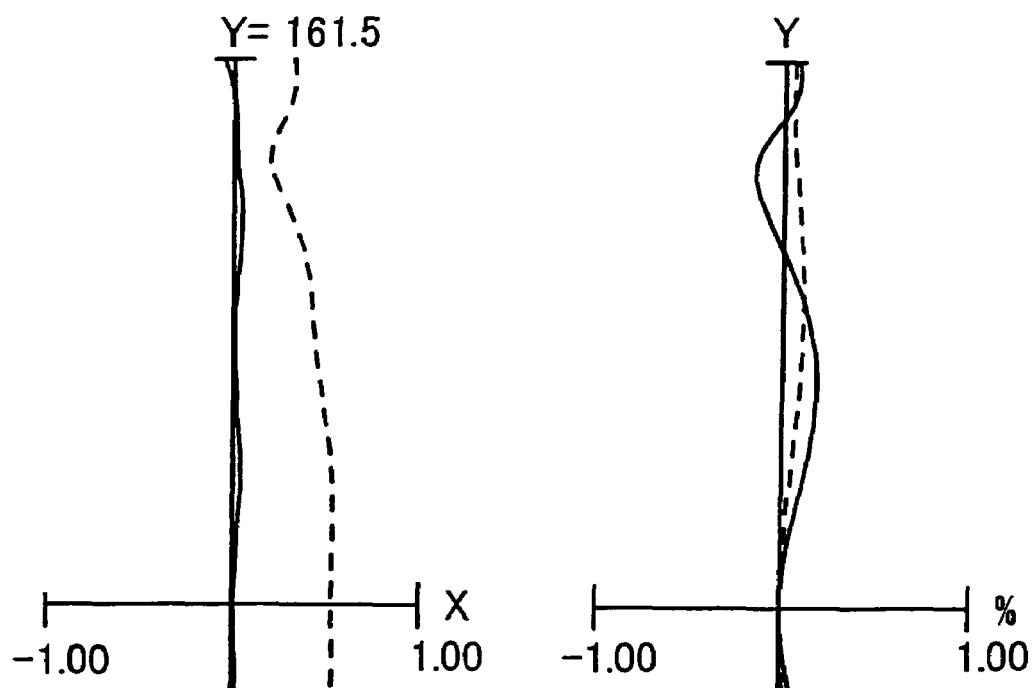
FIG. 19 shows curvature of field and uniform-velocity characteristics on the scanning optical system of the example 4.

FIG. 19 shows the curvature of field (the left figure; the solid line for the sub-scanning direction; the broken line for the main scanning direction) and the uniform-velocity characteristics (the right figure; the solid line for the linearity; the broken line for the f θ characteristic), with regard to the light-emitting source ch1 of the example 4.

The width of curvature of field for the entire scanning range 323 mm is 0.092 mm/323 mm in the sub-scanning direction, and 0.334 mm/323 mm in the main scanning direction.

The linearity of the uniform-velocity characteristics is 0.317%/323 mm.

Accordingly, both the curvature of field and uniform-velocity characteristics are very well corrected.

The sub-scanning curvature of field satisfies the above-mentioned condition (3). That is:

$$0.092/323 = 0.000285 < 0.005 \qquad (3)$$

Figure 18:
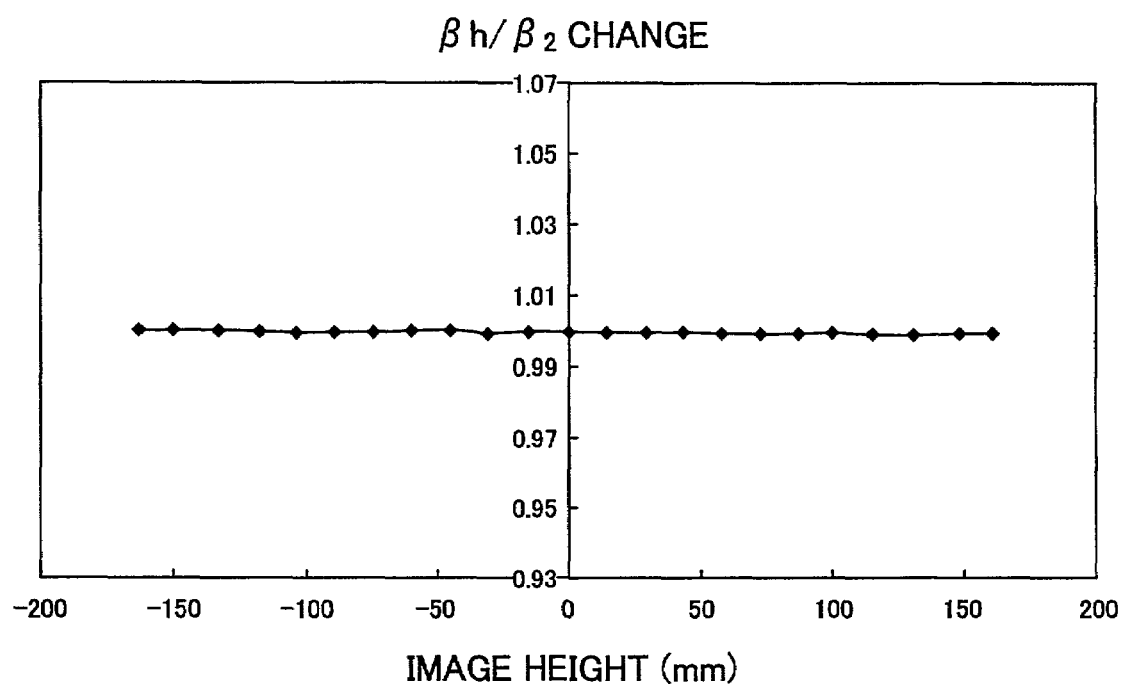
FIG. 18 shows change of a lateral magnification $\beta_h$ in sub-scanning direction at any image height with respect to a lateral magnification $\beta_2$ in the sub-scanning direction at the central image height of the scanning optical system of the example 4.

FIG. 18 shows change of the lateral magnification $\beta_h$ in the sub-scanning direction at any image height of beam spot with respect to the lateral magnification $\beta_2$ in the sub-scanning direction at the central image height of beam spot on the example 4 with regard to the light-emitting source ch1. As a result, $$|\beta_h/\beta_2| = 1.000$$

Accordingly, the magnification change satisfies the above-mentioned condition (2), and is very well corrected.

Figure 17A:
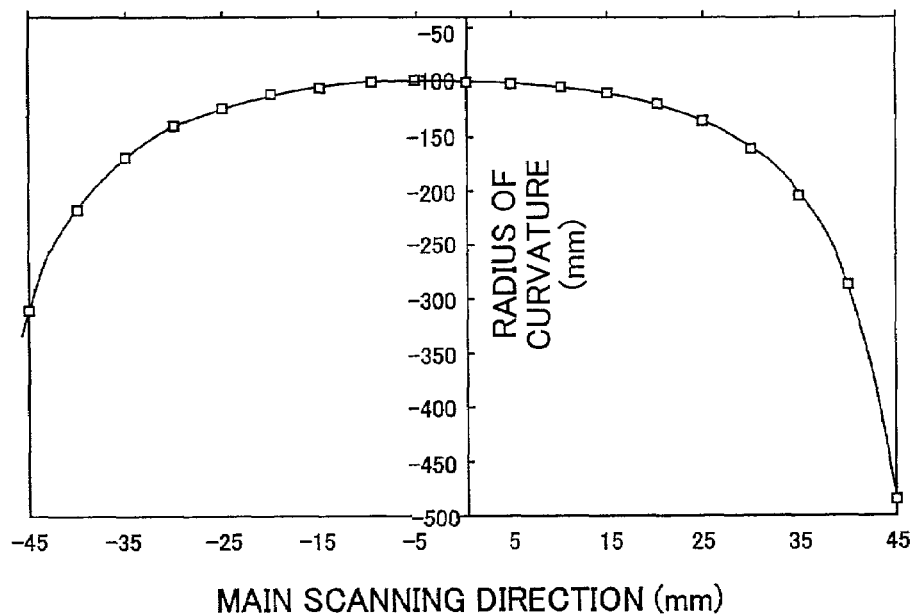
FIGS. 17A and 17B show states of change in main scanning direction of curvature in a sub-scanning section of surfaces S2 and S3 of the scanning optical system of the example 4.
Figure 17B:
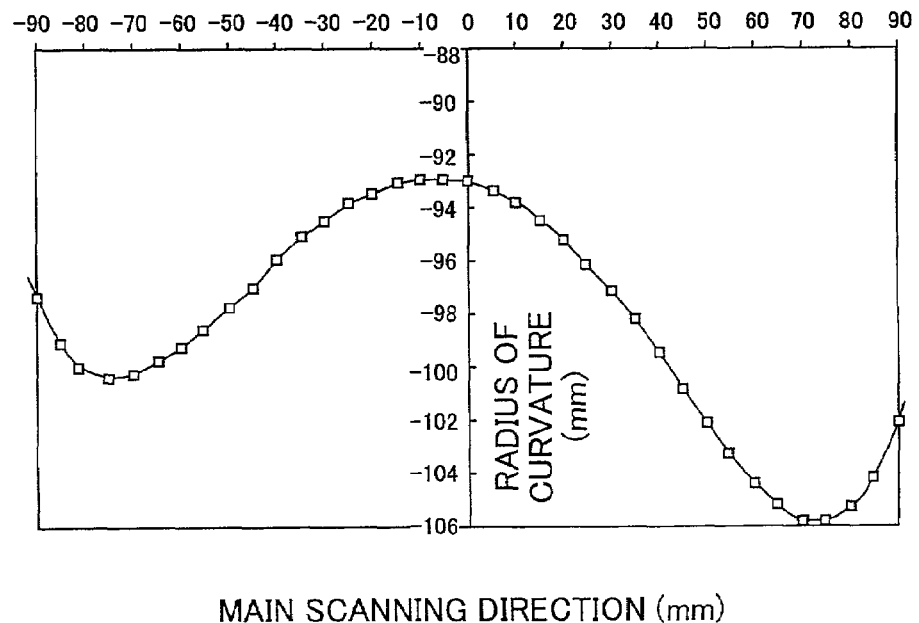

FIG. 17A shows variation of radius of curvature in the sub-scanning direction of the exit surface (S2) of the lens 6. FIG. 17B shows variation of radius of curvature in the sub-scanning direction of the entrance surface (S3) of the lens 7. Each of these surfaces is 'a surface in which a curvature in the sub-scanning direction varies asymmetrically in the main scanning direction'.

Figure 20A:
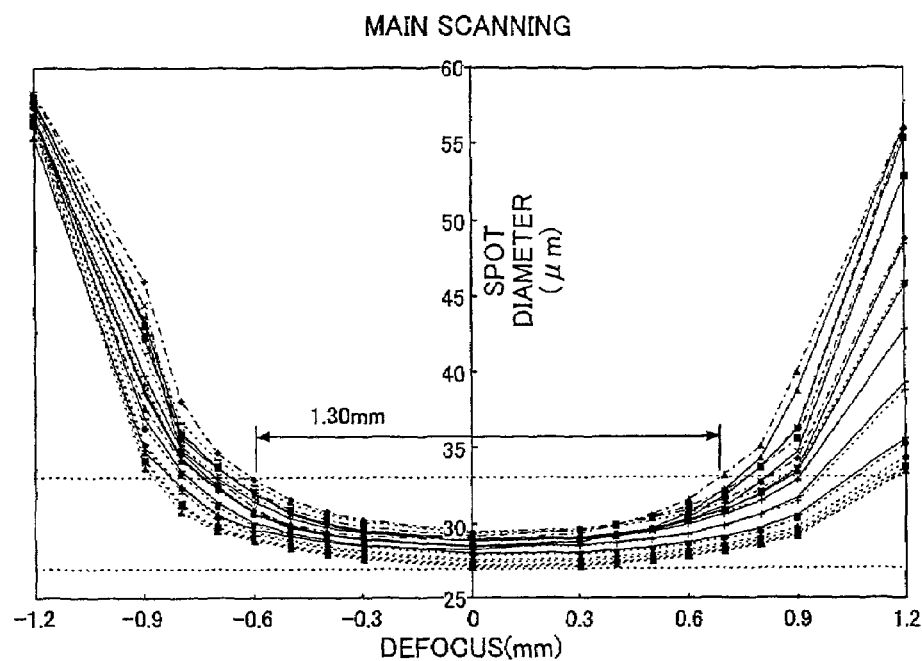
FIGS. 20A and 20B show depth curves of spot diameter for respective image heights of beam spot on the scanning optical system of the example 4.
Figure 20B:
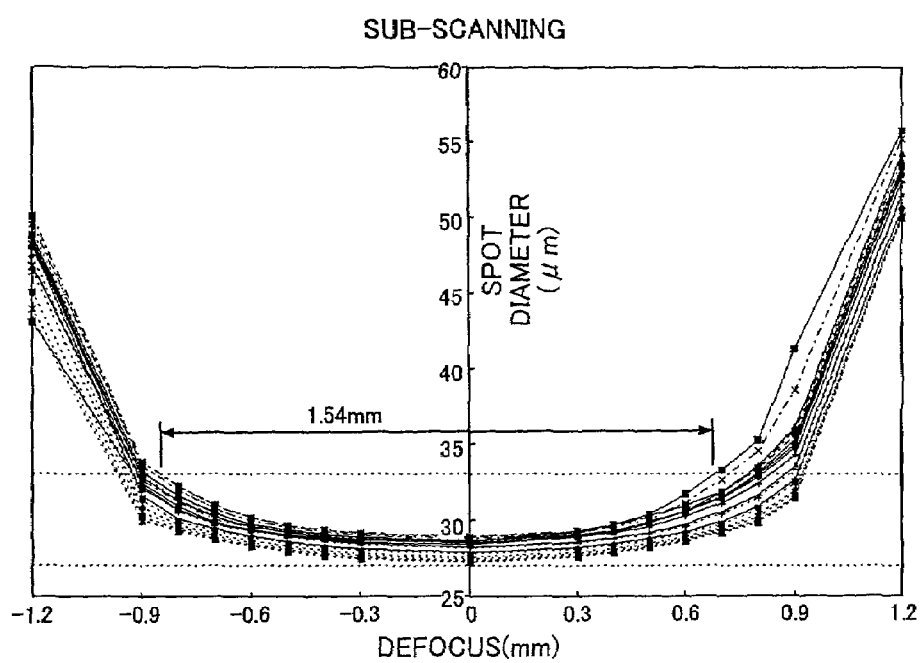

FIGS. 20A and 20B show 'depth curves of spot diameter (change of spot diameter with respect to defocus of beam spot)' for each image height of beam spot on the example 4 with regard to the light-emitting source ch1. In the figures, the image heights are total 21 image heights obtained from dividing ±150 mm into equal intervals. FIG. 20A is for the main scanning direction while FIG. 20B is for the sub-scanning direction.

In the example 4, the order of 30 μm is aimed as the spot diameter defined by the 1/e² intensity of the line spread functions. As shown in the figures, satisfactory depths are provided for both the main and sub-scanning directions. Accordingly, an allowance for positional accuracy on the surface to be scanned is large.

In the example 4, a back length of 163.48 (mm) which is larger than the half of the conjugate length of 316.22 (mm) in the sub-scanning direction of the scanning optical system is set.

The example 5 will now be described.

Figure 21:
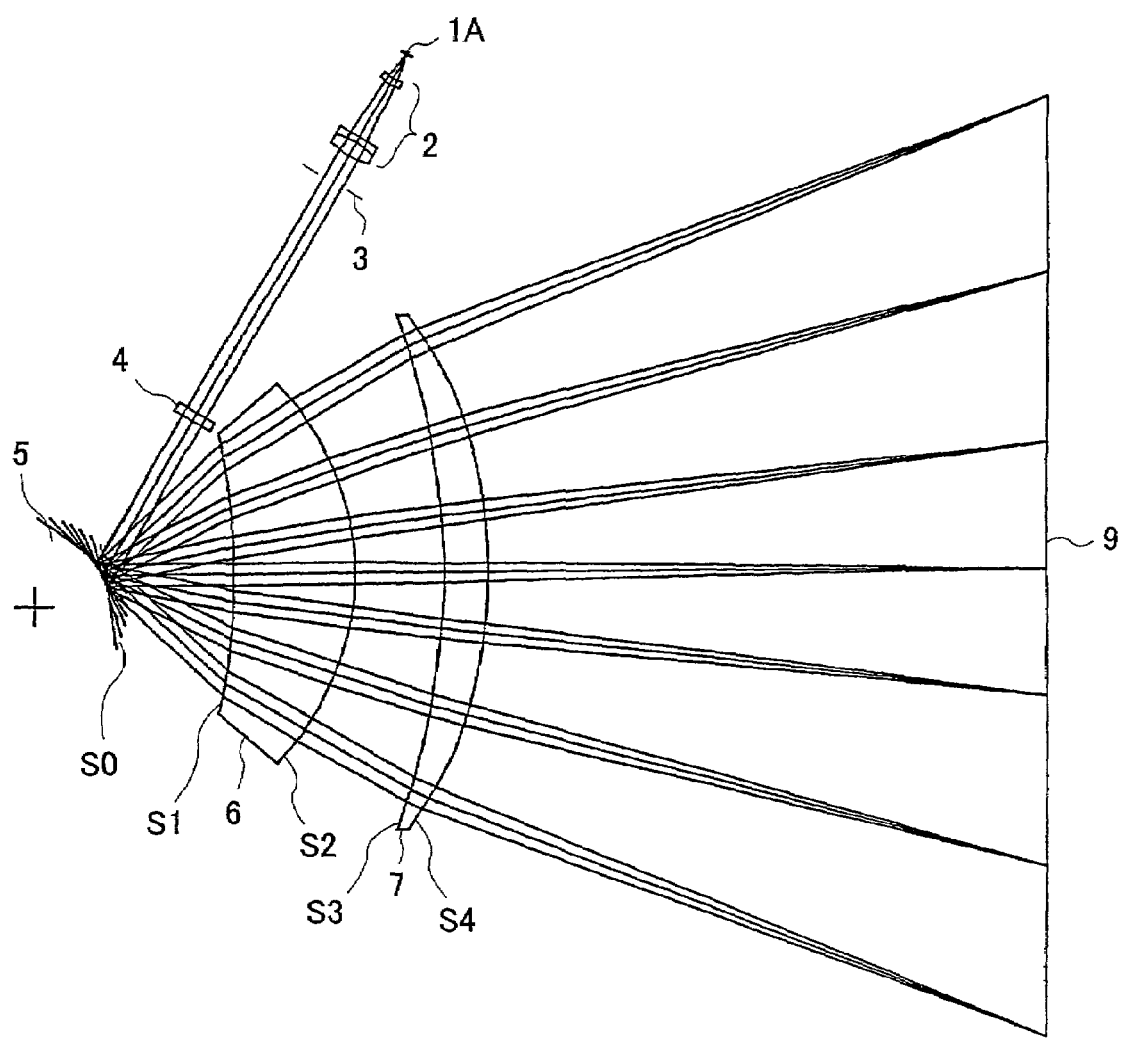
FIG. 21 shows an optical disposition of an scanning optical system of an example 5 according to the present invention.

FIG. 21 shows an optical disposition of the example 5 from the light source 1A to the surface 9 to be scanned.

Data concerning the configuration shown in FIG. 21 is as follows:

the light source 1A: a semiconductor laser array;
the number of light-emitting sources of the light source 1A: 4;
each of the intervals between the light-emitting sources of the light source 1A: 24 μm;
the wavelength of the light-emitting sources of the light source 1A: 655 nm;
the coupling lens 2: a configuration of two groups of three lenses (the second group consisting of joined lenses);
the focal length of the coupling lens 2: 22 mm;
the coupling function of the coupling lens 2: collimating function;
the aperture 3: the shape of opening: a rectangle;
the opening width in the main scanning direction of the aperture 3: 7.3 mm;
the opening width in the sub-scanning direction of the aperture 3: 3.6 mm;

the cylindrical lens 4: the focal length in the sub-scanning direction: 70.00 mm;

the polygon mirror 5: the number of deflection reflective surfaces: 5, the radius of inscribed circle: 25 mm, the incidence angle of beam from the side of light source: 60°; and the method of scanning: 1200 dpi, fifth-order interlaced scanning.

Data concerning the optical systems disposed between the polygon mirror and the surface to be scanned will now be described.

| | i | $R_{mi}$ | $R_{si}(0)$ | X | Y | n | $f_m$ | $f_s$ |
|---|---|---|---|---|---|---|---|---|
| DEFLECTION REFLECTIVE SURFACE | S0 | ∞ | ∞ | 43.58 | 0.144 | | | |
| LENS 6 | S1 | −244.39 | −35.00 | 40.40 | 0 | 1.52716 | 220.860 | −180.092 |
| | S2 | −83.36 | −77.53 | 30.00 | 0.137 | | | |
| LENS 7 | S3 | −208.08 | −104.52 | 15.00 | 0 | 1.52716 | 2281.08 | 74.349 |
| | S4 | −181.80 | −29.92 | 187.23 | 0 | | | |

The values of the coefficients for the main scanning direction and sub-scanning direction of the respective lens surfaces are shown in the following tables 21 through 24.

TABLE 21

| SURFACE NUMBER | | COEFFICIENTS FOR MAIN SCANNING DIRECTION | | COEFFICIENTS FOR SUB-SCANNING DIRECTION |
|---|---|---|---|---|
| S1 | K | 2.888 | $B_1$ | 0 |
| | $A_1$ | 0 | $B_2$ | $-1.574 \times 10^{-6}$ |
| | $A_2$ | 0 | $B_3$ | 0 |
| | $A_3$ | 0 | $B_4$ | 0 |
| | $A_4$ | $7.640 \times 10^{-8}$ | $B_5$ | 0 |
| | $A_5$ | 0 | $B_6$ | 0 |
| | $A_6$ | $1.221 \times 10^{-11}$ | $B_7$ | 0 |
| | $A_7$ | 0 | $B_8$ | 0 |
| | $A_8$ | $-3.300 \times 10^{-14}$ | $B_9$ | 0 |
| | $A_9$ | 0 | $B_{10}$ | 0 |
| | $A_{10}$ | $2.790 \times 10^{-18}$ | $B_{11}$ | 0 |

TABLE 22

| SURFACE NUMBER | | COEFFICIENTS FOR MAIN SCANNING DIRECTION | | COEFFICIENTS FOR SUB-SCANNING DIRECTION |
|---|---|---|---|---|
| S2 | K | $-2.576 \times 10^{-1}$ | $B_1$ | $2.739 \times 10^{-5}$ |
| | $A_1$ | 0 | $B_2$ | $1.968 \times 10^{-7}$ |
| | $A_2$ | 0 | $B_3$ | $-1.477 \times 10^{-9}$ |
| | $A_3$ | 0 | $B_4$ | $-1.677 \times 10^{-11}$ |
| | $A_4$ | $2.118 \times 10^{-7}$ | $B_5$ | $2.400 \times 10^{-13}$ |
| | $A_5$ | 0 | $B_6$ | $5.124 \times 10^{-14}$ |
| | $A_6$ | $9.387 \times 10^{-12}$ | $B_7$ | $-1.768 \times 10^{-16}$ |
| | $A_7$ | 0 | $B_8$ | $-6.908 \times 10^{-18}$ |
| | $A_8$ | $1.787 \times 10^{-15}$ | $B_9$ | $9.657 \times 10^{-20}$ |
| | $A_9$ | 0 | $B_{10}$ | $-5.878 \times 10^{-21}$ |
| | $A_{10}$ | $-1.778 \times 10^{-18}$ | $B_{11}$ | $-8.782 \times 10^{-24}$ |
| | $A_{11}$ | 0 | $B_{12}$ | $1.345 \times 10^{-24}$ |

TABLE 23

| SURFACE NUMBER | | COEFFICIENTS FOR MAIN SCANNING DIRECTION | | COEFFICIENTS FOR SUB-SCANNING DIRECTION |
|---|---|---|---|---|
| S3 | K | −5.961 | $B_1$ | $1.397 \times 10^{-5}$ |
| | $A_1$ | 0 | $B_2$ | $2.751 \times 10^{-7}$ |
| | $A_2$ | 0 | $B_3$ | $-1.574 \times 10^{-9}$ |
| | $A_3$ | 0 | $B_4$ | $3.243 \times 10^{-11}$ |
| | $A_4$ | $1.921 \times 10^{-8}$ | $B_5$ | $5.638 \times 10^{-14}$ |

TABLE 23-continued

| SURFACE NUMBER | | COEFFICIENTS FOR MAIN SCANNING DIRECTION | | COEFFICIENTS FOR SUB-SCANNING DIRECTION |
|---|---|---|---|---|
| | $A_5$ | 0 | $B_6$ | $-2.982 \times 10^{-16}$ |
| | $A_6$ | $-1.580 \times 10^{-12}$ | $B_7$ | $1.037 \times 10^{-17}$ |
| | $A_7$ | 0 | $B_8$ | $-9.628 \times 10^{-20}$ |
| | $A_8$ | $-1.745 \times 10^{-16}$ | $B_9$ | $-1.158 \times 10^{-21}$ |
| | $A_9$ | 0 | $B_{10}$ | $1.838 \times 10^{-23}$ |
| | $A_{10}$ | $-2.514 \times 10^{-21}$ | $B_{11}$ | $-1.312 \times 10^{-25}$ |
| | $A_{11}$ | 0 | $B_{12}$ | $2.929 \times 10^{-27}$ |
| | $A_{12}$ | $-5.947 \times 10^{-25}$ | $B_{13}$ | $1.842 \times 10^{-29}$ |
| | $A_{13}$ | 0 | $B_{14}$ | $-1.657 \times 10^{-32}$ |
| | $A_{14}$ | $3.117 \times 10^{-29}$ | $B_{15}$ | $3.668 \times 10^{-33}$ |
| | $A_{15}$ | 0 | $B_{16}$ | $-1.897 \times 10^{-35}$ |
| | $A_{16}$ | $8.070 \times 10^{-33}$ | $B_{17}$ | $-4.876 \times 10^{-37}$ |
| | $A_{17}$ | 0 | $B_{18}$ | $-1.139 \times 10^{-39}$ |

TABLE 24

| SURFACE NUMBER | | COEFFICIENTS FOR MAIN SCANNING DIRECTION | | COEFFICIENTS FOR SUB-SCANNING DIRECTION |
|---|---|---|---|---|
| S4 | K | $-6.895 \times 10^{-1}$ | $B_1$ | 0 |
| | $A_1$ | 0 | $B_2$ | $-3.580 \times 10^{-7}$ |
| | $A_2$ | 0 | $B_3$ | 0 |
| | $A_3$ | 0 | $B_4$ | $-6.006 \times 10^{-11}$ |
| | $A_4$ | $-8.875 \times 10^{-8}$ | $B_5$ | 0 |
| | $A_5$ | 0 | $B_6$ | $-5.483 \times 10^{-16}$ |
| | $A_6$ | $2.906 \times 10^{-13}$ | $B_7$ | 0 |
| | $A_7$ | 0 | $B_8$ | $2.966 \times 10^{-19}$ |
| | $A_8$ | $-7.094 \times 10^{-17}$ | $B_9$ | 0 |
| | $A_9$ | 0 | $B_{10}$ | $1.197 \times 10^{-23}$ |
| | $A_{10}$ | $-1.267 \times 10^{-21}$ | $B_{11}$ | 0 |
| | $A_{11}$ | 0 | $B_{12}$ | $-6.555 \times 10^{-28}$ |
| | $A_{12}$ | $-1.421 \times 10^{-25}$ | $B_{13}$ | 0 |
| | $A_{13}$ | 0 | $B_{14}$ | $-1.312 \times 10^{-32}$ |
| | $A_{14}$ | $-2.882 \times 10^{-29}$ | $B_{15}$ | 0 |
| | $A_{15}$ | 0 | $B_{16}$ | $1.106 \times 10^{-35}$ |
| | $A_{16}$ | $-5.970 \times 10^{-33}$ | $B_{17}$ | 0 |
| | $A_{17}$ | 0 | $B_{18}$ | $-3.362 \times 10^{-39}$ |

The values of the coefficients for the sub-scanning direction of the exit surface (S4) of the lens 7 are shown in the following table 25. In the table 25, 'C$_0$' denotes 'Ks(0)' in the first term of the right side of the expression (9).

TABLE 25

| S4 | C$_0$ | $-2.668 \times 10^{-1}$ | I$_0$ | $2.896 \times 10^{-6}$ | K$_0$ | $-9.272 \times 10^{-9}$ |
|---|---|---|---|---|---|---|
| | C$_1$ | $-6.042 \times 10^{-4}$ | I$_1$ | $-2.981 \times 10^{-9}$ | K$_1$ | $-1.151 \times 10^{-11}$ |
| | C$_2$ | $3.228 \times 10^{-5}$ | I$_2$ | $-4.408 \times 10^{-10}$ | K$_2$ | $2.914 \times 10^{-11}$ |
| | C$_3$ | $4.791 \times 10^{-7}$ | I$_3$ | $2.186 \times 10^{-12}$ | K$_3$ | $1.851 \times 10^{-14}$ |
| | C$_4$ | $-1.356 \times 10^{-8}$ | I$_4$ | $1.894 \times 10^{-13}$ | K$_4$ | $-1.147 \times 10^{-14}$ |
| | C$_5$ | $-7.388 \times 10^{-11}$ | I$_5$ | $-2.857 \times 10^{-16}$ | K$_5$ | $-4.651 \times 10^{-18}$ |
| | C$_6$ | $1.198 \times 10^{-12}$ | I$_6$ | $-2.421 \times 10^{-17}$ | K$_6$ | $1.553 \times 10^{-18}$ |
| | C$_7$ | $3.208 \times 10^{-15}$ | I$_7$ | $1.069 \times 10^{-20}$ | K$_7$ | $3.213 \times 10^{-22}$ |
| | C$_8$ | $-2.300 \times 10^{-17}$ | I$_8$ | $1.012 \times 10^{-21}$ | K$_8$ | $-6.971 \times 10^{-23}$ |

The lateral magnification $\beta_2$ of the scanning optical system in the example 5 in the sub-scanning direction at the central image height is as follows:

$$\beta_2 = 1.383$$

and it satisfies the above-mentioned condition (1).

Figure 24:
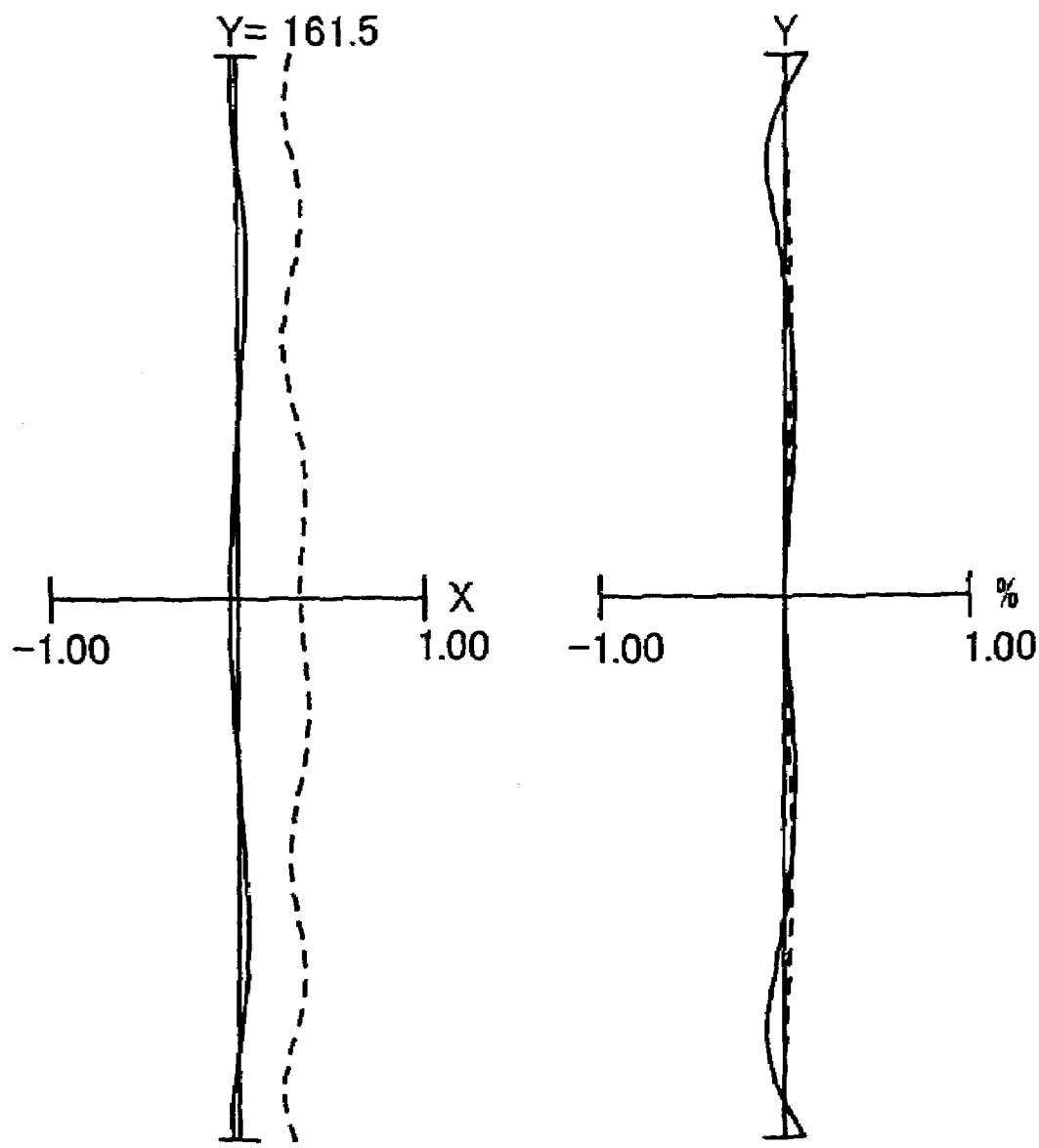
FIG. 24 shows curvature of field and uniform-velocity characteristics on the scanning optical system of the example 5.

FIG. 24 shows the curvature of field (the left figure; the solid line for the sub-scanning direction; the broken line for the main scanning direction) and the uniform-velocity characteristics (the right figure; the solid line for the linearity; the broken line for the f θ characteristic), with regard to the light-emitting source ch1 of the example 5.

The width of curvature of field for the entire scanning range 323 mm is 0.093 mm/323 mm in the sub-scanning direction, and 0.133 mm/323 mm in the main scanning direction. The linearity of the uniform-velocity characteristics is 0.218%/323 mm. Accordingly, both the curvature of field and uniform-velocity characteristics are very well corrected.

The sub-scanning curvature of field satisfies the above-mentioned condition (3). That is:

$$0.093/323 = 0.000288 < 0.005 \qquad (3)$$

Figure 23:
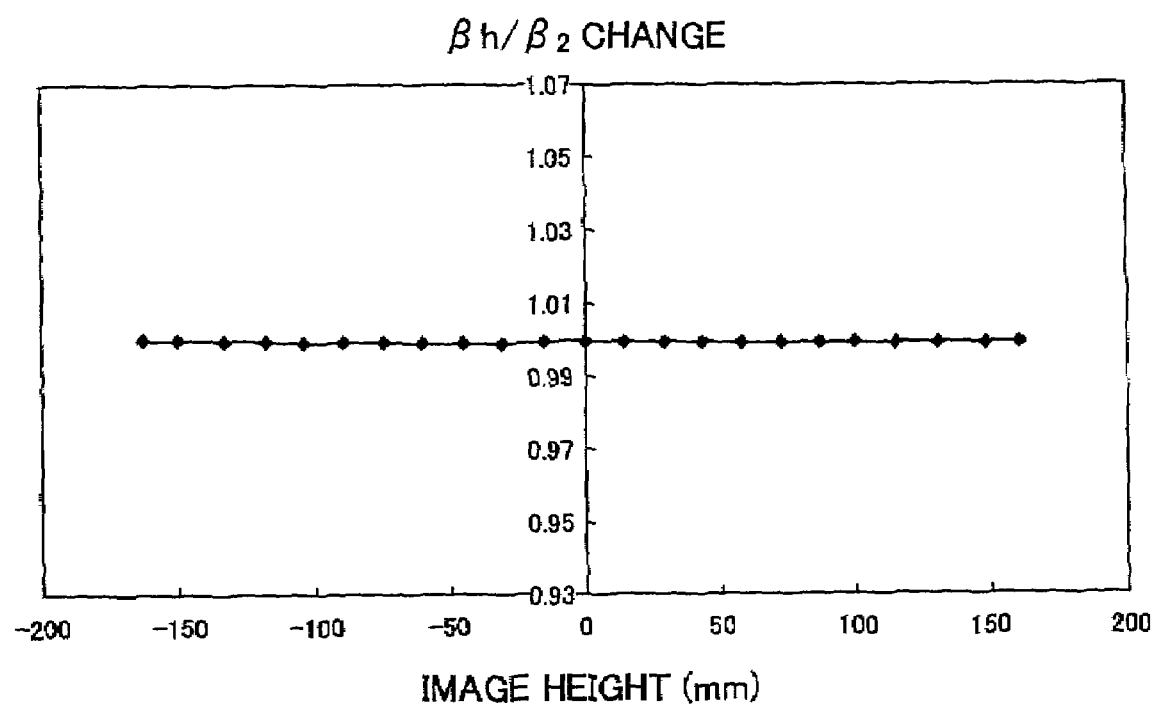
FIG. 23 shows change of a lateral magnification $\beta_h$ in sub-scanning direction at any image height with respect to a lateral magnification 2 in the sub-scanning direction at the central image height of the scanning optical system of the example 5.

FIG. 23 shows change of the lateral magnification $\beta_h$ in the sub-scanning direction at any image height of beam spot with respect to the lateral magnification $\beta_2$ in the sub-scanning direction at the central image height of beam spot on the example 5 with regard to the light-emitting source ch1. As a result, $$|\beta_h/\beta_2| = 1.000$$

Accordingly, the magnification change satisfies the above-mentioned condition (2), and is very well corrected.

Figure 22A:
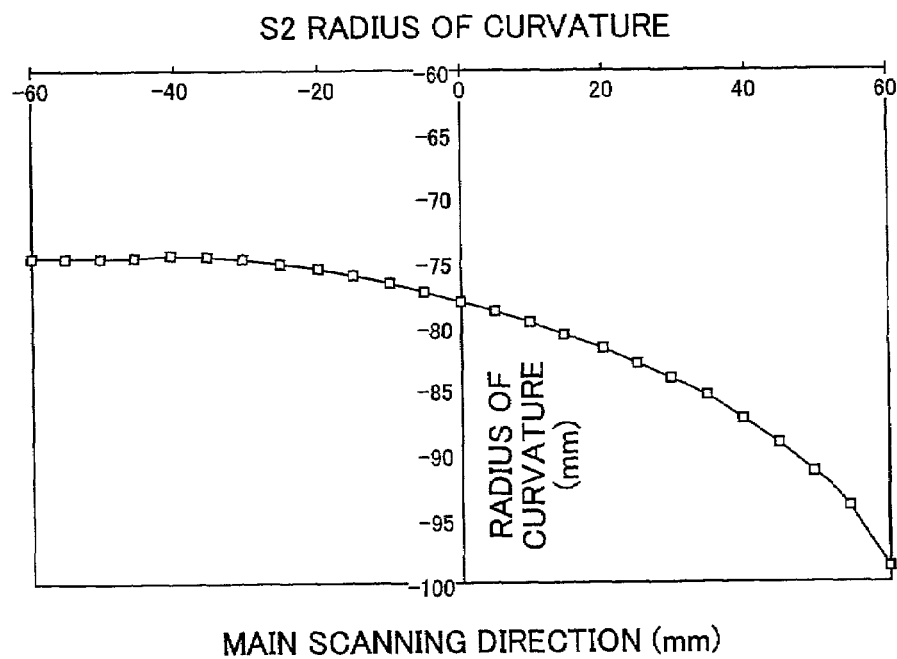
FIGS. 22A and 22B show states of change in main scanning direction of curvature in a sub-scanning section of surfaces S2 and S3 of the scanning optical system of the example 5.
Figure 22B:
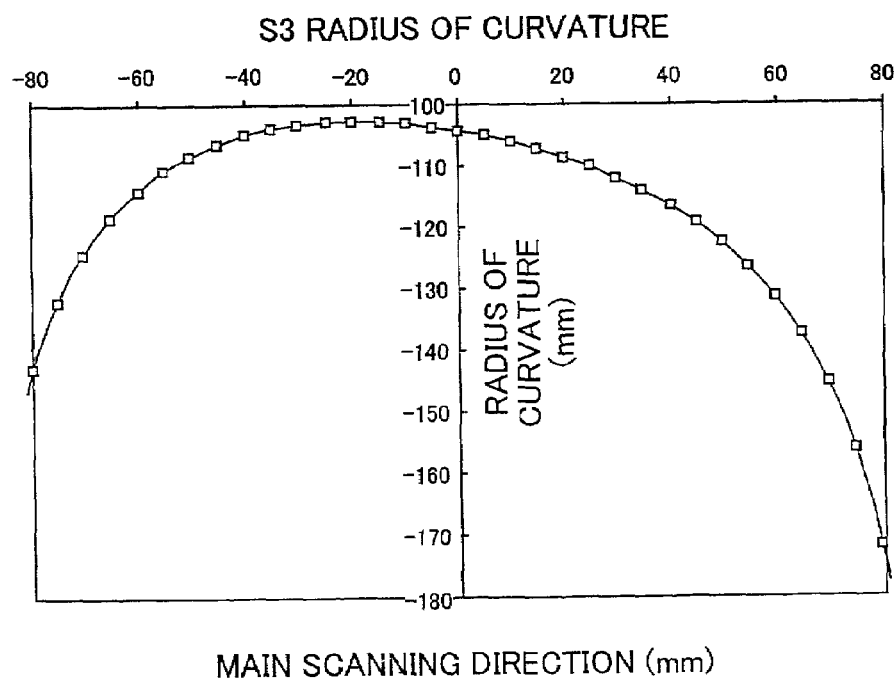

FIG. 22A shows variation of radius of curvature in the sub-scanning direction of the exit surface (S2) of the lens 6. FIG. 22B shows variation of radius of curvature in the sub-scanning direction of the entrance surface (S3) of the lens 7. Each of these surfaces is 'a surface in which a curvature in the sub-scanning direction varies asymmetrically in the main scanning direction'.

Figure 25A:
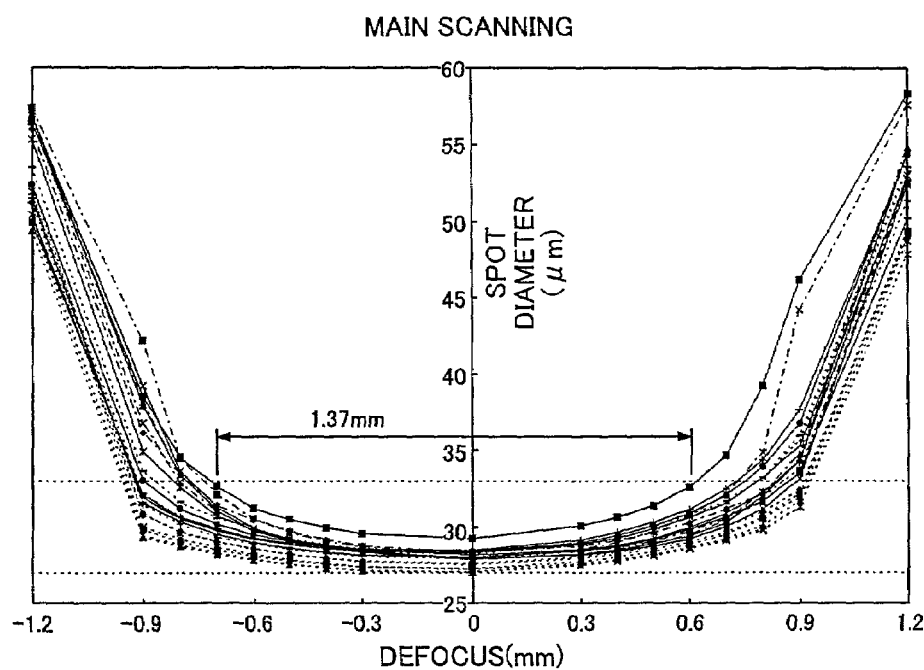
FIGS. 25A and 25B show depth curves of spot diameter for respective image heights of beam spot on the scanning optical system of the example 5.
Figure 25B:
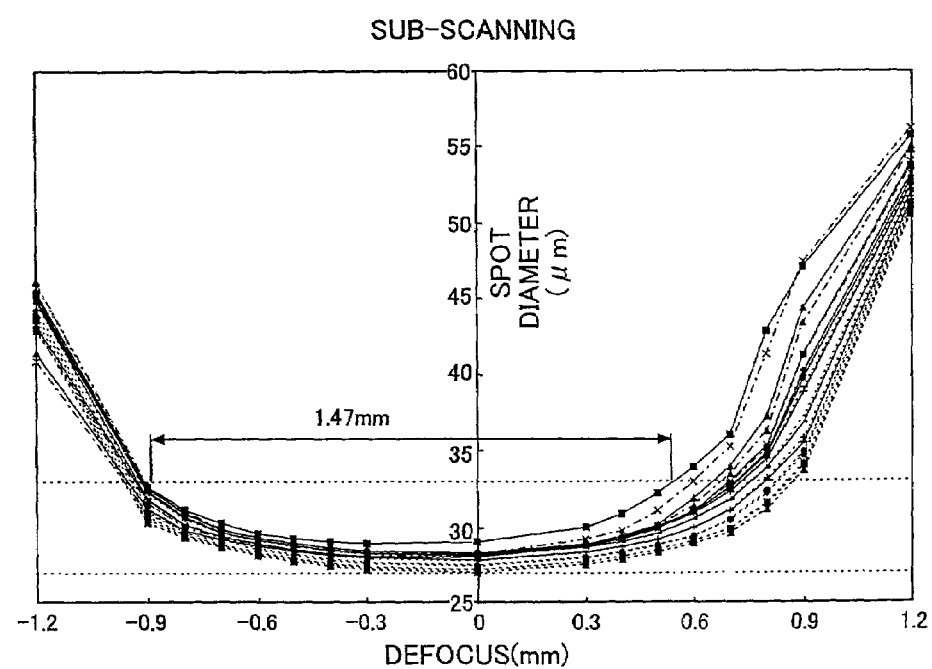

FIGS. 25A and 25B show 'depth curves of spot diameter (change of spot diameter with respect to defocus of beam spot)' for each image height of beam spot on the example 5 with regard to the light-emitting source ch1. In the figures, the image heights are total 21 image heights obtained from dividing ±150 mm into equal intervals. FIG. 25A is for the main scanning direction while FIG. 25B is for the sub-scanning direction.

In the example 5, the order of 30 μm is aimed as the spot diameter defined by the 1/e$^2$ intensity of the line spread functions. As shown in the figures, satisfactory depths are provided for both the main and sub-scanning directions. Accordingly, an allowance for positional accuracy on the surface to be scanned is large.

In the example 5, a back length of 187.23 (mm) which is larger than the half of the conjugate length of 316.21 (mm) in the sub-scanning direction of the scanning optical system is determined.

The example 6 will now be described.

Figure 26:
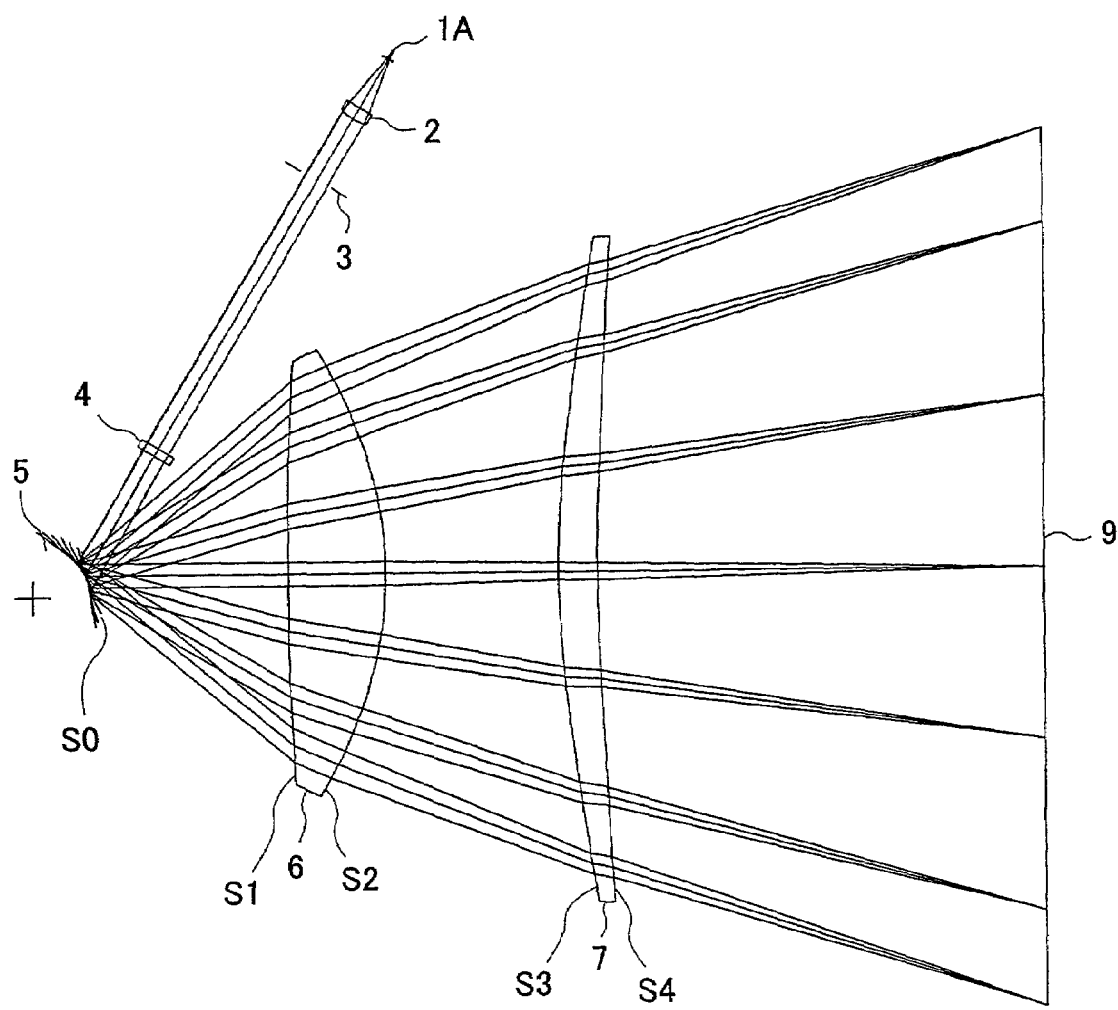
FIG. 26 shows an optical disposition of an scanning optical system of an example 6 according to the present invention.

FIG. 26 shows an optical disposition of the example 6 from the light source 1A to the surface 9 to be scanned.

Data concerning the configuration shown in FIG. 26 is as follows:

the light source 1A: a semiconductor laser array;

the number of light-emitting sources of the light source 1A: 4;

each of the intervals between light-emitting sources of the light source 1A: 14 μm;

the wavelength of light-emitting sources of the light source 1A: 780 nm;

the coupling lens 2: a configuration of a single lens;

the focal length of the coupling lens 2: 27 mm;

the coupling function of the coupling lens 2: collimating function;

the aperture 3: the shape of opening: a rectangle;

the opening width in the main scanning direction of the aperture 3: 9.0 mm;

the opening width in the sub-scanning direction of the aperture 3: 1.6 mm;

the cylindrical lens 4: the focal length in the sub-scanning direction: 58.69 mm;

the polygon mirror 5: the number of deflection reflective surfaces: 5, the radius of inscribed circle: 20 mm, the incidence angle of beam from the side of light source: 60°; and the method of scanning: 1200 dpi, adjacent scanning.

Data concerning the optical systems disposed between the polygon mirror and the surface to be scanned will now be described.

|  | i | $R_{mi}$ | $R_{si}(0)$ | X | Y | n | $f_m$ | $f_s$ |
|---|---|---|---|---|---|---|---|---|
| DEFLECTION REFLECTIVE SURFACE | S0 | ∞ | ∞ |  | 72.56 | 0.406 |  |  |
| LENS 6 | S1 | 1616.43 | −50.14 | 35.00 | 0 | 1.52398 | 254.832 | −126.992 |
|  | S2 | −146.51 | −199.81 | 61.93 | 0.403 |  |  |  |
| LENS 7 | S3 | 400.87 | −72.03 | 14.00 | 0 | 1.52398 | 1462.726 | 76.504 |
|  | S4 | 824.88 | −27.59 | 158.52 | 0 |  |  |  |

The values of the coefficients for the main scanning direction and sub-scanning direction of the respective lens surfaces are shown in the following tables 26 through 29.

TABLE 26

| SURFACE NUMBER | COEFFICIENTS FOR MAIN SCANNING DIRECTION | | COEFFICIENTS FOR SUB-SCANNING DIRECTION | |
|---|---|---|---|---|
| S1 | K | $1.976 \times 10^{+2}$ | $B_1$ | $-1.162 \times 10^{-5}$ |
|  | $A_1$ | 0 | $B_2$ | $2.276 \times 10^{-6}$ |
|  | $A_2$ | 0 | $B_3$ | $2.714 \times 10^{-9}$ |
|  | $A_3$ | 0 | $B_4$ | $-1.544 \times 10^{-10}$ |
|  | $A_4$ | $1.281 \times 10^{-8}$ | $B_5$ | $-4.265 \times 10^{-13}$ |
|  | $A_5$ | 0 | $B_6$ | $6.417 \times 10^{-15}$ |
|  | $A_6$ | $-6.374 \times 10^{-13}$ | $B_7$ | $9.179 \times 10^{-19}$ |
|  | $A_7$ | 0 | $B_8$ | $-1.230 \times 10^{-19}$ |
|  | $A_8$ | $-9.428 \times 10^{-17}$ | $B_9$ | $1.453 \times 10^{-20}$ |
|  | $A_9$ | 0 | $B_{10}$ | $-1.881 \times 10^{-22}$ |
|  | $A_{10}$ | $5.965 \times 10^{-21}$ | $B_{11}$ | $-1.468 \times 10^{-24}$ |
|  | $A_{11}$ | 0 | $B_{12}$ | $-2.670 \times 10^{-26}$ |

TABLE 27

| SURFACE NUMBER | COEFFICIENTS FOR MAIN SCANNING DIRECTION | | COEFFICIENTS FOR SUB-SCANNING DIRECTION | |
|---|---|---|---|---|
| S2 | K | $-1.857 \times 10^{-1}$ | $B_1$ | 0 |
|  | $A_1$ | 0 | $B_2$ | $-2.125 \times 10^{-6}$ |
|  | $A_2$ | 0 | $B_3$ | 0 |
|  | $A_3$ | 0 | $B_4$ | $1.805 \times 10^{-11}$ |
|  | $A_4$ | $1.774 \times 10^{-8}$ | $B_5$ | 0 |
|  | $A_5$ | 0 | $B_6$ | $2.716 \times 10^{-14}$ |
|  | $A_6$ | $1.384 \times 10^{-13}$ | $B_7$ | 0 |
|  | $A_7$ | 0 | $B_8$ | $6.924 \times 10^{-19}$ |
|  | $A_8$ | $-4.354 \times 10^{-17}$ | $B_9$ | 0 |
|  | $A_9$ | 0 | $B_{10}$ | $-2.685 \times 10^{-22}$ |
|  | $A_{10}$ | $7.168 \times 10^{-21}$ | $B_{11}$ | 0 |
|  | $A_{11}$ | 0 | $B_{12}$ | $-5.778 \times 10^{-26}$ |

TABLE 28

| SURFACE NUMBER | COEFFICIENTS FOR MAIN SCANNING DIRECTION | | COEFFICIENTS FOR SUB-SCANNING DIRECTION | |
|---|---|---|---|---|
| S3 | K | −12.60 | $B_1$ | 0 |
|  | $A_1$ | 0 | $B_2$ | $-1.962 \times 10^{-7}$ |
|  | $A_2$ | 0 | $B_3$ | 0 |
|  | $A_3$ | 0 | $B_4$ | $2.230 \times 10^{-11}$ |
|  | $A_4$ | $-7.349 \times 10^{-9}$ | $B_5$ | 0 |
|  | $A_5$ | 0 | $B_6$ | $-1.022 \times 10^{-15}$ |
|  | $A_6$ | $-2.106 \times 10^{-13}$ | $B_7$ | 0 |
|  | $A_7$ | 0 | $B_8$ | $1.081 \times 10^{-20}$ |
|  | $A_8$ | $8.173 \times 10^{-18}$ | $B_9$ | 0 |
|  | $A_9$ | 0 | $B_{10}$ | $6.363 \times 10^{-25}$ |
|  | $A_{10}$ | $5.409 \times 10^{-22}$ | $B_{11}$ | 0 |
|  | $A_{11}$ | 0 | $B_{12}$ | $-3.645 \times 10^{-29}$ |
|  | $A_{12}$ | $-1.082 \times 10^{-26}$ | $B_{13}$ | 0 |
|  | $A_{13}$ | 0 | $B_{14}$ | 0 |
|  | $A_{14}$ | $-2.039 \times 10^{-32}$ | $B_{15}$ | 0 |

TABLE 29

| SURFACE NUMBER | COEFFICIENTS FOR MAIN SCANNING DIRECTION | | COEFFICIENTS FOR SUB-SCANNING DIRECTION | |
|---|---|---|---|---|
| S4 | K | −71.068 | $B_1$ | $-8.546 \times 10^{-7}$ |
|  | $A_1$ | 0 | $B_2$ | $4.161 \times 10^{-7}$ |
|  | $A_2$ | 0 | $B_3$ | $-2.523 \times 10^{-11}$ |
|  | $A_3$ | 0 | $B_4$ | $-2.960 \times 10^{-11}$ |
|  | $A_4$ | $-1.324 \times 10^{-8}$ | $B_5$ | $2.114 \times 10^{-16}$ |
|  | $A_5$ | 0 | $B_6$ | $1.160 \times 10^{-15}$ |
|  | $A_6$ | $9.662 \times 10^{-14}$ | $B_7$ | $4.372 \times 10^{-22}$ |
|  | $A_7$ | 0 | $B_8$ | $-1.098 \times 10^{-21}$ |
|  | $A_8$ | $1.888 \times 10^{-17}$ | $B_9$ | $5.560 \times 10^{-24}$ |
|  | $A_9$ | 0 | $B_{10}$ | $-7.785 \times 10^{-25}$ |
|  | $A_{10}$ | $-3.102 \times 10^{-22}$ | $B_{11}$ | $-1.617 \times 10^{-29}$ |
|  | $A_{11}$ | 0 | $B_{12}$ | $3.262 \times 10^{-30}$ |
|  | $A_{12}$ | $7.298 \times 10^{-27}$ | $B_{13}$ | 0 |
|  | $A_{13}$ | 0 | $B_{14}$ | 0 |
|  | $A_{14}$ | $2.305 \times 10^{-32}$ | $B_{15}$ | 0 |

The values of the coefficients for the sub-scanning direction of the exit surface (S4) of the lens 7 are shown in the following table 30. In the table 25, '$C_0$' denotes 'Ks(0)' in the first term of the right side of the expression (9).

TABLE 30

| S4 | | | | | |
|---|---|---|---|---|---|
| $C_0$ | $-3.940 \times 10^{-1}$ | $I_0$ | $2.869 \times 10^{-6}$ | $K_0$ | $-1.526 \times 10^{-9}$ |
| $C_1$ | $1.796 \times 10^{-4}$ | $I_1$ | $4.012 \times 10^{-11}$ | $K_1$ | $-3.101 \times 10^{-11}$ |
| $C_2$ | $2.425 \times 10^{-6}$ | $I_2$ | $1.690 \times 10^{-11}$ | $K_2$ | $-8.903 \times 10^{-12}$ |
| $C_3$ | $4.438 \times 10^{-8}$ | $I_3$ | $3.572 \times 10^{-14}$ | $K_3$ | $5.017 \times 10^{-14}$ |
| $C_4$ | $4.584 \times 10^{-10}$ | $I_4$ | $-8.742 \times 10^{-15}$ | $K_4$ | $3.241 \times 10^{-15}$ |
| $C_5$ | $-2.438 \times 10^{-12}$ | $I_5$ | $1.964 \times 10^{-18}$ | $K_5$ | $-7.703 \times 10^{-18}$ |
| $C_6$ | $-3.396 \times 10^{-14}$ | $I_6$ | $8.603 \times 10^{-19}$ | $K_6$ | $-4.104 \times 10^{-19}$ |
| $C_7$ | $4.132 \times 10^{-17}$ | $I_7$ | $6.160 \times 10^{-23}$ | $K_7$ | $5.118 \times 10^{-22}$ |
| $C_8$ | $6.805 \times 10^{-19}$ | $I_8$ | $-3.347 \times 10^{-23}$ | $K_8$ | $2.368 \times 10^{-23}$ |
| $C_9$ | 0 | $I_9$ | $-3.693 \times 10^{-28}$ | $K_9$ | $-1.550 \times 10^{-26}$ |
| $C_{10}$ | 0 | $I_{10}$ | $4.53553 \times 10^{-28}$ | $K_{10}$ | $-6.371 \times 10^{-28}$ |
| $C_{11}$ | 0 | $I_{11}$ | 0 | $K_{11}$ | $1.748 \times 10^{-31}$ |
| $C_{12}$ | 0 | $I_{12}$ | 0 | $K_{12}$ | $6.503 \times 10^{-33}$ |

The lateral magnification $\beta_2$ of the scanning optical system in the example 6 in the sub-scanning direction at the central image height is as follows:

$\beta_2 = 0.704$ and it satisfies the above-mentioned condition (1).

Figure 29:
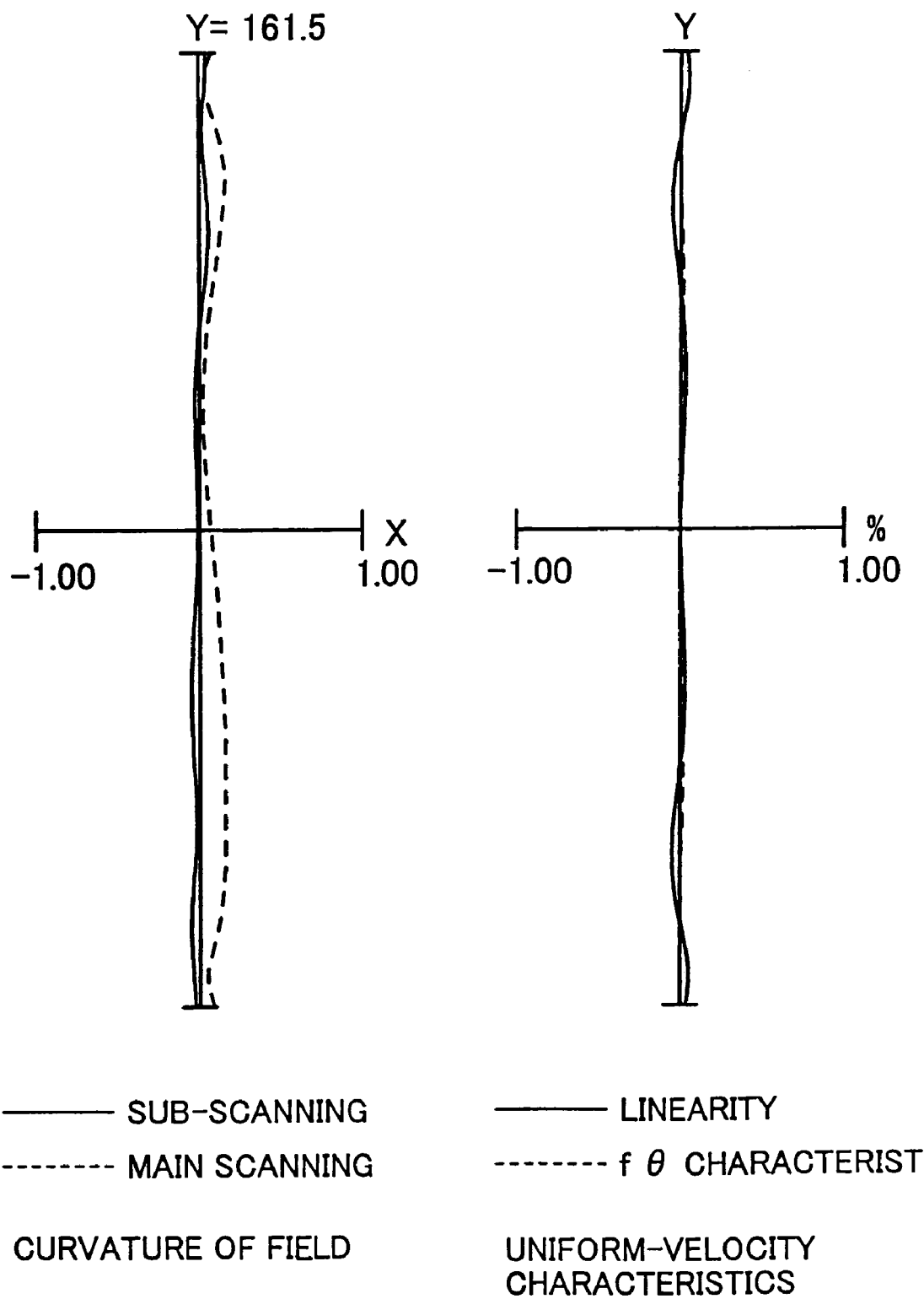
FIG. 29 shows curvature of field and uniform-velocity characteristics on the scanning optical system of the example 6.

FIG. 29 shows the curvature of field (the left figure; the solid line for the sub-scanning direction; the broken line for the main scanning direction) and the uniform-velocity characteristics (the right figure; the solid line for the linearity; the broken line for the f θ characteristic), with regard to the light-emitting source ch1 of the example 6.

The width of curvature of field for the entire scanning range 323 mm is 0.103 mm/323 mm in the sub-scanning direction, and 0.132 mm/323 mm in the main scanning direction. The linearity of the uniform-velocity characteristics is 0.104%/323 mm. Accordingly, both the curvature of field and uniform-velocity characteristics are very well corrected.

The sub-scanning curvature of field satisfies the above-mentioned condition (3). That is:

$$0.103/323 = 0.000319 < 0.005 \quad (3)$$

Figure 28:
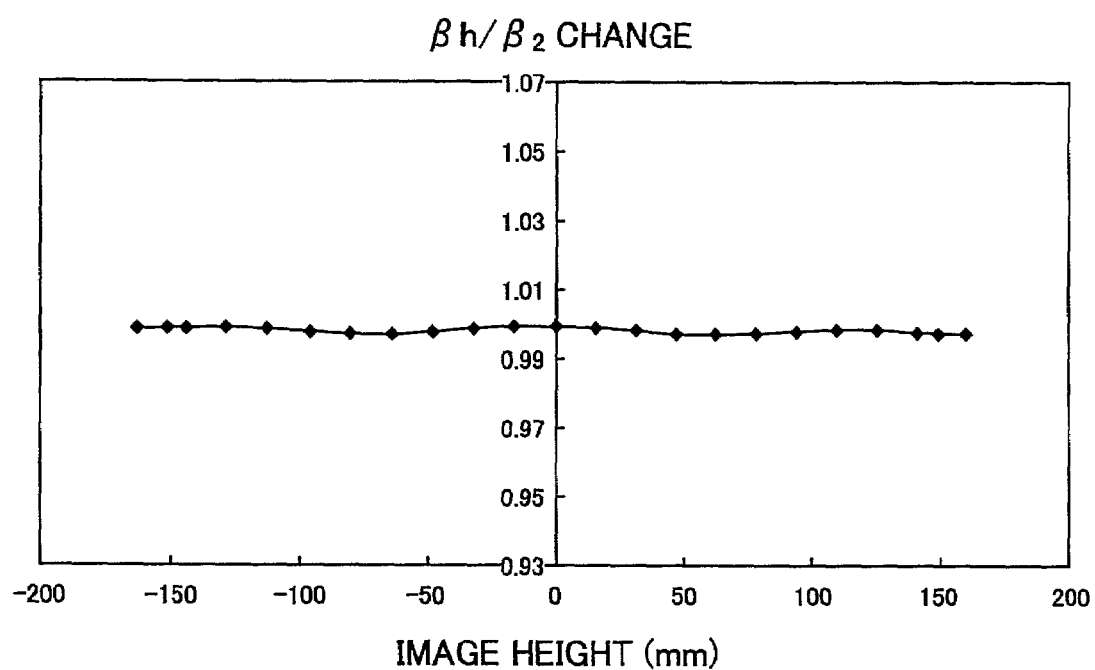
FIG. 28 shows change of a lateral magnification $\beta_h$ in sub-scanning direction at any image height with respect to a lateral magnification $\beta_2$ in the sub-scanning direction at the central image height of the scanning optical system of the example 6.

FIG. 28 shows change of the lateral magnification $\beta_h$ in the sub-scanning direction at any image height of beam spot with respect to the lateral magnification $\beta_2$ in the sub-scanning direction at the central image height of beam spot on the example 6 with regard to the light-emitting source ch1. As a result, $0.998 \leq |\beta_h/\beta_2| \leq 1.000$ Accordingly, the magnification change satisfies the above-mentioned condition (2), and is very well corrected.

Figure 27A:
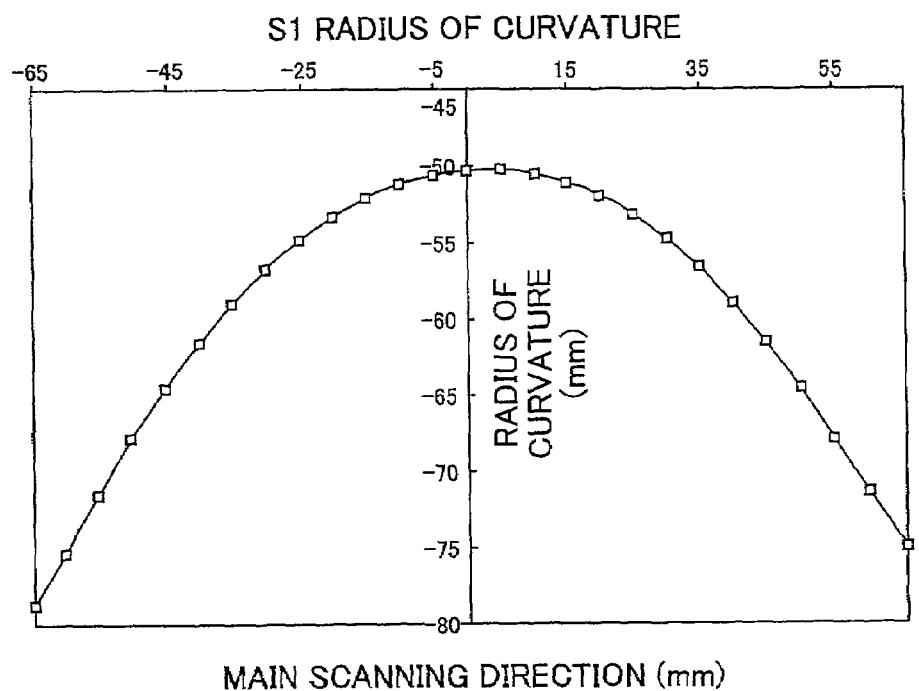
FIGS. 27A and 27B show states of change in main scanning direction of curvature in a sub-scanning section of surfaces S1 and S4 of the scanning optical system of the example 6.
Figure 27B:
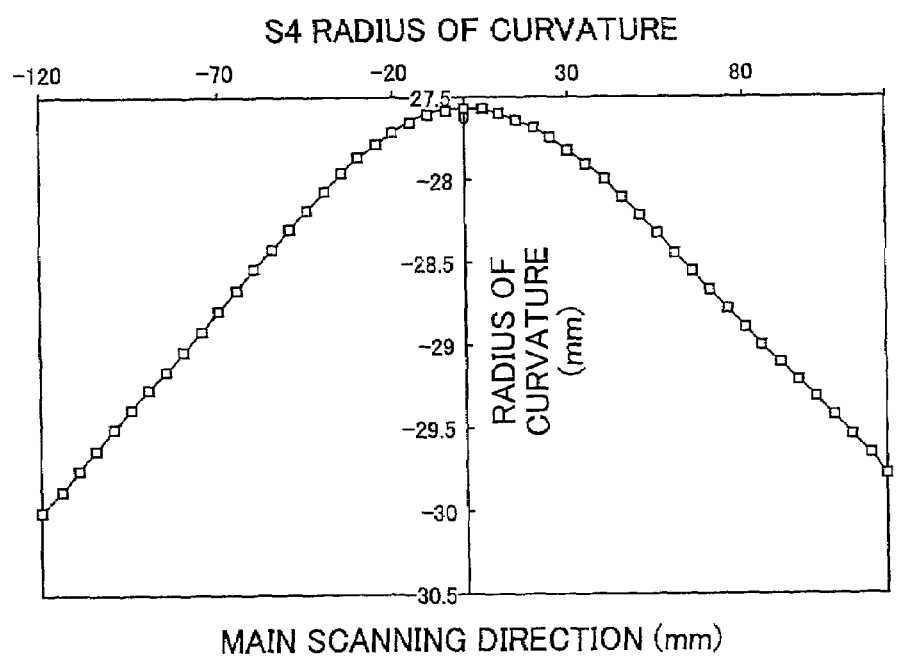

FIG. 27A shows variation of radius of curvature in the sub-scanning direction of the entrance surface (S1) of the lens 6. FIG. 27B shows variation of radius of curvature in the sub-scanning direction of the exit surface (S4) of the lens 7. Each of these surfaces is 'a surface in which a curvature in the sub-scanning direction varies asymmetrically in the main scanning direction'.

Figure 30A:
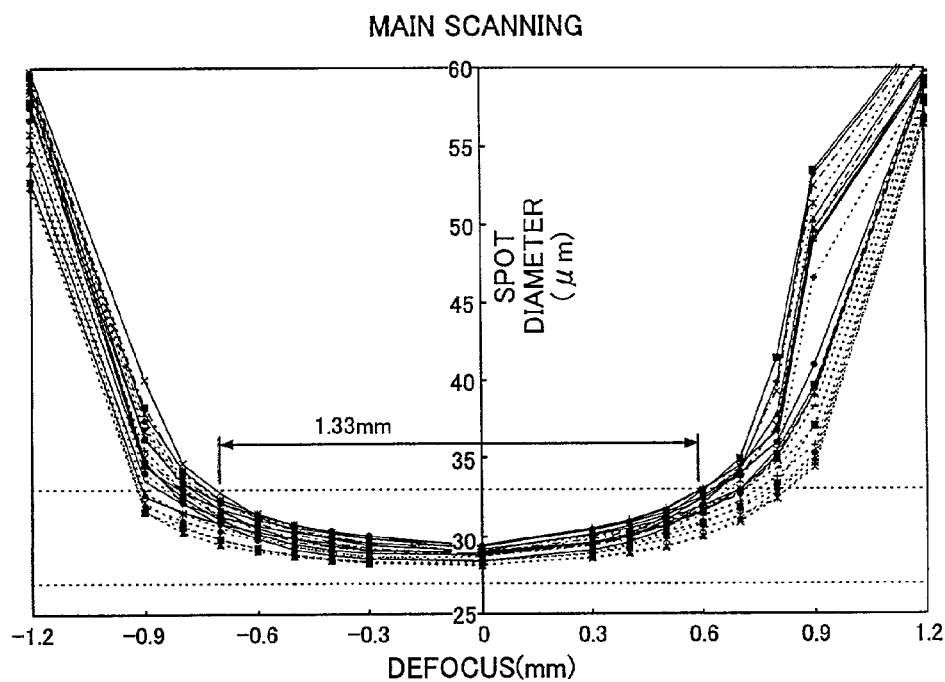
FIGS. 30A and 30B show depth curves of spot diameter for respective image heights for beam spot on the scanning optical system of the example 6.
Figure 30B:
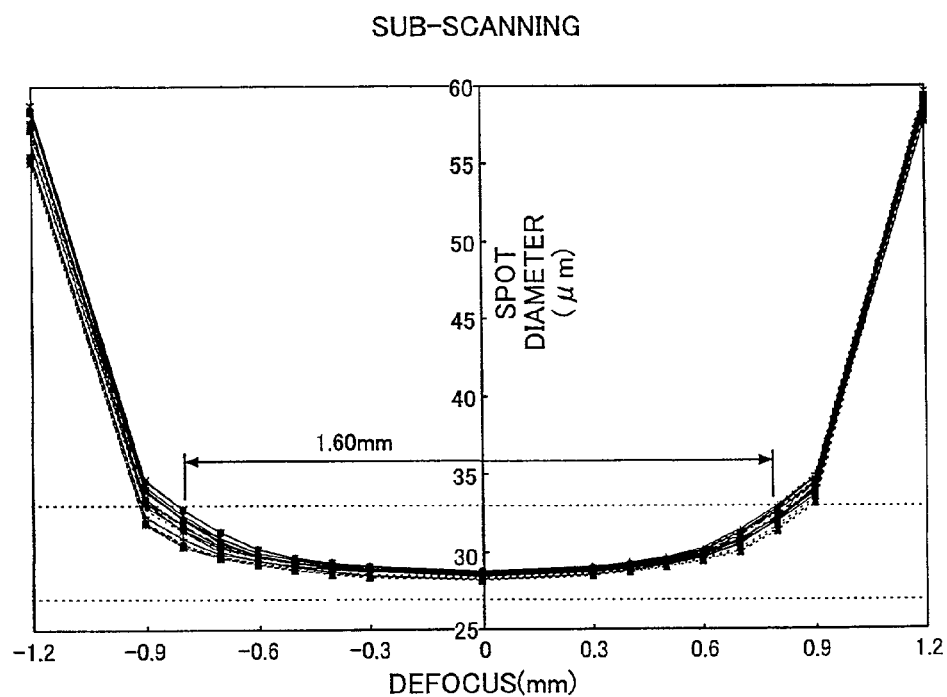

FIGS. 30A and 30B show 'depth curves of spot diameter (change of spot diameter with respect to defocus of beam spot)' for each image height of beam spot on the example 6 with regard to the light-emitting source ch1. In the figures, the image heights are total 21 image heights obtained from dividing ±150 mm into equal intervals. FIG. 30A is for the main scanning direction while FIG. 30B is for the sub-scanning direction.

In the example 6, the order of 30 μm is aimed as the spot diameter defined by the 1/e² intensity of the line spread functions. As shown in the figures, satisfactory depths are provided for both the main and sub-scanning directions. Accordingly, an allowance for positional accuracy on the surface to be scanned is large.

In the example 6, a back length of 158.52 (mm) which is near the half of the conjugate length of 342.01 (mm) in the sub-scanning direction of the scanning optical system is set.

The scanning optical system of each of the examples 2 through 6 is an optical system which condenses a beam deflected by the optical deflector 5 and thus forms thereof a beam spot on the surface 9 to be scanned, consists of the two lenses 6 and 7, the lens 6 on the side of optical deflector 5 having a negative refracting power in the sub-scanning direction, the lens 7 on the side of surface 9 to be scanned having a positive refracting power in the sub-scanning direction, and at least one lens surface (S4) of the lens surfaces of the lenses 6 and 7 being such that a shape in a sub-scanning section thereof is a non-arc shape.

Further, the surface (S4) in which the shape in the sub-scanning section thereof is the non-arc shape is a sub-non-arc shape such that the above-mentioned non-arc shape varies according to the position of the sub-scanning section in the main scanning direction. Further, the lens 6 on the side of optical deflector 5 has a positive refracting power in the main scanning direction.

Further, the scanning optical system of each of the examples 2 through 6 is such that the lateral magnification $\beta_2$ in the sub-scanning direction at the central image height of the scanning optical system satisfies the above-mentioned condition (1).

Further, the above-mentioned sub-non-arc surface (S4) is such that the shape in the main scanning section thereof is a non-arc shape.

Further, the lenses 6 and 7 constitute an anamorphic optical system having a function of making the position on or in the proximity of the deflection reflective surface and the position on the surface to be scanned have a geometric-optical conjugate relationship with regard to the sub-scanning direction.

Further, each of all the lens surfaces of the lenses 6 and 7 is such that curvatures in the main and sub-scanning directions thereof are different from one another.

Further, when a spot diameter of beam spot on the surface to be scanned is defined by the 1/e² intensity in the line spread functions of light intensity distribution of the beam spot, the lenses 6 and 7 have an imaging capability such that the above-mentioned spot diameter is equal to or smaller than 50 μm in each of the main and sub-scanning directions in the effective writing range.

Further, the sub-non-arc surface (S4) of the four surfaces of the lenses 6 and 7 is such that the non-arc amount which is a difference of the non-arc shape in a sub-scanning section thereof from the arc shape varies asymmetrically in the main scanning direction.

Further, each of at least two surfaces (S2, S3) of the four lens surfaces of the lenses 6 and 7 is such that the curvature in the sub-scanning direction thereof varies in the main scanning direction. Further, each of these surfaces S2 and S3 of these four surfaces is such that the curvature in the sub-scanning direction thereof varies asymmetrically in the main scanning direction.

Further, this scanning optical system is such that the lateral magnification $\beta_2$ in the sub-scanning direction at the central image height and the lateral magnification $\beta_h$ in the sub-scanning direction at any image height satisfy the above-mentioned condition (2).

Furthermore, the scanning optical system of each of the examples 2 through 6 is such that the effective writing width W and the width Fs of the sub-scanning curvature of field in the effective writing width satisfies the above-mentioned condition (3).

Further, each of at least two surfaces (S2 and S3 in each of the examples 2 through 5, but S1 and S4 in the example 6) of the four lens surfaces of the lenses 6 and 7 is such that a curvature in a sub-scanning section thereof varies asymmetrically in the main scanning direction. Furthermore, these lens surfaces have an air separation therebetween.

Further, the scanning optical system of each of the examples 2 through 6 is also used for condensing a plurality of beams deflected simultaneously so as to form a plurality of beam spots on the surface to be scanned.

Accordingly, the optical scanning device in the second embodiment shown in FIG. 32 employing the scanning optical system of each of the examples 2 through 6 is an optical scanning device in the multi-beam system which couples beams from the plurality of light-emitting sources ch1 through ch4 by the coupling lens 2 to the subsequent optical system, forms of the coupled beams a plurality of line images long in the main scanning direction and separate in the sub-scanning direction on or in the proximity of the deflection reflective surface of the optical deflector 5 by the line-image forming optical system 4 common to the plurality of beams, simultaneously deflects the beams at a uniform angular velocity by the optical deflector 5, condenses the deflected beams so as to form thereof a plurality of beam spots separate in the sub-scanning direction on the surface 9 to be scanned by the scanning optical system 6 and 7 common to the respective deflected beams, and thus scans the surface 9 to be scanned so as to draw a plurality of scan lines simultaneously thereon, and employs the above-described scanning optical system as the common scanning optical system 6 and 7.

Further, this optical scanning device in the multi-beam system employs the monolithic semiconductor laser array 1A in which the plurality of light-emitting sources ch1 through ch4 are arranged to form a line as the light source of the device, where each of the intervals of the light-emitting sources of the semiconductor laser array 1A is equal to or larger than 10 μm.

Further, in the optical scanning device in the third embodiment shown in FIG. 33, the two light-emitting sources may be configured as ones equivalent to the configuration of two light-emitting sources ch2 and ch3 in the semiconductor laser array in each of the examples 2 through 6 as the light source device of the optical scanning device. In the case where such a light source device is employed, the scanning optical system of each of the examples 2 through 6 may be preferably employed in the optical scanning device.

In each of the above-described examples, the F-number in the sub-scanning direction of the scanning optical system is approximately 28 at the most. Accordingly, the system is bright in comparison to F-number of 52 through 73.5 of the multi-beam scanning optical system proposed in Japanese Laid-Open Patent Application No. 8-297256, for example. Therefore, it is possible to reduce the diameter of beam spot, and to achieve high-density writing.

Further, although the two lenses 6 and 7 are made of plastic in each of the above-described examples, it is also possible to instead use glass material, or to instead use a combination of plastic material and glass material.

Figure 34:
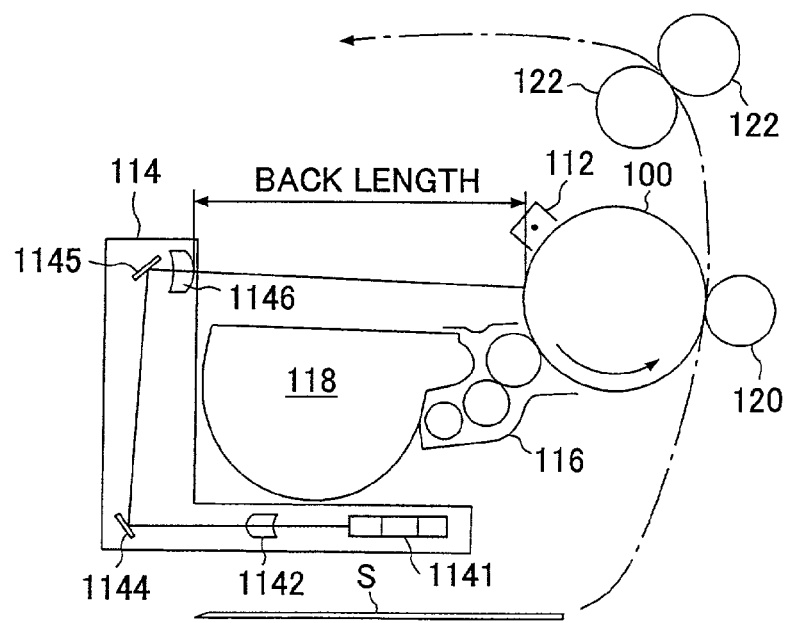
FIG. 34 shows an image forming apparatus in an embodiment of the present invention.

FIG. 34 shows an image forming apparatus in one embodiment of the present invention.

A photoconductive photosensitive body 100 employed as a photosensitive medium has a cylindrical shape and rotates at a uniform velocity in the direction of the arrow, is charged uniformly by a charging unit (although shown as of a corona discharging type, being able to be of a contact type such as a charging roller) 112, and has an electrostatic latent image formed thereon through writing by an optical scanning device 114.

This electrostatic latent image is developed by a developing unit 116. A visualized image obtained from the developing is transferred onto a sheet-like recording medium (transfer paper, plastic sheet for overhead projector or the like) S by a transfer unit (although shown as of a roller type, being able to be of a transfer and separation charger type) 120. The recording medium S has the transferred visualized image fixed thereon by a fixing unit 122, and is ejected out from the apparatus.

In the apparatus shown in FIG. 34, a toner hopper 118 feeds stored toner to the developing unit 116 as a demand arises, and the hopper and all are replaceable.

Only part including and subsequent to an optical deflector 1141 of the optical scanning device 114 is shown in the figure. A beam deflected by the optical deflector 1141 passes through a lens 1142, has the optical path thereof bent by mirrors 1144 and 1145, passes through a lens 1146, exits from the optical scanning device 114, and performs optical scanning on the photosensitive body 100.

In this embodiment, the lens 1142 and 1146 constitute a scanning optical system, and correspond to the lenses 6 and 7 in each of the above-described examples 1 through 6. The back length is a distance between the surface of the lens 1146 on the side of the photosensitive body 100 and the photosensitive body 100.

In order to reduce a load borne by a user for replacing the toner hopper 118, the storage toner amount of the toner hopper is increased so that the period of replacing the toner hopper is elongated. Thereby, the size of the toner hopper 118 is enlarged, and, therefore, the long back length is required for the optical scanning device 114. In this view point, each of the above-described examples 1 through 6 has the long back length as mentioned above, and, thereby, is preferably employed in such an image forming apparatus which requires the long back length.

Thus, the apparatus shown in FIG. 34 is an image forming apparatus forming a latent image on the photosensitive surface of the photosensitive body 100 by performing scanning thereon by the optical scanning device 100, visualizing the latent image so as to obtain an image. In the apparatus, any of the optical scanning devices described above is used as the optical scanning device 114 which performs scanning of the photosensitive surface of the photosensitive body 100. The photosensitive body 100 is 'a photoconductive photosensitive body', and an electrostatic latent image formed as a result of uniform charging of the photosensitive surface and scanning thereof by the optical scanning device is visualized into a toner image.

Thus, according to the present invention, it is possible to achieve novel scanning optical system, optical scanning device and image forming apparatus.

A scanning optical system according to the present invention is of 'a retrofocus type' such that negative and positive refracting powers are distributed in the order from an optical deflector in sub-scanning direction, and 'the rear principal point in the sub-scanning direction' is disposed on the side of surface to be scanned from an actual configuration of lenses. Thereby, whether in the single-beam system or in the multi-beam system, it is possible to secure a long back length.

Further, by employing a sub-non-arc surface and effectively correcting wavefront aberration, it is possible to stably obtain a small-sized beam spot on or smaller than the order of 50 µm.

An optical scanning device according to the present invention, employing the above-described scanning optical system, thus can achieve satisfactory writing in high writing density by a small-sized stable beam spot. By employing such a scanning optical system in an optical scanning device in a multi-beam system, it is possible to make stable the scan-line pitch against structural change, and to achieve satisfactory optical scanning in the multi-beam system, which then can perform high-density writing.

An image forming apparatus according to the present invention, by employing an optical scanning device according to the present invention having a satisfactory performance, can thus achieve satisfactory image formation.

The present invention is not limited to the above-described embodiments, and variations and modifications may be made without departing from the scope of the present invention.

The present application is based on Japanese priority application No. 11-284443, filed on Oct. 5, 1999, the entire contents of which are hereby incorporated by reference.

What is claimed is:

1. A scanning optical system condensing a beam deflected by an optical deflector so as to form a beam spot on a surface to be scanned, comprising two lenses, wherein:
a lens on the side of optical deflector thereof has a negative refracting power in sub-scanning direction;
a lens on the side of surface to be scanned thereof has a positive refracting power in the sub-scanning direction; and
at least one lens surface of the lens surfaces of said two lenses is such that a shape in a sub-scanning direction thereof is a non-arc shape, and said at least one lens surface has a non-coaxial surface, wherein:
at least two lens surfaces such that a curvature in a sub-scanning section varies in main scanning direction are formed in different lenses;
at least one surface of said at least two lens surfaces is such that change in the main scanning direction of a curvature in a sub-scanning section thereof is asymmetrical; and
said optical system is such that a lateral magnification $\beta_2$ in the sub-scanning direction at a central height and a lateral magnification $\beta_h$ in the sub-scanning direction at any image height satisfy the following condition (2)

$$0.93 < |\beta_h/\beta_2| < 1.07. \tag{2}$$

2. The scanning optical system as claimed in claim 1, wherein the surface such that a shape in a sub-scanning section thereof is a non-arc shape is a sub-non-arc surface such that the non-arc shape changes according to the position in main scanning direction of the sub-scanning section.

3. The scanning optical system as claimed in claim 2, wherein a shape of the sub-non-arc surface in a main scanning section is a non-arc shape.

4. The scanning optical system as claimed in claim 2, wherein a non-arc amount which is an amount of difference of the non-arc shape in a sub-scanning section of the sub-non-arc surface from an arc changes asymmetrically in the main scanning direction.

5. The scanning optical system as claimed in claim 1, wherein said lens on the side of optical deflector has a positive refracting power in main scanning direction.

6. The scanning optical system as claimed in claim 1, wherein a lateral magnification $\beta_2$ in the sub-scanning direction at a central image height of said optical system satisfies the following condition (1):

$$05 \leq |\beta_2| \leq 2.0 \tag{1}$$

7. The scanning optical system as claimed in claim 1, wherein said optical system comprises an anamorphic optical system having a function of making a position on or the proximity of a deflection reflective surface of the optical deflector and a position on the surface to be scanned have a geometric-optical conjugate relationship with regard to the sub-scanning direction.

8. The scanning optical system as claimed in claim 7, wherein, in each of all the four lens surfaces of said two lenses, curvatures in the main and sub scanning directions are different from one another.

9. The scanning optical system as claimed in claim 1, wherein said optical system has an imaging capability such that, when a spot diameter of a beam spot on the surface to be scanned is defined by $1/e^2$ intensity in line spread function of light intensity distribution of the beam spot, the spot diameter in each of the main and sub-scanning directions is equal to or smaller than 50 µm in an effective writing width.

10. The scanning optical system as claimed in claim 1, wherein an effective writing width W and a width Fs of sub-scanning curvature of field in the effective writing width satisfy the following condition (3):

$$Fs/W < 0.005 \tag{3}$$

11. The scanning optical system as claimed in claim 10, wherein said two lenses have at least two lens surfaces each of which is such that change in main scanning direction of a curvature in a sub-scanning section is asymmetrical, and at least two lens surfaces of said at least two lens surfaces have an air separation therebetween.

12. The scanning optical system as claimed in claim 1, wherein said two lenses have at least two lens surfaces each of which is such that change in the main scanning direction of a curvature in a sub-scanning section is asymmetrical, and at least two lens surfaces of said at least two lens surfaces have an air separation therebetween.

13. The scanning optical system as claimed in claim 1, wherein said optical system is used for condensing a plurality of beams simultaneously deflected so as to form a plurality-of beam spots on the surface to be scanned.

14. An optical scanning device in a single-beam system comprising:
a coupling lens coupling a beam from a light source to a line-image forming optical system forming the coupled beam in a line image long in a main scanning direction on or in the proximity of a deflection reflective surface of an optical deflector the optical deflector deflecting the beam at a uniform angular velocity;

a scanning optical system condensing the deflected beam so as to form a beam spot thereof on a surface to be scanned, and scanning said surface to be scanned, said scanning optical system comprising two lenses, wherein:

a lens on the side of optical deflector thereof has a negative refracting power in sub-scanning direction;

a lens on the side of surface to be scanned thereof has a positive refracting power in the sub-scanning direction;

at least one lens surface of the lens surfaces of said two lenses is such that a shape in a sub-scanning direction thereof is a non-arc shape, and said at least one lens surface has a non-coaxial surface, wherein:

at least two lens surfaces such that a curvature in a sub-scanning section varies in main scanning direction are formed in different lenses;

at least one surface of said at least two lens surfaces is such that change in the main scanning direction of a curvature in a sub-scanning section thereof is asymmetrical; and said optical system is such that a lateral magnification $\beta_2$ in the sub-scanning direction at a central height and a lateral magnification $\beta_h$ in the sub-scanning direction at any image height satisfy the following condition (2)

$$0.93 \leq |\beta_h/\beta_2| < 1.07. \tag{2}$$

15. An optical scanning device in a multi-beam system comprising:

a coupling lens coupling beams from a plurality of light-emitting sources to a common line-image forming optical system forming the plurality of coupled beams in a plurality of line images long in a main scanning direction and separate in a sub-scanning direction on or in the proximity of a deflection reflective surface of an optical deflector, the optical deflector simultaneously deflecting the beams at a uniform angular velocity;

a common scanning optical system condensing the respective deflected beams so as to form thereof a plurality of beam spots separate in the sub-scanning direction on a surface to be scanned, and scanning said surface to be scanned by the plurality of beam spots so as to draw a plurality of scan lines simultaneously thereon, said common scanning optical system comprising two lenses, wherein:

a lens on the side of optical deflector thereof has a negative refracting power in sub-scanning direction;

a lens on the side of surface to be scanned thereof has a positive refracting power in the sub-scanning direction;

at least one lens surface of the lens surfaces of said two lenses is such that a shape in a sub-scanning direction thereof is a non-arc shape, and said at least one lens surface has a non-coaxial surface, wherein:

at least two lens surfaces such that a curvature in a sub-scanning section varies in main scanning direction are formed in different lenses;

at least one surface of said at least two lens surfaces is such that change in the main scanning direction of a curvature in a sub-scanning section thereof is asymmetrical; and said optical system is such that a lateral magnification $\beta_2$ in the sub-scanning direction at a central height and a lateral magnification $\beta_h$ in the sub-scanning direction at any image height satisfy the following condition (2)

$$0.93 < |\beta_h/\beta_2| < 1.07, \text{ and} \tag{2}$$

said optical system is used for condensing a plurality of beams simultaneously deflected so as to form a plurality-of beam spots on the surface to be scanned.

16. The optical scanning device as claimed in claim 15, wherein said plurality of light-emitting sources comprise a monolithic semiconductor laser array in which the plurality of light-emitting sources are arranged so as to form a line.

17. The optical scanning device as claimed in claim 16, wherein each of the intervals of the light-emitting sources of said semiconductor laser array is equal to or larger than 10 µm.

18. An image forming apparatus comprising:

a photosensitive surface of a photosensitive medium on which a latent image is formed by scanning thereof by an optical scanning device, and visualizing the latent image so as to obtain an image, said optical scanning device comprising:

a coupling lens coupling a beam from a light source to a line-image forming optical system forming the coupled beam in a line image long in a main scanning direction on or in the proximity of a deflection reflective surface of an optical deflector, the optical deflector deflecting the beam at a uniform angular velocity;

a scanning optical system condensing the deflected beam so as to form a beam spot thereof on a surface to be scanned, and scanning said surface to be scanned, said scanning optical system comprising two lenses, wherein:

a lens on the side of optical deflector thereof has a negative refracting power in sub-scanning direction;

a lens on the side of surface to be scanned thereof has a positive refracting power in the sub-scanning direction;

at least one lens surface of the lens surfaces of said two lenses is such that a shape in a sub-scanning direction thereof is a non-arc shape, and said at least one lens surface has a non-coaxial surface, wherein:

at least two lens surfaces such that a curvature in a sub-scanning section varies in main scanning direction are formed in different lenses;

at least one surface of said at least two lens surfaces is such that change in the main scanning direction of a curvature in a sub-scanning section thereof is asymmetrical; and said optical system is such that a lateral magnification $\beta_2$ in the sub-scanning direction at a central height and a lateral magnification $\beta_h$ in the sub-scanning direction at any image height satisfy the following condition (2)

$$0.93 \leq |\beta_h/\beta_2| < 1.07. \tag{2}$$

19. The image forming apparatus as claimed in claim 18, wherein said photosensitive medium comprises a photoconductive photosensitive body, and an electrostatic latent image formed as a result of uniform charging of the photosensitive surface and scanning thereof by the optical scanning device is visualized into a toner image.

20. An image forming apparatus comprising:

a photosensitive surface of a photosensitive medium on which a latent image is formed by scanning thereof by an optical scanning device, and visualizing the latent image so as to obtain an image, said optical scanning device comprising:

a coupling lens coupling beams from a plurality of light-emitting sources to a common line-image forming optical system forming the plurality of coupled beams in a plurality of line images long in a main scanning direction and separate in a sub-scanning direction on or in the proximity of a deflection reflective surface of an optical deflector, the optical deflector simultaneously deflecting the beams at a uniform angular velocity;

a common scanning optical system condensing the respective deflected beams so as to form thereof a plurality of beam spots separate in the sub-scanning direction on a surface to be scanned, and scanning said surface to be scanned by the plurality of beam spots so as to draw a plurality of scan lines simultaneously thereon, said common scanning optical system comprising two lenses, wherein:

a lens on the side of optical deflector thereof has a negative refracting power in sub-scanning direction;

a lens on the side of surface to be scanned thereof has a positive refracting power in the sub-scanning direction;

at least one lens surface of the lens surfaces of said two lenses is such that a shape in a sub-scanning direction thereof is a non-arc shape, and said at least one lens surface has a non-coaxial surface, wherein:

at least two lens surfaces such that a curvature in a sub-scanning section varies in main scanning direction are formed in different lenses;

at least one surface of said at least two lens surfaces is such that change in the main scanning direction of a curvature in a sub-scanning section thereof is asymmetrical; and said optical system is such that a lateral magnification $\beta_2$ in the sub-scanning direction at a central height and a lateral magnification $\beta_h$ in the sub-scanning direction at any image height satisfy the following condition (2)

$$0.93 < |\beta_h/\beta_2| < 1.07, \text{ and} \qquad (2)$$

said optical system is used for condensing a plurality of beams simultaneously deflected so as to form a plurality-of beam spots on the surface to be scanned.

21. The image forming apparatus as claimed in claim 20, wherein said photosensitive medium comprises a photoconductive photosensitive body, and an electrostatic latent image formed as a result of uniform charging of the photosensitive surface and scanning thereof by the optical scanning device is visualized into a toner image.

* * * * *